US012602508B1

(12) United States Patent
Bethancourt et al.

(10) Patent No.: US 12,602,508 B1
(45) Date of Patent: Apr. 14, 2026

(54) MACHINE LEARNING BASED AUTHENTICATION AND REAL TIME DATA ACCESS WITH DISPARATE COMMUNICATION NETWORKS

(71) Applicant: Forward Lending, Inc., Austin, TX (US)

(72) Inventors: Jose Bethancourt, Austin, TX (US); Mit Shah, Chevy Chase, MD (US); Jesus Marco del Carmen, Austin, TX (US); Mustafa Ali, Austin, TX (US); Christopher Ayre Boggs, Austin, TX (US)

(73) Assignee: Forward Lending, Inc., Austin, TX (US)

( * ) Notice: Subject to any disclaimer, the term of this patent is extended or adjusted under 35 U.S.C. 154(b) by 55 days.

(21) Appl. No.: 18/424,621

(22) Filed: Jan. 26, 2024

Related U.S. Application Data

(63) Continuation-in-part of application No. 18/509,183, filed on Nov. 14, 2023.

(60) Provisional application No. 63/533,468, filed on Aug. 18, 2023.

(51) Int. Cl.
*G06F 21/62* (2013.01)
*G06N 20/00* (2019.01)

(52) U.S. Cl.
CPC ......... *G06F 21/6227* (2013.01); *G06N 20/00* (2019.01)

(58) Field of Classification Search
CPC ........................... G06F 21/6227; G06N 20/00
See application file for complete search history.

(56) References Cited

U.S. PATENT DOCUMENTS

| | | |
|---|---|---|
| 9,801,066 B1 | 10/2017 | Hanley |
| 12,526,264 B1 | 1/2026 | Bethancourt |
| 2015/0088783 A1 | 3/2015 | Mun |
| 2016/0217390 A1 | 7/2016 | Shoaib |
| 2017/0126649 A1 | 5/2017 | Votaw |
| 2018/0218446 A1 * | 8/2018 | Ries .................... H04L 63/0884 |
| 2019/0005467 A1 | 1/2019 | Varagani |
| 2020/0320536 A1 | 10/2020 | Clower |
| 2021/0034917 A1 * | 2/2021 | Thekkumpat ....... G06F 18/2148 |
| 2021/0142191 A1 * | 5/2021 | Faruquie ............. G06N 20/00 |
| 2022/0391938 A1 | 12/2022 | Sridhar |
| 2022/0391994 A1 | 12/2022 | Cooksey |
| 2022/0398583 A1 * | 12/2022 | Crudele .............. G06Q 40/125 |
| 2024/0185335 A1 * | 6/2024 | Church .............. H04L 63/0815 |
| 2025/0005545 A1 | 1/2025 | Kievit |

* cited by examiner

*Primary Examiner* — Shirley X Zhang

(57) ABSTRACT

Systems, methods, and non-transitory computer readable media are configured to perform operations comprising obtaining formatted account data maintained by an entity and associated with an account of a user; accessing in real time account data associated with the account from an institution after the entity has facilitated authentication of the user with the institution; and based on a machine learning model, generating synchronized data that reflects selection of a data field of a data type from the formatted account data maintained by the entity or a data field of the data type from the account data from the institution.

20 Claims, 31 Drawing Sheets

350
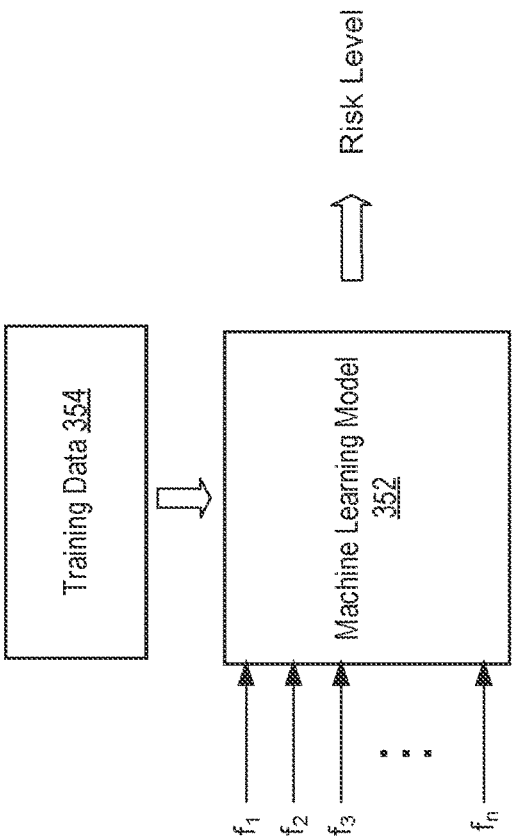
Training Data 354
Machine Learning Model 352
$f_1$
$f_2$
$f_3$
$f_n$
. . .
Risk Level
FIGURE 3B

500

General MLM 502

First Institution MLM 504

Second Institution MLM 506

. . .

nth Institution MLM 508

First Account Type MLM 510

Second Account Type MLM 512

. . .

mth Account Type MLM 514

602

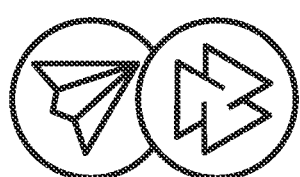

GradJoy uses Method to connect your liabilities

🔒 Secure connection

Your information is handled securely with end-to-end encryption.

⊕ Link accounts

Method will link all your liability accounts.

👁 Loan Options

All prequalified options will be shown at the end of this application.

You authorize Method to initiate a soft credit inquiry on your behalf and by continuing, you agree to Method's Privacy Policy and Terms of Service.

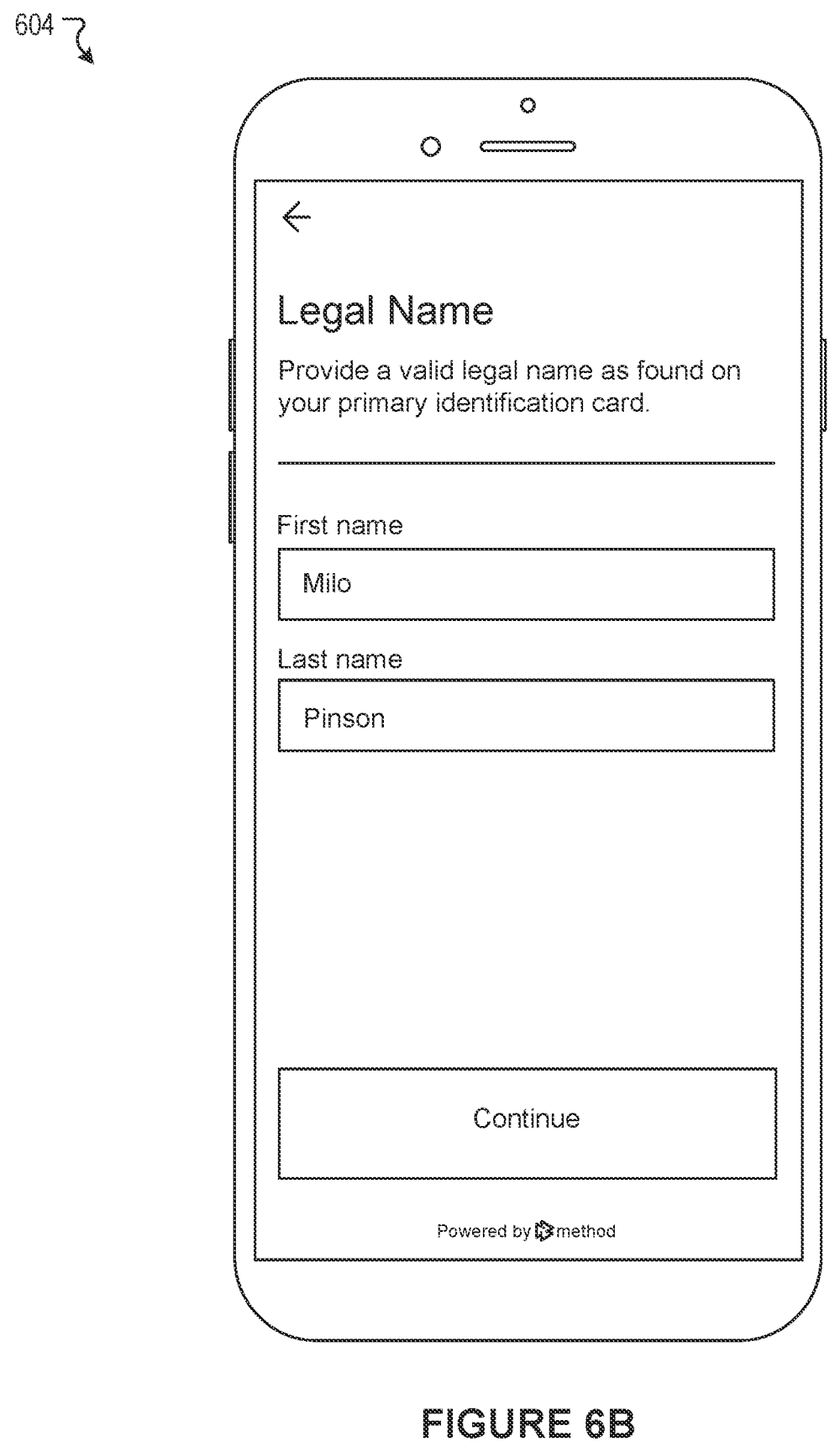

Legal Name

Provide a valid legal name as found on your primary identification card.

First name

Milo

Last name

Pinson

Continue

Powered by method

FIGURE 6B

606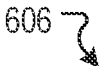
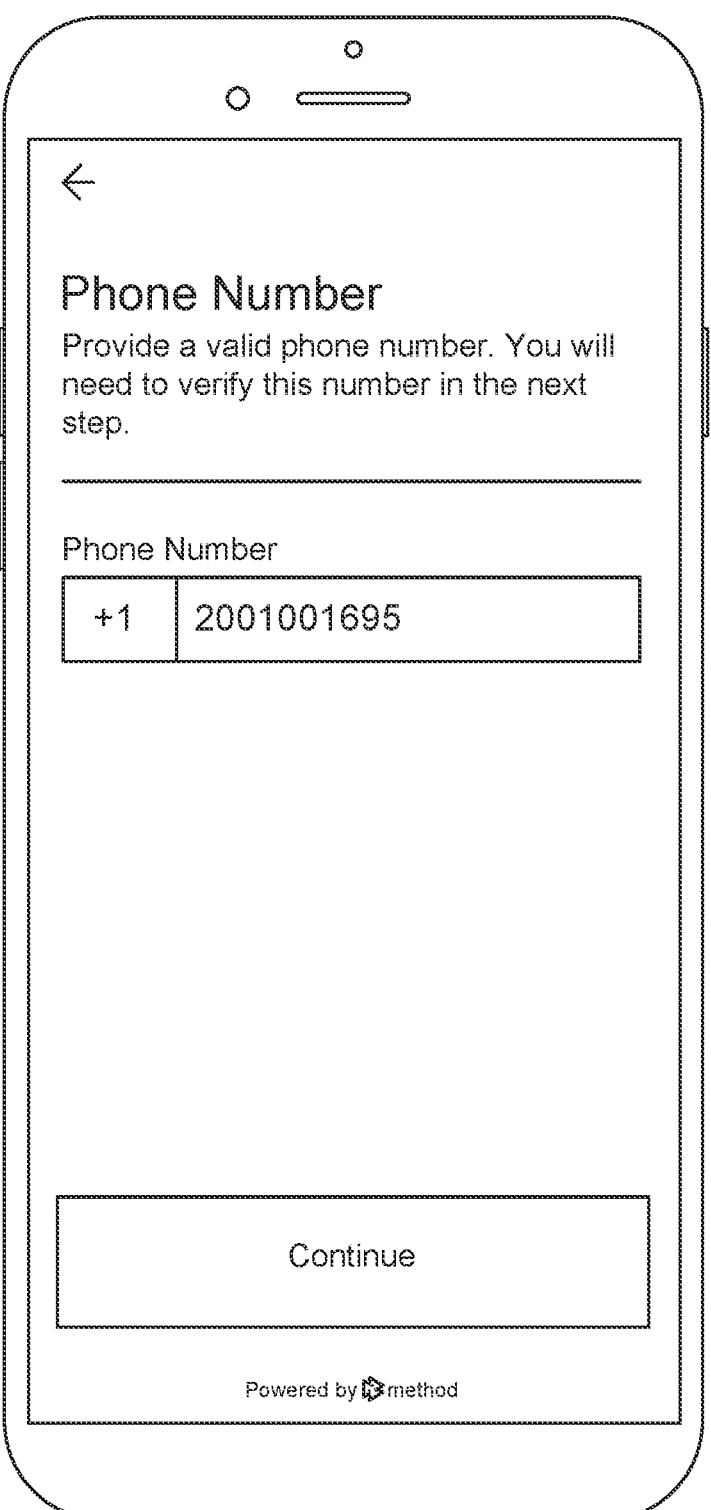
FIGURE 6C

608

Figure 6E:
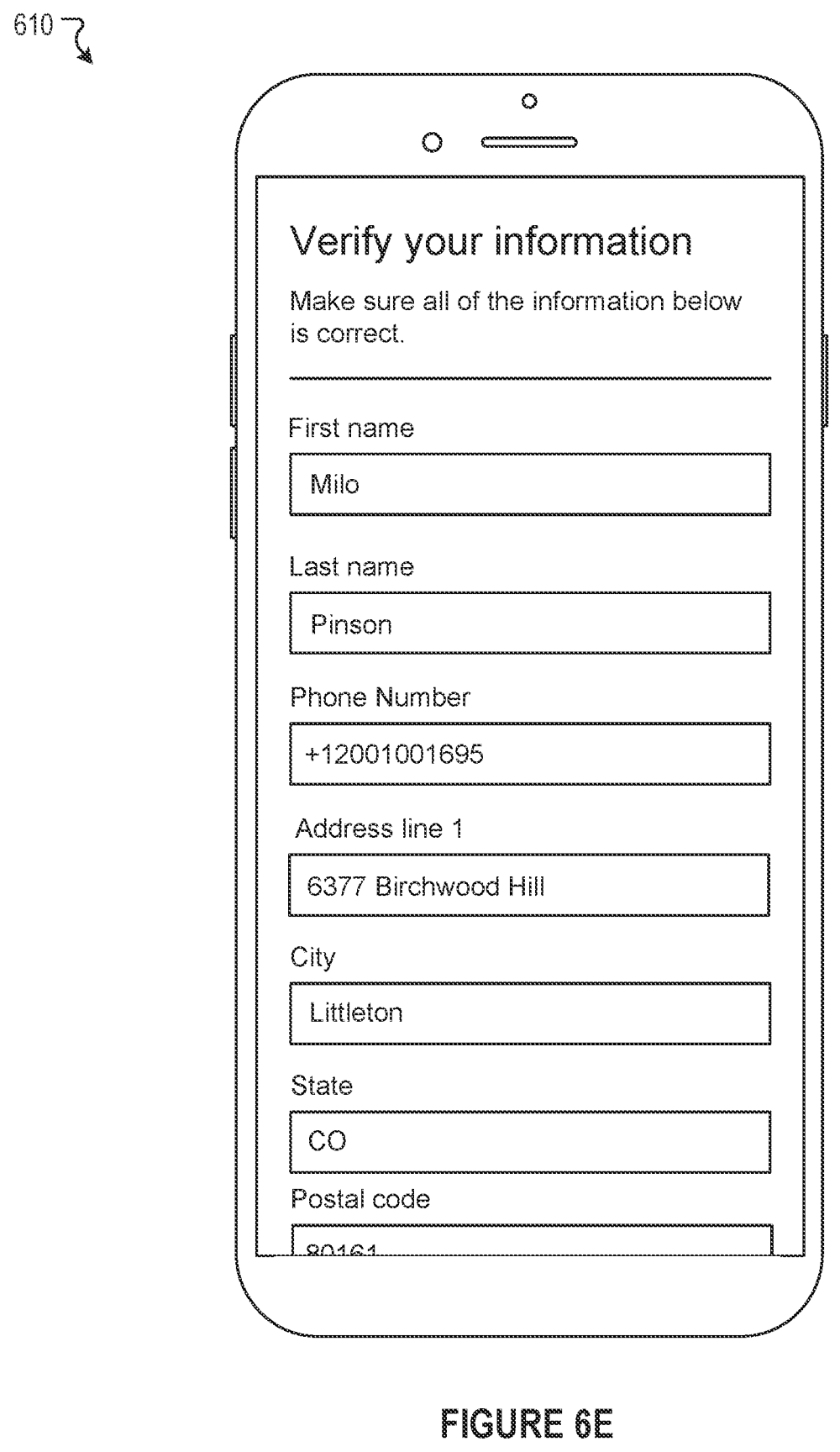

610

Verify your information

Make sure all of the information below is correct.

First name

Milo

Last name

Pinson

Phone Number

+12001001695

Address line 1

6377 Birchwood Hill

City

Littleton

State

CO

Postal code

Figure 6F:
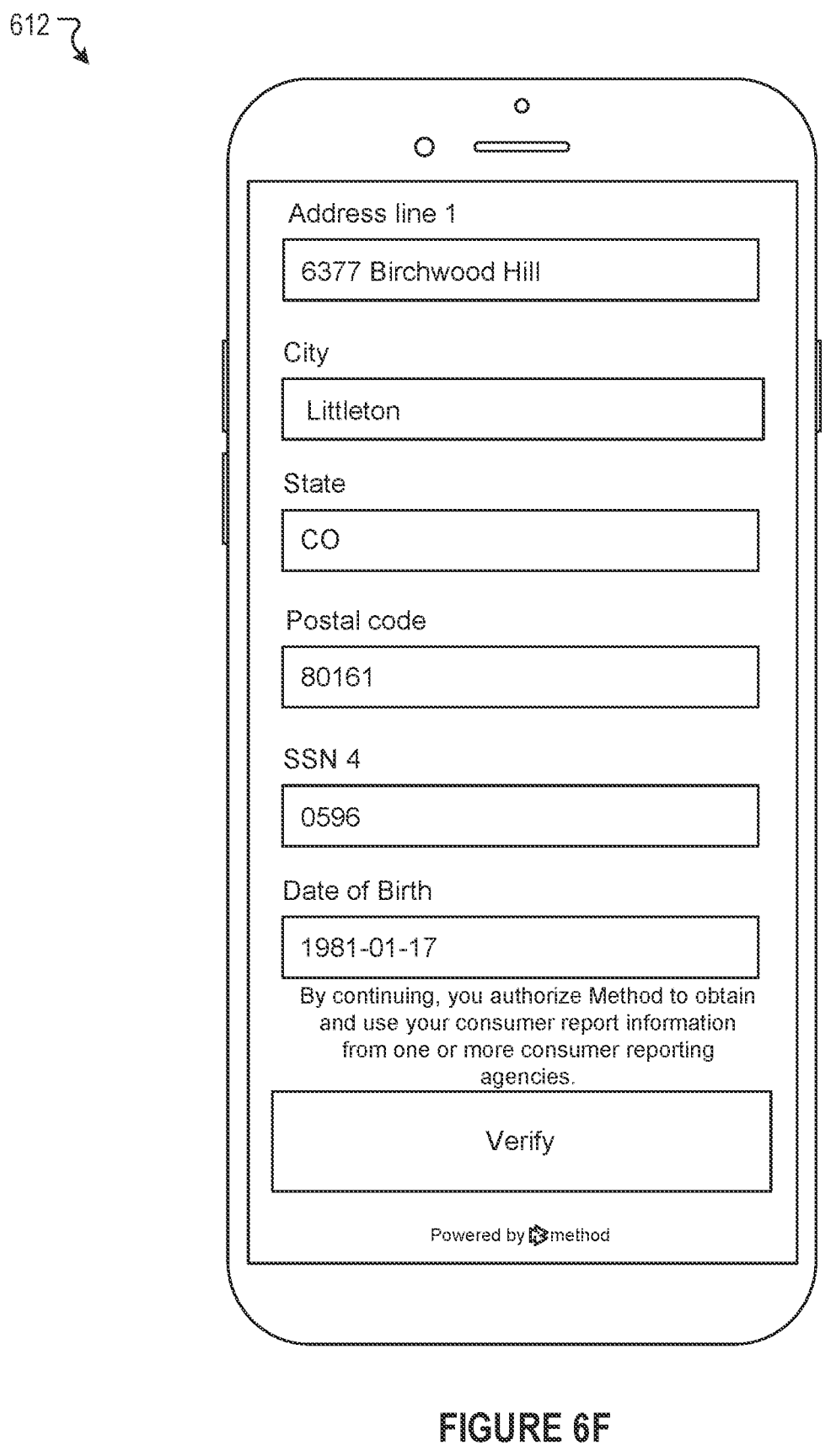

Address line 1

6377 Birchwood Hill

City

Littleton

State

CO

Postal code

80161

SSN 4

0596

Date of Birth 1981-01-17

By continuing, you authorize Method to obtain
and use your consumer report information
from one or more consumer reporting
agencies.

Verify

Powered by method

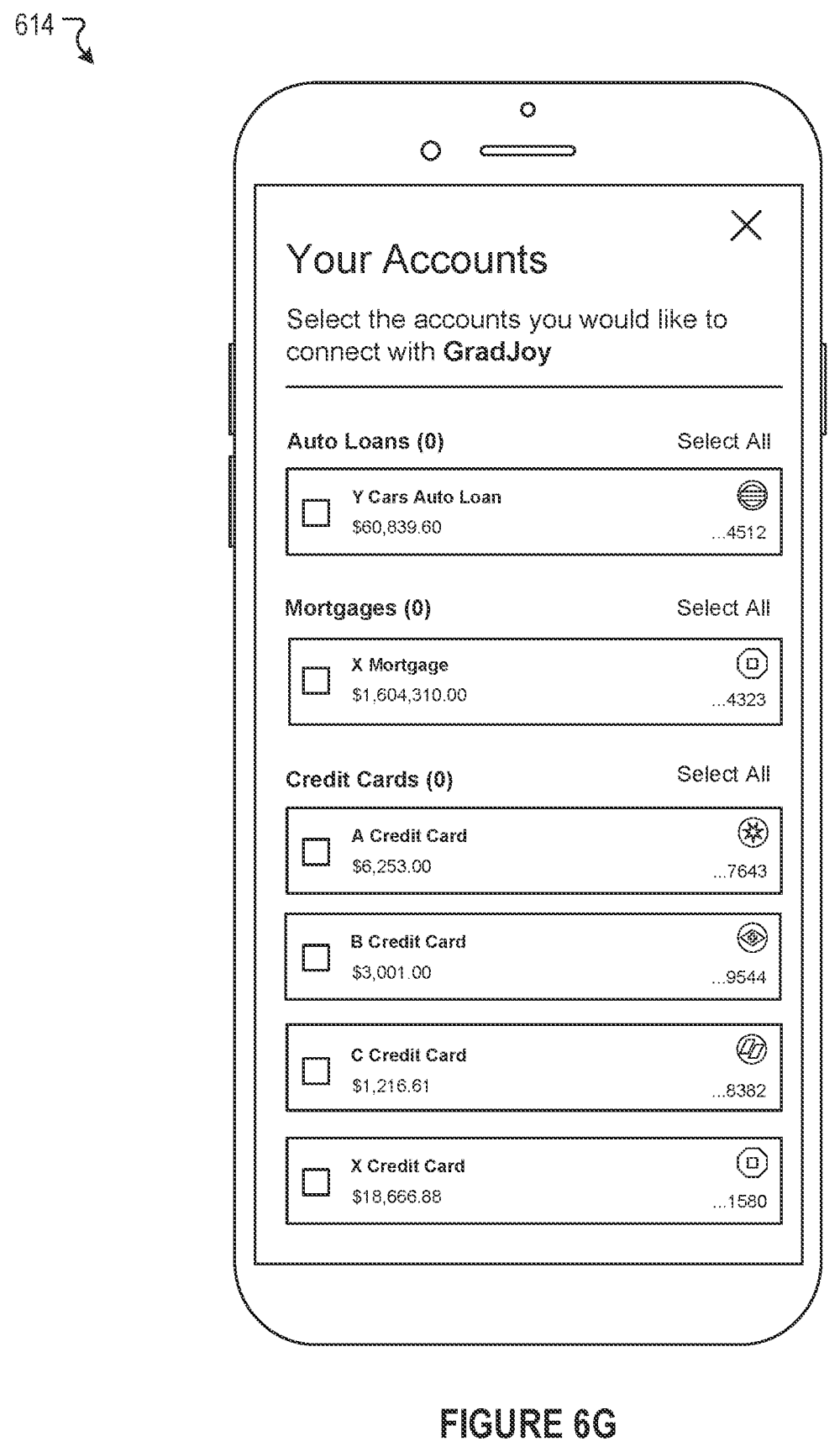

Your Accounts

Select the accounts you would like to connect with GradJoy

Auto Loans (0)          Select All

☐  Y Cars Auto Loan
   $60,839.60                    ...4512

Mortgages (0)          Select All

☐  X Mortgage
   $1,604,310.00                 ...4323

Credit Cards (0)          Select All

☐  A Credit Card
   $6,253.00                     ...7643

☐  B Credit Card
   $3,001.00                     ...9544

☐  C Credit Card
   $1,216.61                     ...8382

☐  X Credit Card
   $18,666.88                    ...1580

FIGURE 6G

616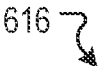
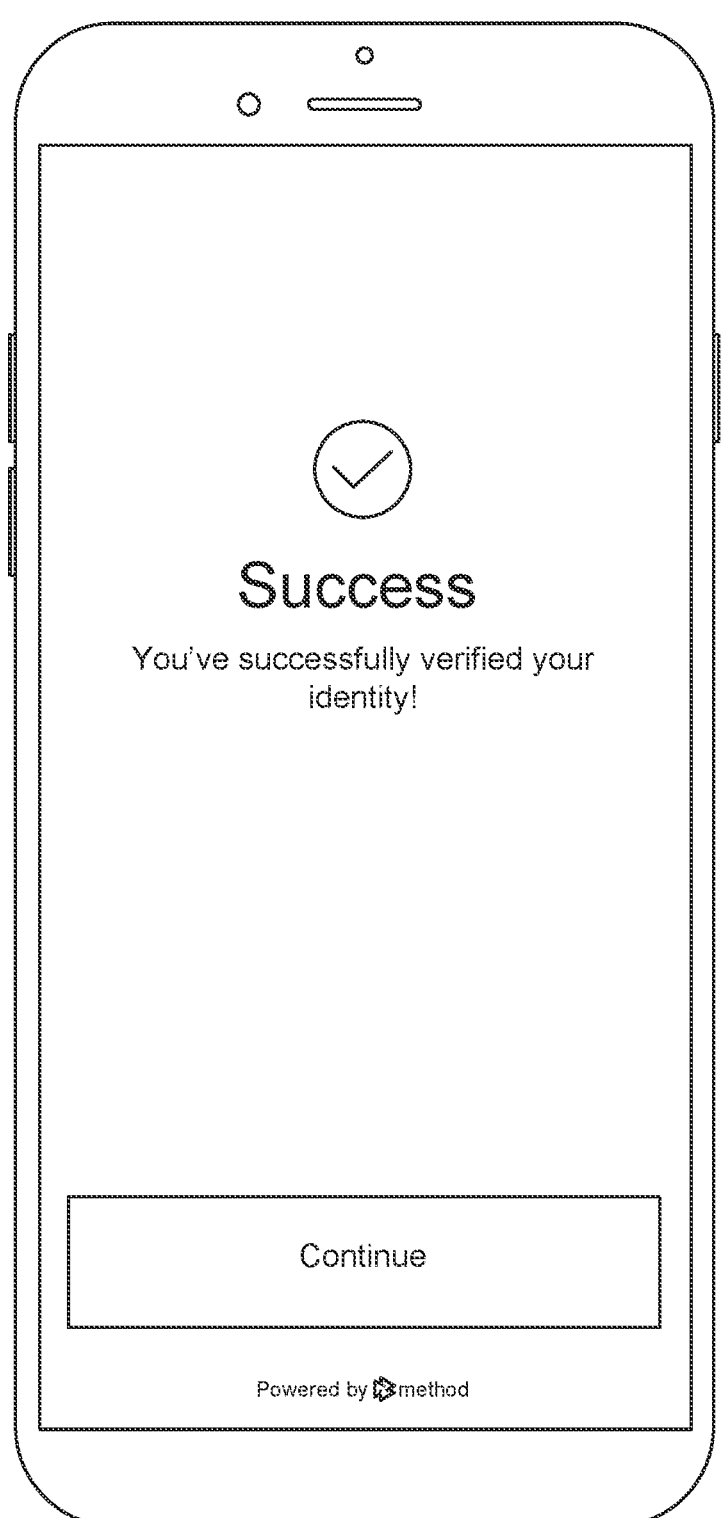
FIGURE 6H

618

Your Accounts ✕

Select the accounts you would like to make a payment on.

---

Auto Loans (0)     Select All

☐   Y Cars Auto Loan
    $60,839.60         ...4512

Mortgages (0)     Select All

☐   X Mortgage
    $1,604,310.00       ...4323

Credit Cards (0)     Select All

☐   A Credit Card
    $6,253.00         ...7643

☐   B Credit Card
    $3,001.00         ...9544

☐   C Credit Card
    $1,216.61         ...8382

☐   X Credit Card
    $18,666.88       ...1580

620

622

Figure 8:
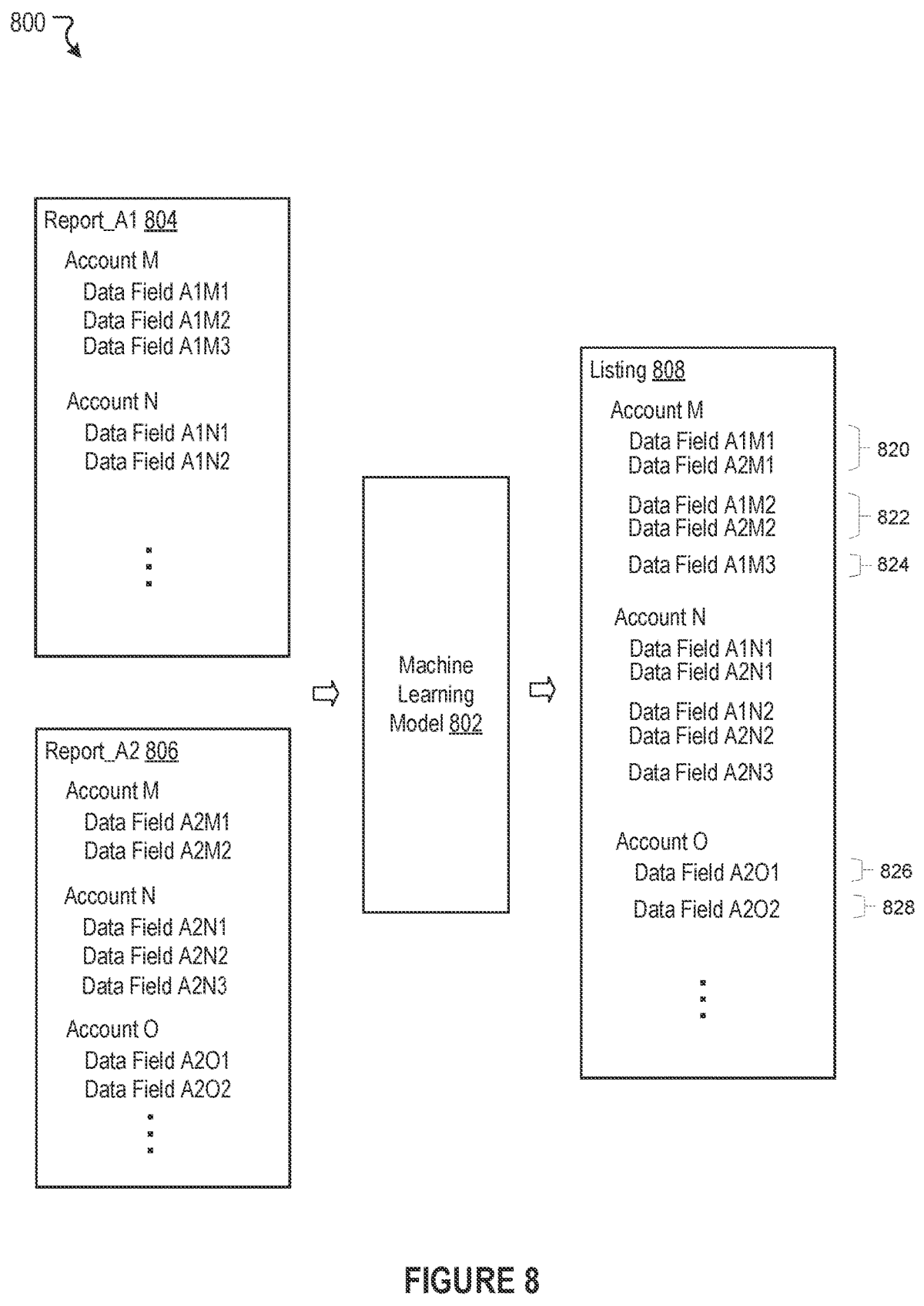

800

Report_A1 804

Account M
  Data Field A1M1
  Data Field A1M2
  Data Field A1M3

Account N
  Data Field A1N1
  Data Field A1N2

:
  :

Report_A2 806

Account M
  Data Field A2M1
  Data Field A2M2

Account N
  Data Field A2N1
  Data Field A2N2
  Data Field A2N3

Account O
  Data Field A2O1
  Data Field A2O2
  :
  :

Machine
Learning
Model 802

Listing 808

Account M
  Data Field A1M1
  Data Field A2M1      } 820

Data Field A1M2
  Data Field A2M2      } 822

Data Field A1M3      } 824

Account N
  Data Field A1N1
  Data Field A2N1

Data Field A1N2
  Data Field A2N2

Data Field A2N3

Account O
  Data Field A2O1      } 826

Data Field A2O2      } 828

Prioritized Listing 910

Account M
Data Field A1M1
Data Field A1M2
Data Field A1M3

Account N
Data Field A2N1
Data Field A1N2
Data Field A2N3

Account O
Data Field A2O1
Data Field A2O2

. . .

Machine Learning Model 906

Prioritization 904

Deterministic Technique 908

Listing 902

Account M
Data Field A1M1
Data Field A2M1
Data Field A1M2
Data Field A2M2
Data Field A1M3

Account N
Data Field A1N1
Data Field A2N1
Data Field A1N2
Data Field A2N2
Data Field A2N3

Account O
Data Field A2O1
Data Field A2O2

Financial Institution

Account Data (Real Time)

Account Data

Authentication Platform

Institution Data 1202

Formatted Data 1204

Machine Learning Model 1206

Synchronized Data 1208

User_Profile_A

User_Profile_B

· · ·

User_Profile_n

Machine Learning
Model 1306

Time Series Data
1304

Synchronized
Data 1302

1300

Figure 14A:
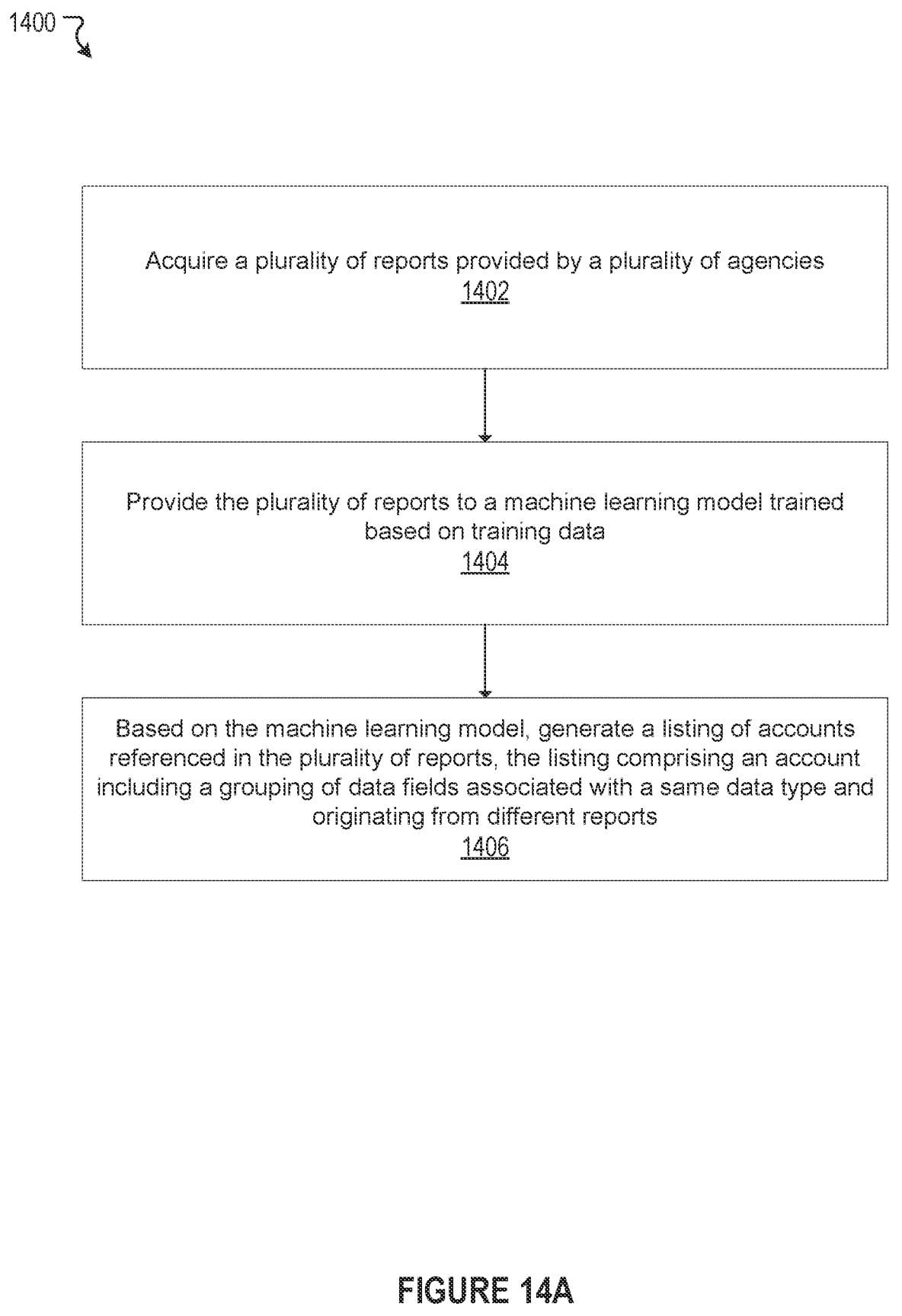

1400

Acquire a plurality of reports provided by a plurality of agencies
1402

Provide the plurality of reports to a machine learning model trained
based on training data
1404

Based on the machine learning model, generate a listing of accounts
referenced in the plurality of reports, the listing comprising an account
including a grouping of data fields associated with a same data type and
originating from different reports
1406

Figure 14B:
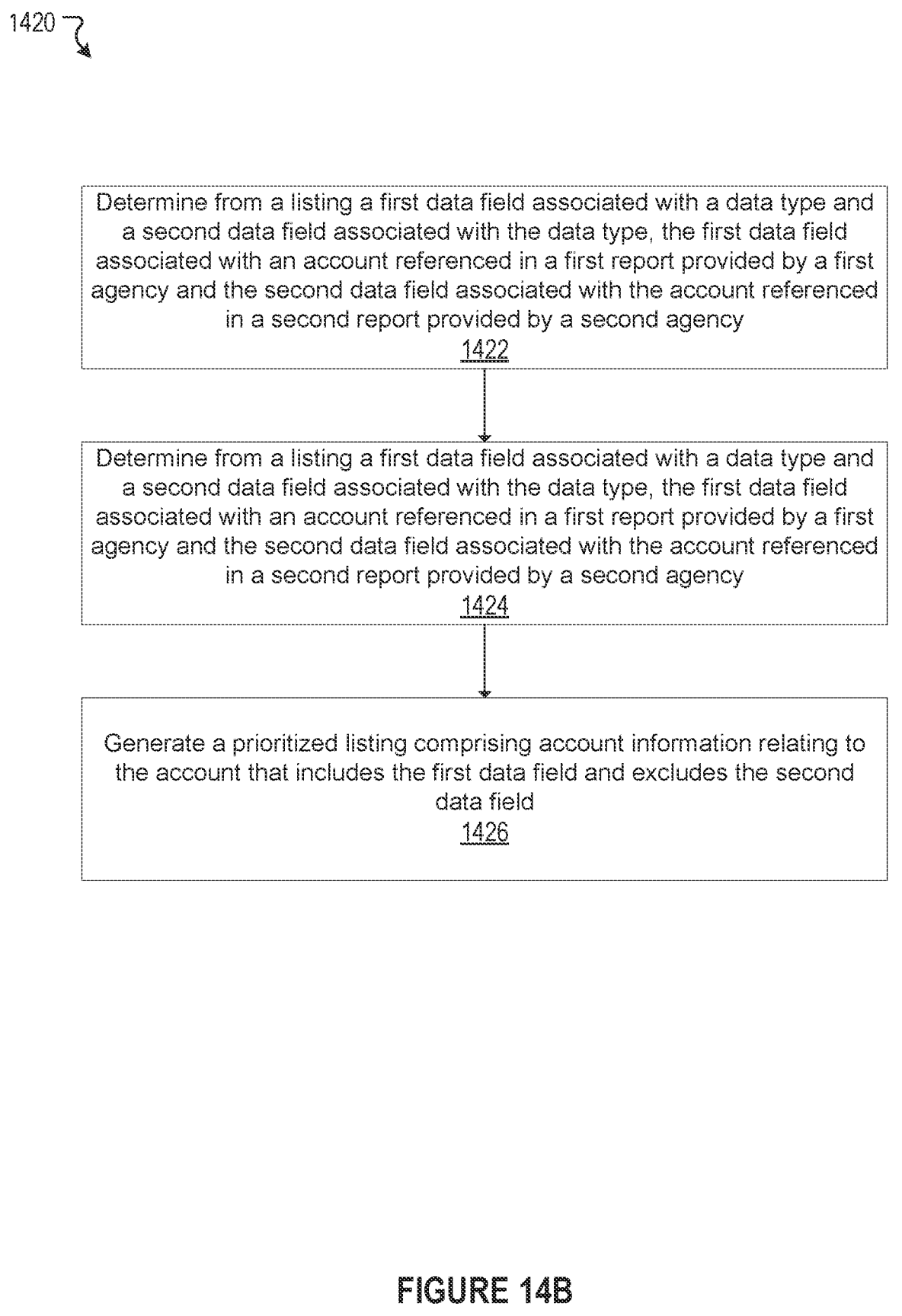

Determine from a listing a first data field associated with a data type and a second data field associated with the data type, the first data field associated with an account referenced in a first report provided by a first agency and the second data field associated with the account referenced in a second report provided by a second agency
1422

Determine from a listing a first data field associated with a data type and a second data field associated with the data type, the first data field associated with an account referenced in a first report provided by a first agency and the second data field associated with the account referenced in a second report provided by a second agency
1424

Generate a prioritized listing comprising account information relating to the account that includes the first data field and excludes the second data field
1426

Figure 14C:
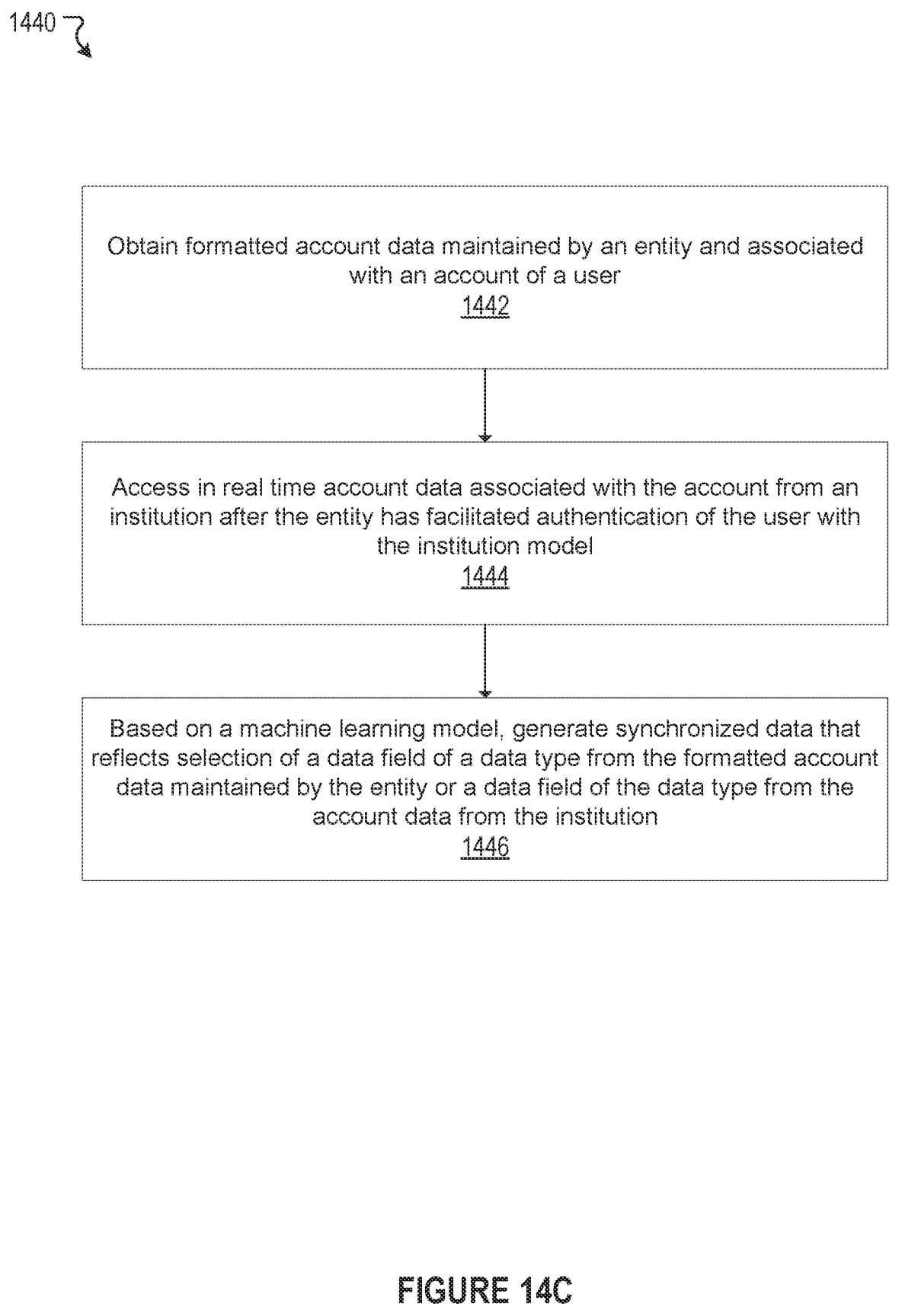

Obtain formatted account data maintained by an entity and associated
with an account of a user
1442

Access in real time account data associated with the account from an
institution after the entity has facilitated authentication of the user with
the institution model
1444

Based on a machine learning model, generate synchronized data that
reflects selection of a data field of a data type from the formatted account
data maintained by the entity or a data field of the data type from the
account data from the institution
1446

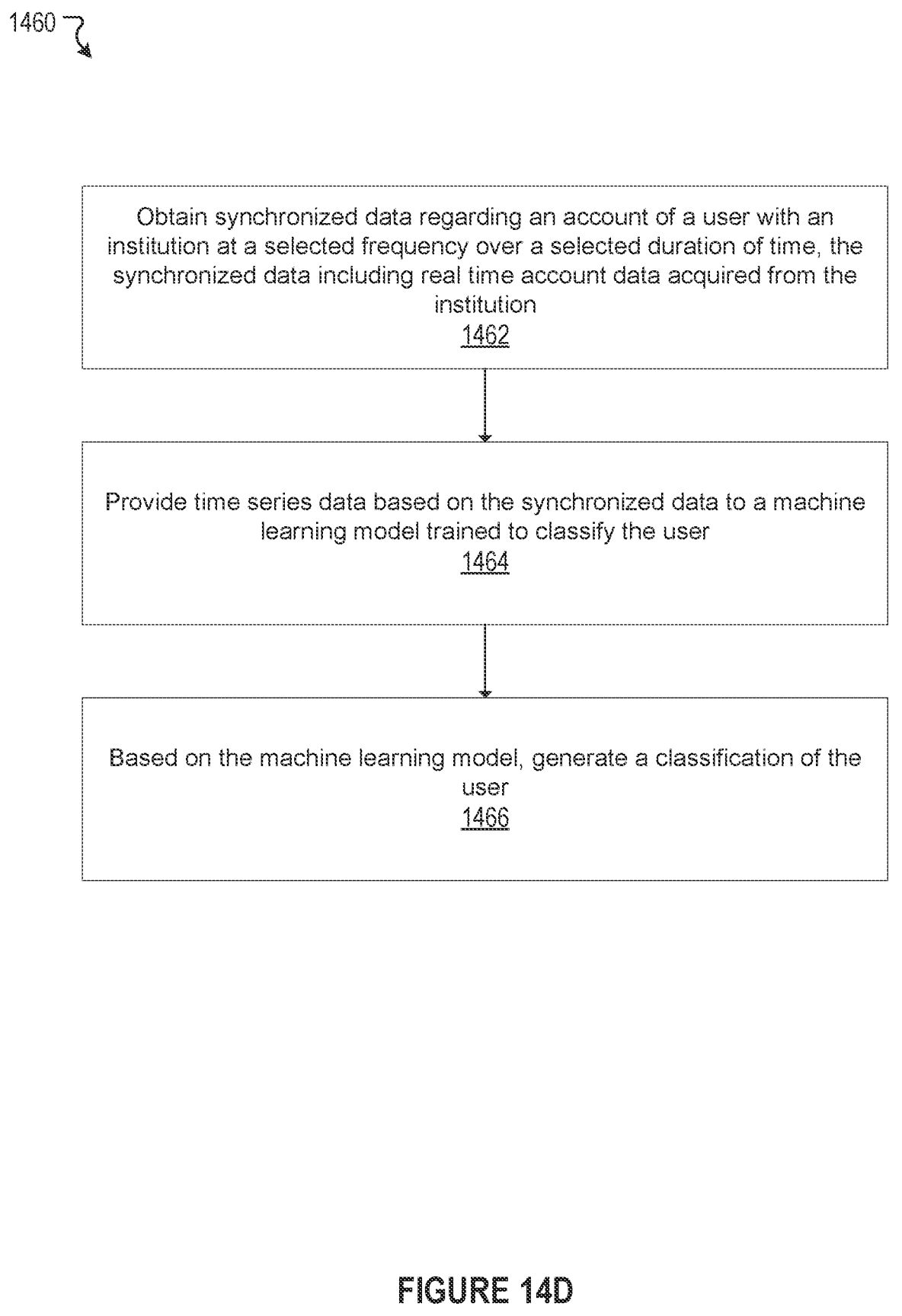

Obtain synchronized data regarding an account of a user with an institution at a selected frequency over a selected duration of time, the synchronized data including real time account data acquired from the institution
1462

Provide time series data based on the synchronized data to a machine learning model trained to classify the user
1464

Based on the machine learning model, generate a classification of the user
1466

FIGURE 14D

MACHINE LEARNING BASED AUTHENTICATION AND REAL TIME DATA ACCESS WITH DISPARATE COMMUNICATION NETWORKS

CROSS-REFERENCE TO RELATED APPLICATIONS

This application is a continuation-in-part of U.S. application Ser. No. 18/509,183, filed on Nov. 14, 2023 and entitled "Authentication Platform for Secure Access to Disparate Communication Networks", which claims priority to U.S. Provisional Patent Application No. 63/533,468, filed on Aug. 18, 2023 and entitled "Authentication Platform For Secure Access To Disparate Communication Networks", which are incorporated herein by reference in their entireties.

FIELD OF THE INVENTION

The present technology relates to the field of communication networks. More particularly, the present technology relates to a centralized authentication platform to access protected real time data maintained in a variety of secure networks.

BACKGROUND

In communication networks, authentication is a process that verifies the identity of a user or computer system before providing access to sensitive information. Authentication is often performed or controlled by an institution maintaining the sensitive information that is to be accessed. Proper authentication ensures that only authorized users or computer systems obtain access to protected data.

SUMMARY

Various embodiments of the present technology can include systems, methods, and non-transitory computer readable media configured to perform operations comprising acquiring a plurality of reports provided by a plurality of agencies; providing the plurality of reports to a machine learning model trained based on training data; and based on the machine learning model, generating a listing of accounts referenced in the plurality of reports, the listing comprising an account including a grouping of data fields associated with a same data type and originating from different reports.

In some embodiments, an example of the training data comprises i) a first report from a first agency and a second report from a second agency and ii) a listing of accounts referenced in the first report and the second report.

In some embodiments, the listing in the training data includes a data field associated with a reference to the first agency or the second agency from which the data field originates.

In some embodiments, the first report and the second report include a same account number for a first account, and the listing in the training data includes a grouping of data fields relating to the first account from the first report and data fields relating to the first account from the second report.

In some embodiments, key data types or values therefor relating to a first account in the first report satisfy a threshold level of similarity with key data types or values therefor relating to a second account in the second report, the first report not including an account number of the first account or the second report not including an account number of the second account, and wherein the listing in the training data includes a grouping of data fields relating to the first account from the first report and data fields relating to the second account from the second report.

In some embodiments, the first report in the training data includes a first data field relating to a first account associated with a data type, the second report in the training data includes a second data field relating to the first account associated with the data type, and the listing in the training data includes the first account with a grouping of the first data field and the second data field associated with the data type.

In some embodiments, the first report in the training data includes a data field relating to a first account and associated with a data type, the second report of the training data does not include a data field relating to the first account and associated with the data type, and the listing in the training data includes the first account with the data field from the first report associated with the data type.

In some embodiments, the machine learning model is a large language model, wherein the operations further comprise: fine tuning the large language model based on the training data.

In some embodiments, the plurality of agencies are determined based on a use case associated with a type of service in which a user has interest.

In some embodiments, the plurality of agencies are determined based on a second machine learning model trained based on training data including features relating to the use case, the features including at least one of a service provider associated with an application being utilized by the user, a type of service provided by the service provider, and a type of service associated with a screen of the application with which the user has interacted.

Various embodiments of the present technology can include systems, methods, and non-transitory computer readable media configured to perform operations comprising determining from a listing a first data field associated with a data type and a second data field associated with the data type, the first data field associated with an account referenced in a first report provided by a first agency and the second data field associated with the account referenced in a second report provided by a second agency; and generating a prioritized listing comprising account information relating to the account that includes the first data field and excludes the second data field.

In some embodiments, the generating is based on a large language model, and the large language model is fine tuned based on training data.

In some embodiments, an example of the training data comprises i) a listing including an account associated with a particular account type and data fields from a plurality of agencies and ii) a prioritized listing including the account with a data field of a particular agency that is more informative than other agencies in relation to the particular account type and without data fields of other agencies.

In some embodiments, an example of the training data comprises i) a listing including an account associated with a particular account type, a particular institution, and data fields from a plurality of agencies and ii) a prioritized listing including the account with a data field of a particular agency that is more informative than other agencies in relation to the particular account type and the particular institution and without data fields of other agencies.

In some embodiments, an example of the training data comprises i) a listing including an account associated with data fields of a particular data type from a plurality of agencies, each data field indicating a date and ii) a prioritized listing including the account with a data field that indicates a date that is most recent or furthest in the future and without data fields that indicate other dates.

In some embodiments, a system of machine learning models is traversed to identify a machine learning model associated with a context relating to at least one of a particular type of the account or a particular institution associated with the account.

In some embodiments, based on the machine learning model, the account information in the prioritized listing is transformed to be represented in a predetermined format associated with the machine learning model.

In some embodiments, the account information represented in the predetermined format is mapped in a database to agencies from which the account information originated and to the account.

In some embodiments, the system of machine learning models includes a general machine learning model at a first level, one or more machine learning models associated with institutions at a second level, and one or more machine learning models associated with types of accounts for the institutions at a third level.

In some embodiments, each machine learning model in the system is a large language model that has been fine tuned by an entity that controls the computing system.

Various embodiments of the present technology can include systems, methods, and non-transitory computer readable media configured to perform operations comprising obtaining formatted account data maintained by an entity and associated with an account of a user; accessing in real time account data associated with the account from an institution after the entity has facilitated authentication of the user with the institution; and based on a machine learning model, generating synchronized data that reflects selection of a data field of a data type from the formatted account data maintained by the entity or a data field of the data type from the account data from the institution.

In some embodiments, the generating synchronized data comprises: standardizing account data from the institution to be consistent with formatted data maintained by the entity, wherein a label associated with the data field of the account data from the institution is determined to be equivalent to the data type associated with the data field of the formatted account data.

In some embodiments, the selection of the data field from the formatted account data or the data field from the institution is based on recency or availability of the data field from the formatted account data and the data field from the institution.

In some embodiments, the synchronized data excludes the data field from the institution based on a determination that the data field from the institution is inaccurate or unreliable.

In some embodiments, an example of training data to train the machine learning model comprises i) account data from an institution including a data field associated with a data type and ii) synchronized data associating the data field from the institution with a standardized data type specified by the entity that is equivalent to the data type.

In some embodiments, an example of training data to train the machine learning model comprises i) account data from an institution including a data field associated with a data type and account data from formatted data maintained by the entity including a data field associated with the data type and ii) synchronized data including the data field in the account data from the institution and excluding the data field in the account data from the formatted data, the data type relating to at least one of next due amount and current balance.

In some embodiments, an example of training data to train the machine learning model comprises i) account data from an institution including a data field associated with a data type and account data from formatted data maintained by the entity including a data field associated with the data type and ii) synchronized data including the data field in the account data from the formatted data and excluding the data field in the account data from the institution, the data type relating to at least one of account closure, account number, interest rate, and original loan amount.

In some embodiments, a first example of training data to train the machine learning model at a first time comprises i) account data from an institution including a data field associated with a data type and account data from formatted data including a data field associated with the data type and ii) synchronized data including the data field in the account data from the institution and excluding the data field in the account data from the formatted data, and a second example of training data to train the machine learning model at a second time comprises i) account data from an institution including a data field associated with a data type and account data from formatted data including a data field associated with the data type and ii) synchronized data including the data field in the account data from the formatted data and excluding the data field in the account data from the institution.

In some embodiments, an example of training data to train the machine learning model comprises i) account data from an institution including a data field that is determined to be unreliable or incorrect and ii) synchronized data excluding the data field.

In some embodiments, the machine learning model is a large language model, the operations further comprising: fine tuning the large language model based on training data generated by the entity.

Various embodiments of the present technology can include systems, methods, and non-transitory computer readable media configured to perform operations comprising obtaining synchronized data regarding an account of a user with an institution at a selected frequency over a selected duration of time, the synchronized data including real time account data acquired from the institution; providing time series data based on the synchronized data to a machine learning model trained to classify the user, and based on the machine learning model, generating, by the computing system, a classification of the user.

In some embodiments, the synchronized data further includes account data from formatted data based on reports provided by an agency, the selected frequency greater than a frequency at which the reports are updated.

In some embodiments, the account data from the institution reflects usage patterns of the user relating to the account.

In some embodiments, the classification is one of transactor, revolver, dormant, or a subcategory of transactor, revolver, or dormant.

In some embodiments, an example of training data to train the machine learning model comprises i) a time series of synchronized data including real time account data relating to an account with an institution indicating that an individual consistently makes full payments of amounts due on the account and ii) a label indicating the individual is a transactor.

In some embodiments, an example of training data to train the machine learning model comprises i) a time series of synchronized data including real time account data relating to an account with an institution indicating that an individual consistently carries a balance on the account from one billing cycle to a next billing cycle and ii) a label indicating the individual is a revolver.

In some embodiments, an example of training data to train the machine learning model comprises i) a time series of synchronized data including real time account data relating to an account with an institution indicating that an individual consistently does not incur any liability on the account and ii) a label indicating the user is dormant.

In some embodiments, an example of training data to train the machine learning model comprises i) synchronized data constituting account data relating to an account of a user and non-account data and ii) a label indicating a level of financial risk posed by the user.

In some embodiments, based on the classification generated by the machine learning model, tailored financial products or services are targeted to the user.

In some embodiments, the operations further comprise: receiving an indication that the user is a customer of a service provider; and communicating the classification to the service provider, wherein the tailored products or services are offered by the service provider.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the present technology.

BRIEF DESCRIPTION OF THE DRAWINGS

FIG. 3B illustrates an example functional block diagram, according to an embodiment of the present technology.

FIGS. 6A-6K illustrate example views of an interface, according to an embodiment of the present technology.

FIG. 8 illustrates an example functional block diagram, according to an embodiment of the present technology.

FIG. 9 illustrates an example functional block diagram, according to an embodiment of the present technology.

6

Figure 12:
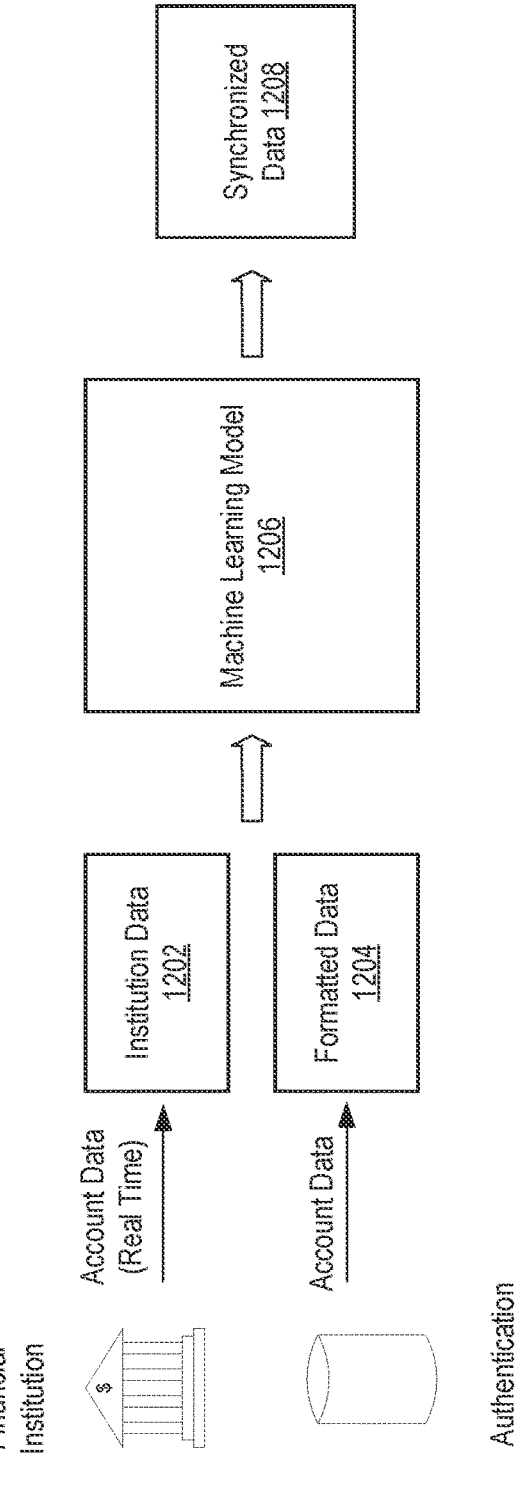

FIG. 12 illustrates an example functional block diagram, according to an embodiment of the present technology.

Figure 13:
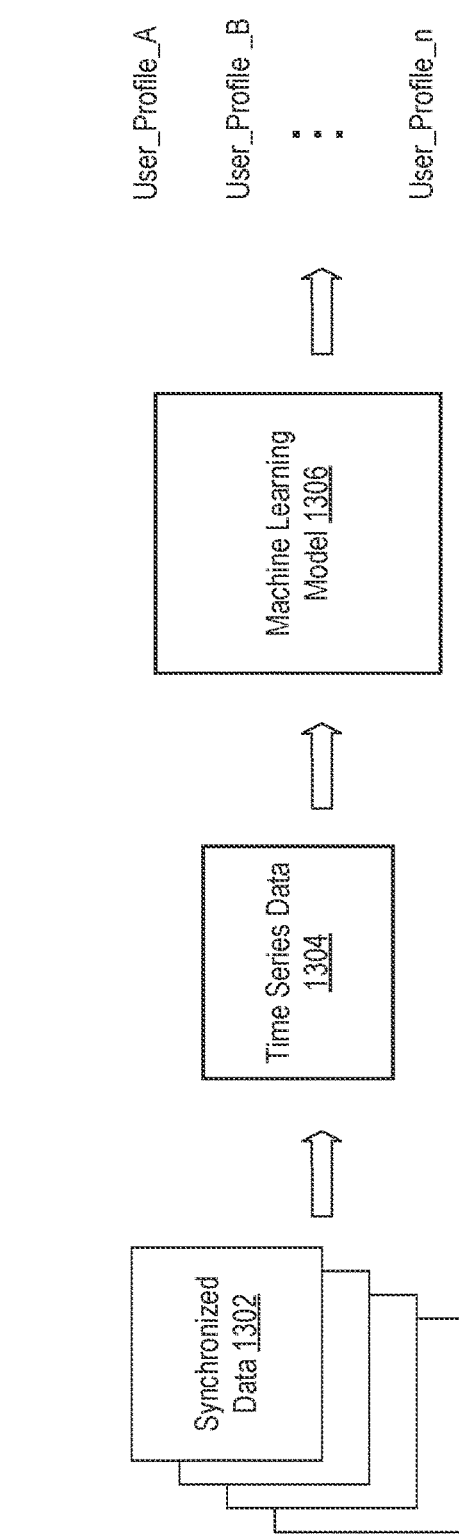

FIG. 13 illustrates an example functional block diagram, according to an embodiment of the present technology.

FIGS. 14A-14D illustrate example methods, according to an embodiment of the present technology.

Figure 15:
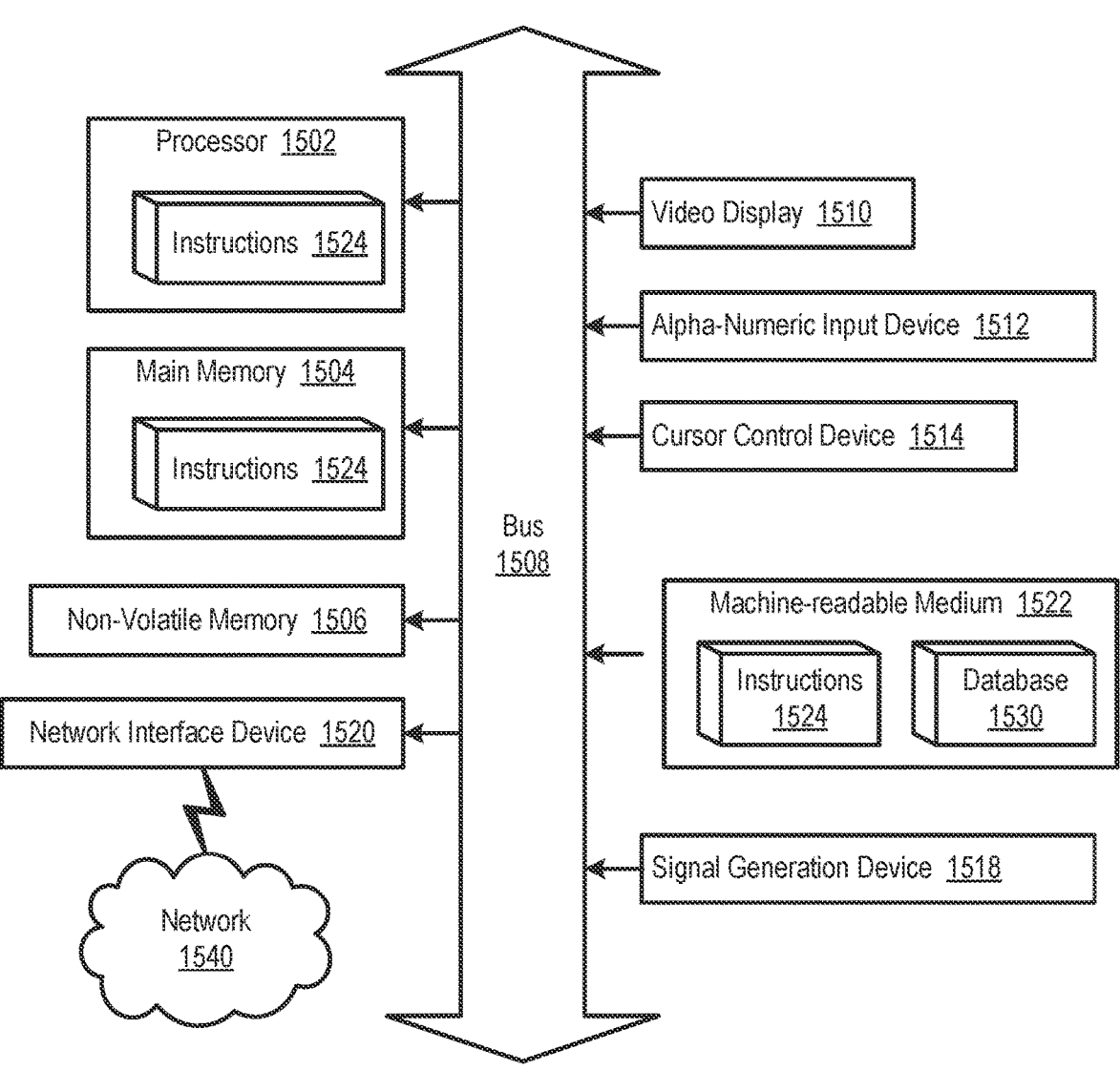

FIG. 15 illustrates an example computer system or computing device, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

In communication networks, authentication is a process that verifies the identity of a user or computer system before providing access to sensitive information. Authentication is often performed or controlled by an institution maintaining the sensitive information that is to be accessed. Proper authentication ensures that only authorized users or computer systems obtain access to protected data.

Conventional authentication techniques can involve credentials based authentication and token based authentication. In credentials based authentication, a username and a password are typically required to access sensitive information of a user. Possession of the username and the password of the user results in the ability to have potentially unlimited access to sensitive information maintained in an account of the user. Thus, transmission or other handling of credentials in potentially unsafe network environments poses substantial risk to the security of the sensitive information. As an alternative to credentials based authentication, token based authentication (e.g., the OAuth protocol) involves the use of a token to access sensitive information of a user. Credentials can be exchanged for a token. Submission of the token, not credentials, to a secure network allows the holder of the token to access the sensitive information maintained by the network according to constraints defined by the token. For example, the token may limit access by its holder to a certain timeframe or to certain types of protected data. If the token expires, continued access to protected data requires issuance of additional tokens.

Both credentials based authentication and token based authentication pose significant disadvantages. In credentials based authentication, the need of a user to repeatedly type username and password each time to access protected data in an account can be burdensome for the user. Moreover, when a user requires access to protected data in various accounts maintained by different institutions, entry of multiple sets of credentials is required, further compounding the burden on the user. Token based authentication, which can moderate some disadvantages in credentials based authentication poses its own problems. As one example, token based authentication can be technically challenging to implement for organizations. This problem can be especially acute for smaller sized organizations that lack in house IT expertise in data security and the resources needed to acquire it.

An improved approach rooted in computer technology overcomes the foregoing and other disadvantages associated with conventional approaches specifically arising in the realm of computer technology. The present technology can advantageously allow a user to securely access protected data in multiple accounts maintained by different institutions (e.g., financial institutions) across different protected networks—and securely share access to the protected data— without the need for credentials based authentication or token based authentication. The user can be prompted by an authentication platform to provide a predetermined, limited amount and type of identification information. In some instances, the user can be prompted through a component controlled by the authentication platform that is embedded in an application controlled by a service provider separate from the authentication platform. For example, the authentication platform may prompt the user to provide only the name of the user and the mobile phone number of the user as the identification information.

Based on receipt of the identification information from the user, the authentication platform can acquire additional information about the user from various resources, such as mobile network operators, data sources, and agencies. The additional information can be supportive of a determination regarding whether the user can be authenticated with the authentication platform. In this regard, the authentication platform can obtain mobile information from a mobile network operator providing mobile services to the mobile phone of the user. In addition, the authentication platform can obtain reports (e.g., credit reports, identity verification reports, biographical information, etc.) from various data sources that perform identity verification services. Further, the authentication platform can obtain reports (e.g., credit reports, account information, etc.) about the user from various agencies. Based on the acquired information, the authentication platform can generate a risk level for the user. In some instances, the risk level can be based on an aggregate risk score determined from a risk scoring technique. In some instances, the risk level is determined based on a machine learning model that is trained based on training data that includes information acquired by the authentication platform from the various resources. Based on the determined risk level, the authentication platform can determine whether the user can be authenticated or not with the authentication platform.

The authentication module can generate and update a graph associated with the user. The graph can reflect information acquired by the authentication platform about the user. The graph can include nodes representing, for example, the user, various types of information identifying the user (e.g., personally identifiable information), different institutions to which the user has entrusted protected data, and different accounts controlled by the different institutions with which the protected data is associated. The graph can be updated to reflect changes in relationships between the user and different accounts with various institutions.

Based on the graph associated with the user, the authentication platform can present for the user a listing of accounts of the user. The user can be prompted to select from the listing certain accounts on which the user may wish to receive financial services or perform a transaction, such as a transaction additionally supported by the service provider. The authentication platform can utilize a system of machine learning models to determine how to authenticate the user for the accounts selected by the user. The system of machine learning models can include large language models reflecting a hierarchy of focus on different institutions and different types of accounts. For example, the machine learning models can be adapted for their respective focus based on prompt engineering or fine tuning. Each machine learning model can generate specific information, or authentication information, to authenticate the user for a particular type of account with an institution. The authentication platform can attempt authentication based on the authentication information. If the user can be successfully authenticated, the authentication information can be stored by the authentication platform for future attempts to authenticate for that particular type of account with the institution. Further, if the user can be successfully authenticated, the authentication information, or specific types of information required for authentication, that resulted in successful authentication can be reflected in the graph associated with the user.

The innovative capability of the authentication platform to achieve authentication of a user with an institution and to directly access real time account data allows the authentication platform to uniquely capture accurate, up to date information relating to an account with the institution and facilitate informed provision of services for the user. A use case relating to an intent of the user in seeking financial services can be determined. Based on the use case, reports, such as credit reports, relating to accounts of the user as generated by certain agencies can be selected through a routing technique. The reports can be merged for each account by selective combination of corresponding data fields from the reports. A machine learning model (e.g., large language model) can be utilized to prioritize certain data fields in account data over other data fields and to generate a listing of accounts relating to the user based on the prioritized data fields. The listing of accounts can be transformed or standardized, based on a machine learning model (e.g., large language model), to reflect a predetermined format specified by the authentication platform for each account. A database controlled by the authentication platform can maintain the formatted account data relating to each account as well as mappings to the corresponding account and to the agencies from which data in the formatted account data originated.

With permission of the user, the authentication platform can directly acquire real time account data regarding an account on demand or at a desired frequency. The acquisition of the account data allows the authentication platform to uniquely provide to the user fresh, up to date account information that reflects the current status of the account in a manner not possible from reports of agencies alone. In addition, the real time account data from an institution can be considered and selectively combined with corresponding formatted account data maintained by the authentication platform to generate synchronized data relating to the account. The synchronized data can constitute a complete, up to date description of all relevant information about an account. The authentication platform can display some or all synchronized data, including real time account data, associated with the accounts for the user. The generation of synchronized data can be based on a machine learning model (e.g., large language model). The synchronized data relating to an account can be obtained at different time points. The synchronized data obtained at different time points can be represented as time series data. Based on the time series data, a machine learning model can classify a user into one of a variety of possible classifications reflecting an inference about a financial profile or status of the user. The classification of the user can be utilized, for example, to target financial products and services for the user or to suggest certain transactions to be performed. More details relating to the present technology are provided herein.

Figure 1A:
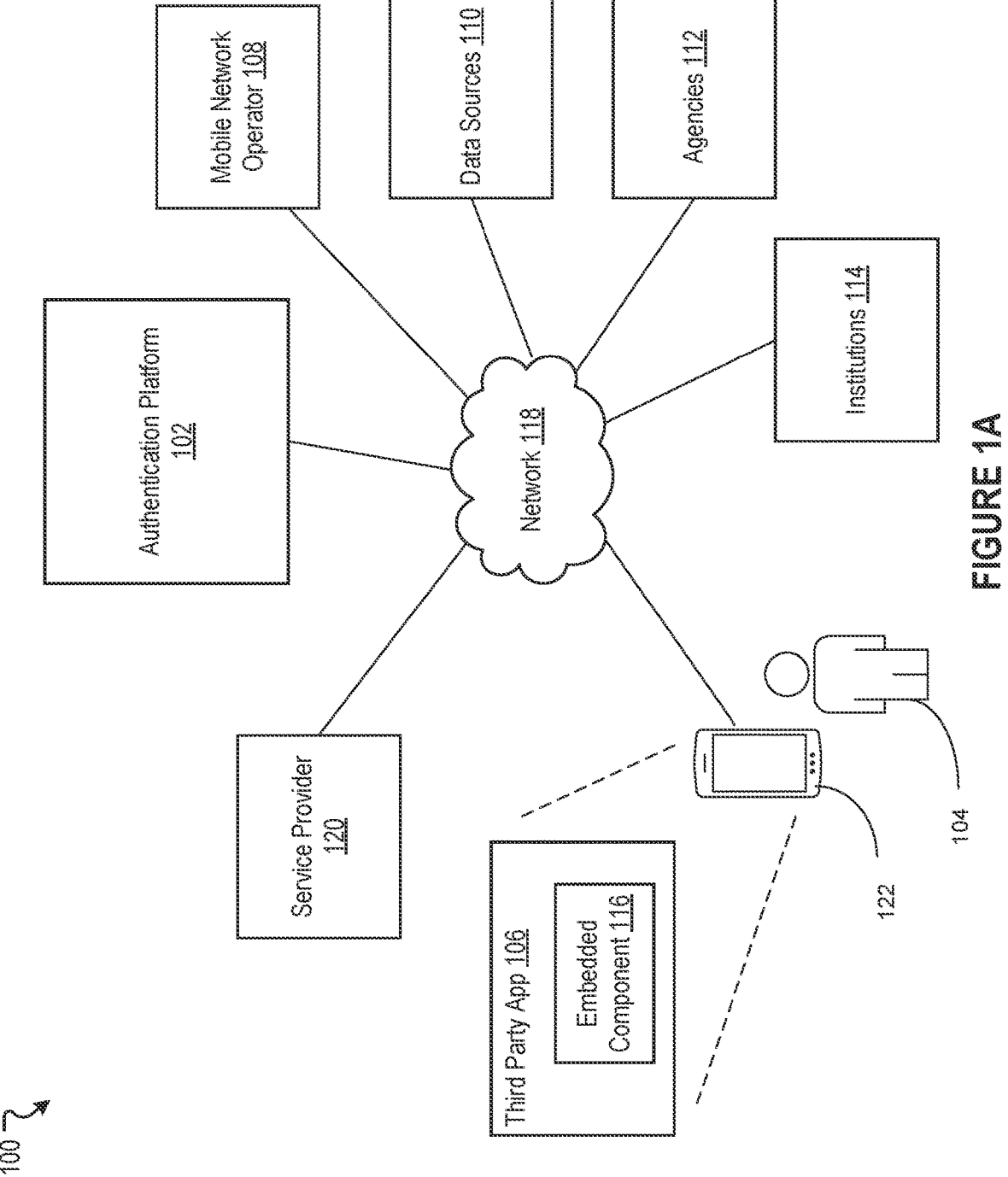
FIG. 1A illustrates an example system including an authentication platform, according to an embodiment of the present technology.

FIG. 1A illustrates an example system 100 including an authentication platform 102, according to an embodiment of the present technology. The authentication platform 102 can support multiple authentications to access protected data of a user 104. The authentications can be performed with secure networks in which accounts with various institutions 114 are maintained. As an example, one type of protected data accessible through the authentication platform 102 can include financial information of the user 104. For instance, the financial information can relate to accounts associated with financial liabilities assumed by the user 104. For example, the institutions 114 can include financial institutions such as banks, credit unions, insurance companies, brokerage firms, lenders, and investment dealers. A mobile phone (or other mobile computing device) 122 associated with the user 104 can allow the user to communicate with the authentication platform 102. A third party application 106 controlled by a service provider 120 can run on the mobile phone 122. For example, the service provider 120 can perform services on behalf of the user 104 in relation to the accounts of the user 104. The third party application 106 can include an embedded component (or utility) 116 supported and controlled by the authentication platform 102. The embedded component 116 can prompt the user 104 to provide identification information. For example, the identification information can include selected types of personally identifiable information (PII).

Based on receipt of the identification information, the authentication platform 102 can communicate with a mobile network operator 108 providing mobile services for the mobile phone 122 of the user 104. The authentication platform 102 can acquire information from the mobile network operator 108 to facilitate authentication of the user 104 with the authentication platform 102. In addition, based on the identification information provided by the user and information acquired from the mobile network operator 108, the authentication platform 102 can acquire additional information from data sources 110 and agencies 112 to facilitate authentication of the user 104 with the authentication platform 102. For example, the data sources 110 can provide identity verification services (e.g., KYC related services). For example, the agencies 112 can include agencies or bureaus. The identification information provided by the user and the information acquired from the mobile network operator 108, the data sources 110, and the agencies 112 can be utilized to determine a risk level for the user 104. The risk level can be determined, for example, by a risk scoring technique that utilizes a machine learning model to determine certain parameters for the risk scoring technique or by a machine learning model trained to predict risk levels. The risk level for the user 104 can indicate a probability that the user can be authenticated—i.e., a probability that the user is whom the user claims to be. Based on the risk level, the user 104 can be authenticated, or not authenticated, with the authentication platform 102.

The authentication platform 102 can utilize the information obtained from the resources, as reflected in a graph associated with the user 104, to determine a listing of accounts with institutions 114 that maintain protected data of the user 104. For example, one type of account can be a liability account. The listing of accounts can be displayed to the user 104. The authentication platform 102 can prompt the user 104 to select certain accounts from the listing on which the user 104 may wish to perform transactions through the authentication platform 102 and the service provider 120. Based on a system of machine learning models, the authentication platform 102 can determine the specific information required by a particular institution to authenticate for an account with the institution selected by the user. For each selected account with an institution, the authentication platform 102 can provide the institution the specific information that is required to authenticate with the account. The authentication platform 102 can provide a listing of accounts for which the user 104 has been successfully authenticated. The listing of accounts can include various types of real time data associated with the account. The user 104 can be prompted to enter instructions including parameters or preferences for any desired transaction to be performed on each account. The authentication platform 102 can share the instructions with the service provider 120 to initiate and facilitate performance of the transaction according to the instructions. The authentication platform 102 can implement various protections to safeguard data that is received or maintained, such as SOC (Service Organization Control) compliance and PCI (Payment Card Industry) compliance.

Communications among the authentication platform 102 and the third party application, 106, the embedded component 116, the mobile phone 122 of the user 104, the mobile network operator 108, the data sources 110, the agencies 112, the institutions 114, and other organizations can occur over a communication network 118. The communication network 118 can include any suitable communication medium or protocol supporting remote communication with the authentication platform 102. Application programming interfaces (APIs) supported by servers or backend systems of the authentication platform 102, the service provider 120, the mobile network operator 108, the data sources 110, the agencies 112, and the institutions 114 can support exchange of information, as described herein. More details regarding the design and operation of the authentication platform 102 in the system 100 are provided herein.

In some embodiments, the authentication platform 102 can be implemented by a server system. In some embodiments, some of the functionality of the authentication platform 102 can be performed by an application designed by the authentication platform 102 and running on a client computing device of a user. In some instances, the application can be or include a component or utility embedded in a different application controlled by a service provider in communication, collaboration, or partnership with the authentication platform 102. In some embodiments, the functionality of the authentication platform 102 can be distributed between a server and an application running on a client computing device. Although the present technology is sometimes herein described in relation to a platform for authentication to access financial accounts for purposes of illustration, the present technology can apply to an authentication platform to access any type of protected data and any type of account with any type of institution that is distributed over one or more secure networks controlled by various institutions. In some instances, the system 100 can include at least one data store (not shown) in communication with or integrated into the authentication platform 102. The data store can maintain information required to support operation of the authentication platform 102. For example, the data store can maintain information about users and their accounts with different institutions. The maintained information can include, for example, identification information associated with users, institutions with which users may have accounts, account information, graphs associated with users, reports and information provided by various resources, a risk scoring algorithm to facilitate authentication of users with the authentication platform 102, cutoff values defining risk levels, machine learning models to facilitate authentication of users with various institutions, authentication information that has resulted in successful authentication with institutions, and other information discussed herein that support operation of the authentication platform 102.

Figure 1B:
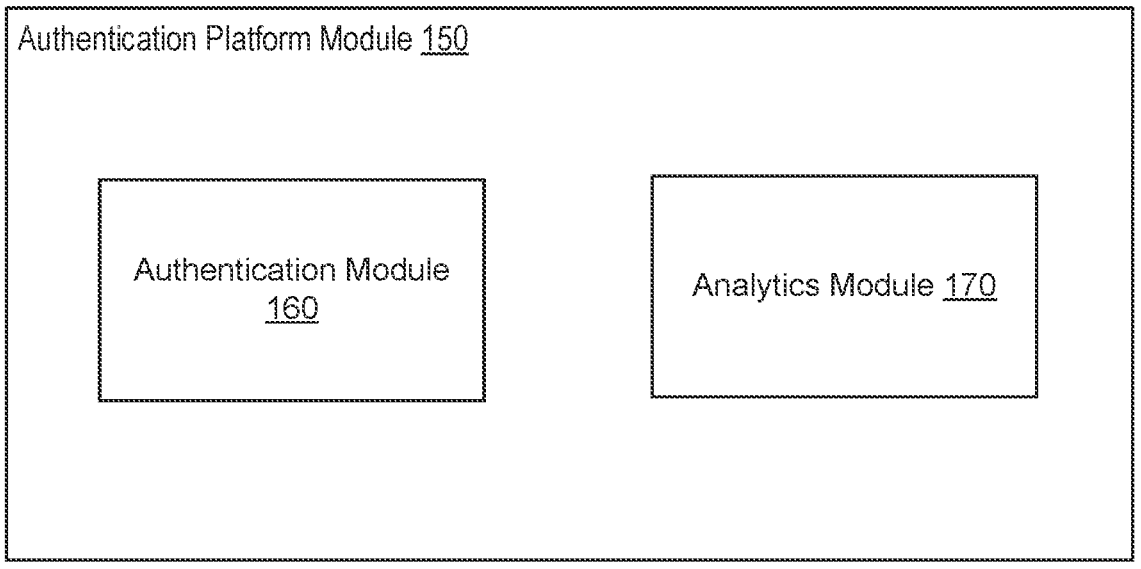
FIG. 1B illustrates an example authentication platform module, according to an embodiment of the present technology.

FIG. 1B illustrates an example authentication platform module 150, according to an embodiment of the present technology. In some embodiments, the authentication platform 102 can implement the authentication platform module 150. The authentication platform module 150 can include an authentication module 160 and an analytics module 170. The authentication module 160 can securely authenticate users with the authentication platform 102 and facilitate authentication of the users with various institutions with which the users can have accounts. The analytics module 170 can generate classifications of the users based on access to real time account data maintained by the institutions and reports provided by various agencies. More details regarding the authentication module 160 and the analytics module 170 are set forth herein.

Figure 2:
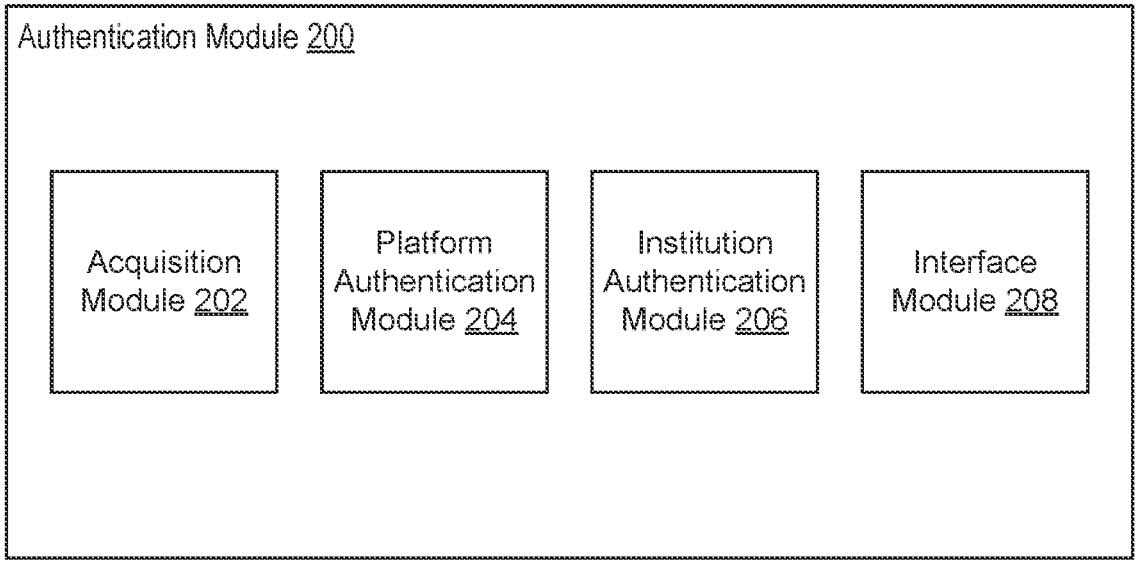
FIG. 2 illustrates an example authentication module, according to an embodiment of the present technology.

FIG. 2 illustrates an example authentication module 200, according to an embodiment of the present technology. In some embodiments, the authentication platform 102 and the authentication module 160 can implement the authentication module 200. The authentication module 200 can receive identification information provided by a user, such as the user 104. Based on the identification information, the authentication module 200 can automatically perform authentication with the authentication platform 102 as well as authentication with various institutions, such as the institutions 114, that securely maintain protected data of the user in various accounts. The authentication module 200 can access the protected data of the user as maintained by the various institutions and share access to the protected data as desired by the user. The authentication module 200 can include an acquisition module 202, platform authentication module 204, an institution authentication module 206, and an interface module 208. The components (e.g., modules, elements, features, functionality, operations, etc.) shown in this figure and all figures herein are exemplary only, and other implementations may include additional, fewer, integrated, or different components. Some components may not be shown so as not to obscure relevant details. In various embodiments, one or more of the functionalities described in connection with the acquisition module 202, the platform authentication module 204, the institution authentication module 206, and the interface module 208 can be implemented in any suitable combinations.

The acquisition module 202 can obtain information from various resources (e.g., mobile network operators, data sources, agencies, etc.) that can be utilized to authenticate the user with the authentication platform 102 and with various institutions maintaining protected data of the user. The acquisition module 202 can obtain identification information provided or entered by a user and authenticate the user with the authentication platform 102 and with various institutions without provision or entry by the user of any additional identification information (e.g., PII). For example, the identification information can include certain types of identification information, such as certain types of PII, of the user that are provided by the user. For instance, the certain types of identification information provided by the user can include the name of the user and the mobile phone number of the user. In some embodiments, the certain types of identification information provided by the user are limited to only the name of the user and the mobile phone number of the user. In some embodiments, the identification information provided by the user is limited to and does not exceed a predetermined number of types of identification information. For example, the identification information provided by the user can be limited to two types of PII (e.g., name and mobile phone number), or three types of PII (e.g., name, mobile phone number, and SSN), or some other selected number of types of PII. In some embodiments, after provision or entry by the user of the selected number of types of identification information, no other identification information or other type of identification information is requested or required from the user, or provided or entered by the user, to authenticate the user for the authentication platform 102 and for accounts with various institutions maintaining protected data of the user within their respective secure networks. In some embodiments, after provision by the user of the selected number of types of identification information, and without provision by the user of additional types of identification information, the authentication platform 102 may present to the user identification information associated with the user merely to request confirmation by the user of the correctness of the identification information.

The identification information provided by the user can be acquired through an embedded component, such as the embedded component 116, associated with the authentication platform 102. The embedded component can be integrated in or part of a separate application, such as the third party application 106, provided by a service provider, such as the service provider 120. For example, the separate application can be running on a mobile computing device, such as the mobile phone 122, of the user. Based on the embedded component, the mobile phone can access a server system associated with the authentication platform 102 through internet access provided to the mobile phone by a mobile network operator, such as the mobile network operator 108. In some embodiments, other types of information can be obtained from the user.

The acquisition module 202 can prompt the mobile network operator based on the identification information provided by the user to perform a verification and a silent network authentication (SNA). For example, in response to receipt of the name and the mobile phone number provided by the user, and with the consent of the user, the acquisition module 202 in real time can request the mobile network operator to verify that the mobile phone number is correctly associated with (or belongs to) the name. Further, the acquisition module 202 can request the mobile network operator to verify that the mobile phone number provided by the user is the same mobile phone number that accessed or communicated with the backend or server system (e.g., web server) of the authentication platform 102. Such verifications can be utilized in authentication of the user, as discussed in more detail herein. In addition, with consent provided by the user, the acquisition module 202 can obtain from the mobile network operator additional PII associated with the user, such as date of birth, address, or the like. For example, consent of the user can be provided through the embedded component.

The acquisition module 202 can obtain information from various data sources, such as the data sources 110. The identification information associated with the user, including the identification information provided by the user and the identification information obtained from the mobile network operator, can be provided by the acquisition module 202 to the data sources. For example, a data source can include, for example, an identity verification provider. Based on the identification information associated with the user, the data source can perform, for example, various searches and checks on the user, such as KYC (Know Your Customer) or AML (Anti-Money Laundering) related diligence. Information relating to the results of such searches and checks in relation to the user can be included in a report that is provided from the data source to the acquisition module 202. A report from a data source can contain different types of information, or features, regarding a user that can inform a decision regarding whether to authenticate the user. Different data sources can provide different types of information about the user to the acquisition module 202.

The types of information provided by the data sources can include, for example, features relating to various types of identification information (e.g., PII) associated with the user. The types of information provided by the data sources can include PII of the user including, for example, an address of the user, a date of birth of the user, a social security number of the user, and the like. In addition, the types of information provided by the data sources can include, for example, features relating to mobile phone statuses associated with the user. For example, the types of information can indicate that the user acquired a new SIM or new mobile phone and the date of the acquisition, that the mobile phone has been stolen, that the mobile phone has been disabled or enabled, and the like. Further, the types of information provided by the data source can include, for example, features relating to matching and mismatching between the identification information provided by the user and corresponding information maintained or discovered by the data source. For example, as discussed, the identification information provided by the user can include the name and the mobile phone number of the user. In this example, the types of information provided by the data source can include an indication that the mobile phone number provided by the user is different from a mobile phone number for the user as independently determined by the data source. As another example, the types of information provided by the data source can include an indication that an SSN provided by the user is the same as an SSN for the user as independently determined by the data source. As yet another example, the types of information provided by the data source can include an indication that an address provided by the user is different from an address for the user as independently determined by the data source. The types of information provided by the data source also can include, for example, an indication of an absence of records or data accessible by the data source that correspond to identification information provided by the user and a related indication that the accuracy of the identification information provided by the user was not able to be verified by the data source.

Further, the types of information provided by the data source can include, for example, scores. A score can be associated with each feature (or characteristic) provided in a report by the data source. In some instances, a score associated with a particular feature can indicate an estimate regarding the probability of the feature. For example, the score can be a first value (e.g., value of 0) indicating low probability or a second value (e.g., value of 1) indicating high probability. As just one example, the data source can provide to the acquisition module 202 a score for a feature corresponding to a mismatched address of the user. In this example, the score for the feature is an indication by the data source of a probability that the address of the user is mismatched.

In addition, the types of information provided by the data source can include, for example, a risk code (or risk tag). The data source can provide to the acquisition module 202 a variety of risk codes that describe or indicate discovered statuses, conditions, or activities associated with the user. In some instances, the risk codes can describe legality, propriety, or risk in a potential relationship or interactions with the user. For example, a risk code can indicate that the user appears in an OFAC (Office of Foreign Asset Control) list (e.g., SDN List (List of Specially Designated Nationals and Blocked Persons), NS-MBS List (Non-SDN Menu-Based Sanctions List), etc.). As another example, a risk code can indicate that the mobile phone number of the user is associated with an IP address linked to a country sanctioned by OFAC. As yet another example, risk codes can indicate that identification information provided by the user and corresponding information accessible by the data source do not match (e.g., phone numbers are mismatched, last names are mismatched, etc.).

The acquisition module 202 can obtain information from various agencies, such as the agencies 112. The identification information provided by the user as well as the other identification information obtained by the acquisition module 202 can be provided by the acquisition module 202 to an agency. For example, an agency can include a reporting bureau or reporting agency. The agency can return a report for the user. The report can include various types of information, such as details about tradelines and liability accounts of the user, institutions associated with the liability accounts, public records such as bankruptcies involving the user, and a list of institutions that have asked to see the report of the user. In addition, the report can contain various fraud alerts and other flags concerning the user, such as an indication that the identity of the user has been reported as threatened or stolen.

The platform authentication module 204 can determine a risk level associated with the user to inform whether the user can be (or should be) authenticated with the authentication platform 102. The platform authentication module 204 can implement a risk scoring technique to generate an aggregate risk score associated with the user. The aggregate risk score can indicate a risk level associated with the user that informs whether the user can be authenticated with the authentication platform 102. The risk scoring technique can include an aggregation of various terms associated with certain types of information obtained by the acquisition module 202. The terms aggregated in the risk scoring algorithm can correspond to selected information provided by a mobile network operator and selected information from the reports provided by the data sources and agencies. The selected information provided by a mobile network operator and the selected information from the reports provided by the data sources and agencies constitute features corresponding to the terms on which the risk scoring technique is based. The aggregation can be, for example, an average, sum, or other combination or calculation involving component scores that correspond to the individual terms.

Each term can correspond to a feature associated with the user, as described herein. For example, the risk scoring technique can include terms corresponding to features relating to whether the mobile network operator has verified the association between the mobile phone number and the name provided by the user and whether the mobile network operator has verified possession of the mobile phone through SNA, as discussed herein. As another example, the risk scoring technique can include terms corresponding to features relating to mismatches (or matches) in the PII of the user, such as a mismatched name of the user, a mismatched address of the user, etc. In some instances, mismatched identification information can be determined by a data source alone. In some instances, mismatched identification information can be determined by the acquisition module 202. For instance, the acquisition module 202 may receive inconsistent indications or values for a particular type of identification information (e.g., SSN, address, etc.) from a data source versus from an agency. As another example, the risk scoring technique can include terms corresponding to features relating to the status of the mobile phone of the user, such as whether the mobile phone was recently stolen, whether the mobile phone is disabled, etc. As indicated, the features used in the risk scoring technique can be a selection, or portion, of all features (or characteristics) set forth in the information provided by the resources. The features can be selected by the authentication platform 102 based on their importance in contributing to an accurate determination of a risk level that informs whether to authenticate the user. For example, the selected features can be those features that have a potential impact on the financial health or status of an individual or implicate a risk associated with OFAC related considerations.

A term can reflect the combination of a score for a feature as provided by the data sources or the authentication platform 102 as well as a weight that represents the importance of the feature in determination of an accurate aggregate risk score for the user. For example, the combination of the score for the feature and the weight can be a multiplication of the score for the feature and the weight to generate a component score for the corresponding term. The risk scoring technique can include a selected combination of terms corresponding to a selected combination of features known by the acquisition module 202. The selected combination of terms corresponding to the selected combination of features is configurable and can vary depending on the implementation. For example, in some instances, the risk scoring technique can include a first set of terms corresponding to a first set of features. In other instances, the risk scoring technique can include a second set of terms corresponding to a second set of features, where the second set of terms corresponding to the second set of features is different from the first set of terms corresponding to the first set of features.

In some embodiments, the platform authentication module 204 can cause a machine learning model (e.g., neural network) to generate the weights to be applied to features to determine component scores for corresponding terms in the risk scoring technique. Based on training data, the machine learning model can be trained to generate the weight for each feature selected for inclusion in the risk scoring technique. The training data can be generated based on a variety of techniques. For example, training data can be generated from manual determinations of weights for features. The manual determination of weights for features in accordance with a deterministic model, as described in more detail below, can be accumulated and used as training data to train the machine learning model. During a training phase, a particular weight value can be assigned to a particular feature based on the relative importance of the feature in generating an accurate aggregate risk score. In some instances, during the training phase, a weight value associated with a feature can change as the importance of the feature changes. Accordingly, the weight for a feature can change during an evaluation phase based on the machine learning model. For example, assume that a feature relates to an address mismatch. In one instance, the address mismatch can have a first weight value. In another instance, information provided by a data source can indicate that the user recently moved residences. As a result, in this instance, the address mismatch can have a second weight value (e.g., a value of 0) that is less than the first weight value. In some embodiments, the weights generated by the machine learning model can be subject to an independent analytical check. For example, the platform authentication module 204 can determine whether the weights are within predetermined ranges that constrain the values of weights. If a generated weight falls outside a predetermined range associated with the weight, the weight can be reconfigured to have a value that falls inside the predetermined range. Further, the machine learning model can be retrained based on the reconfigured weight. As another example, the machine learning model can determine a weight for a particular feature (or features) that otherwise would result in (or would not preclude) authentication of the user. However, if the presence of the particular feature is deemed by the authentication platform 102 to be determinative of a decision not to authenticate the user with the authentication platform 102, then the weight for the feature as determined by the machine learning model can be discarded or demoted in importance.

In some embodiments, the weights to be applied to features to determine component scores for corresponding terms in the risk scoring technique can be generated by a deterministic model. For example, manual prioritization of each feature in relation to its importance in the generation of an accurate aggregate risk score can inform the appropriate value of a weight for the feature. For example, it may be determined that a first feature (e.g., mismatched SSNs) is more important than a second feature (e.g., mismatched addresses) in the determination of an accurate aggregate risk score for the user. In this example, the platform authentication module 204 can assign a weight for the first feature that is relatively larger than a weight assigned for the second feature. As another example, it may be determined that a third feature (e.g., recently stolen mobile phone) is more important than a fourth feature (e.g., matching dates of birth) in the determination of an accurate aggregate risk score for the user. In this example, the platform authentication module 204 can assign a weight for the third feature that is relatively larger than a weight assigned for the fourth feature. In some instances, the sole presence of a feature or set of features may be determined to be dispositive or determinative of a certain value (or range of values) for an aggregate risk score or for a particular risk level. For instance, a first feature (e.g., unmatched name), a second feature (e.g., unmatched mobile phone number), or a third feature (e.g., failed verification through SNA), or any combination of these or other features can be assigned relatively large weights so that, when a selected feature or combination of features is deemed to be present, the component scores of their corresponding terms will contribute to the determination of a desired value for an aggregate risk score (e.g., an aggregate risk score corresponding to high risk) or a desired risk level (e.g., high risk). For example, a relatively large weight can be assigned to a feature relating to a mobile phone number that does not match a name and a relatively large weight can be assigned to a feature relating to a failed verification through SNA. In this example, the presence (or high probability) of the features can result in components scores for terms corresponding to these features that most influence or dictate the value of the aggregate risk score or cause the aggregate risk score to be associated with a certain risk level (e.g., high risk). Many variations are possible. In some embodiments, the weights determined through the deterministic model can be used to train the machine learning model that generates the weights to be applied to features in the risk scoring technique discussed herein.

Based on the aggregate risk score, the platform authentication module 204 can determine a risk level for the user. In some embodiments, the risk level can be a binary designation, such as a first designation of risk (e.g., high risk level) or a second designation of risk (e.g., low risk level). In the example of a binary designation, the platform authentication module 204 can specify a cutoff value that separates a first portion of a range of possible risk values from a second portion of the range of possible risk values. In some embodiments, the cutoff value is selected as the value at the midpoint in the range of possible risk values. If the aggregate risk score generated by the platform authentication module 204 falls into the first portion of the range of possible risk values, the user can be associated with a first designation of risk corresponding to the first portion, such as "high risk". If the aggregate risk score generated by the platform authentication module 204 falls into the second portion of the range of possible risk values, the user can be associated with a second designation of risk corresponding to the second portion, such as "low risk". A designation of high risk can be associated with a determination by the platform authentication module 204 that the user cannot (or should not) be authenticated and a designation of low risk can be associated with a determination by the platform authentication module 204 that the user can (or should) be authenticated. In some embodiments, the risk level can be a nonbinary designation, such as a first risk level, a second risk level, and a third risk level that are defined in relation to a range of possible risk values. For example, a first portion of the range of possible risk values can correspond to the first risk level, a second portion of the range of possible risk values can correspond to the second risk level, a third portion of the range of possible risk values can correspond to the third risk level. In this example, the platform authentication module 204 can specify a first cutoff value separating the first risk level and the second risk level and a second cutoff value separating the second risk level and the third risk level. Further, in this example, an aggregate risk score generated by the platform authentication module 204 that falls into the first portion of the range of possible risk values can be associated with the first risk level, such as "high risk": an aggregate risk score generated by the platform authentication module 204 that falls into the third portion of the range of possible risk values can be associated with a third risk level, such as "low risk"; and, an aggregate risk score generated by the platform authentication module 204 that falls into the second portion of the range of possible risk values can be associated with a second risk level, such as "medium risk". In the event of the aggregate risk score resulting in a designation of medium risk, the platform authentication module 204 can take further action to determine the identify the user. For example, the platform authentication module 204 can repeatedly prompt the user to provide additional identification information (e.g., such as PII) and, based on the additional identification information, determine additional aggregate risk scores, or update the aggregate risk score, until an aggregate risk score results in "high risk" or "low risk". Many variations are possible.

In some embodiments, the platform authentication module 204 can select a cutoff value that is not the value at the midpoint in the range of risk values. For example, the cutoff value in a range of risk values can be configurable based on various considerations, such as the types or amount of identification information provided by the user to the authentication platform 102, the data sources that are utilized by the authentication platform 102, and the number of matches and mismatches that were identified by the data sources. For example, assume that a first user provides two types of PII to the authentication platform 102 in a first instance and that a second user provides five types of PII to the authentication platform 102 in a second instance. In these instances, different levels of matching are expected in view of the different amounts of PII provided. Accordingly, in this example, the platform authentication module 204 can select a cutoff value in the range of risk values in the first instance that is different from the cutoff value in the range of risk values in the second instance. For instance, the portion of the range of risk values associated with authentication in the first instance can be larger than the portion of the range of risk values associated with authentication in the second instance. As another example, the cutoff value can be a first cutoff value for a first data source and a second cutoff value for a second data source. Many variations are possible.

Figure 3A:
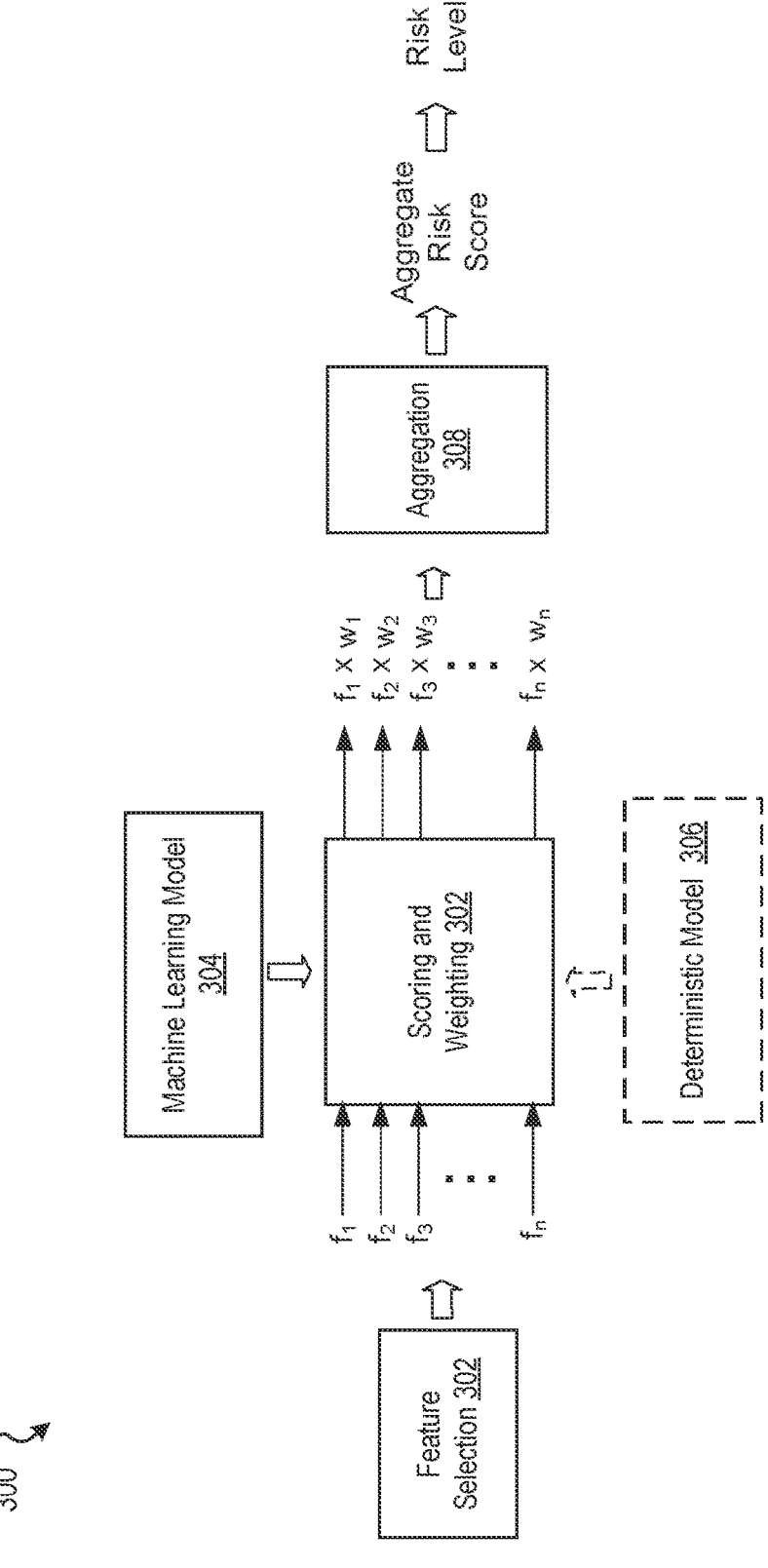
FIG. 3A illustrates an example functional block diagram, according to an embodiment of the present technology.

FIG. 3A illustrates an example functional block diagram 300 relating to the risk scoring technique, according to an embodiment of the present technology. In some embodiments, the functional block diagram 300 can be implemented by the platform authentication module 204. At 302, certain features from information obtained by the acquisition module 202 from the resources can be selected for the risk scoring technique. Each selected feature can be associated with a term. A term corresponding to a feature can include a score relating to the feature and a weight for the feature. In some embodiments, a machine learning model 304 can determine weights for the features. In some embodiments, a deterministic model 306 can determine weights for the features. For each term, a combination (e.g., multiplication) of the score for a feature and the weight for the feature can result in a component score associated with the term. At 308, the component scores associated with the terms corresponding to the selected features can be aggregated (i.e., summed). Aggregation of the terms can generate an aggregate risk score. Based on the aggregate risk score, a risk level for the user can be determined. The risk level can indicate whether the user can be authenticated with the authentication platform 102.

In some embodiments, the platform authentication module 204 can generate a risk level for the user based on a machine learning model. The machine learning model can be configured to generate the risk level based on training data. In some embodiments, the training data can include examples associated with information provided by the data sources. In some embodiments, the training data examples can include all features in reports provided by the data sources. In addition, the training data can include labels based on selected risk tags provided by the data sources. As discussed, risk tags and their associated levels of risk can be provided by the data sources. The levels of risk (e.g., high risk level, low risk level) associated with a selection of the risk tags provided by the data sources can be utilized as labels in the training data. For example, the selection of risk tags associated with levels of risk that are utilized as labels can include risk tags indicating that the user appears in an OFAC SDN List or Non-SDN MBS List or that the mobile phone number of the user is associated with an IP address linked to a country sanctioned by OFAC. As another example, the selection of risk tags associated with levels of risk that are utilized as labels can include risk tags indicating that the user is a politically exposed person (PEP). In some instances, some of the risk tags (e.g., mismatching last name) and their associated levels of risk provided by the data sources are not utilized as labels for the training data. In addition, the training data can include sets of features associated with users and corresponding labels based on determinations made by the authentication module 200. For example, the authentication module 200 may conclude that the presence (or absence) of certain features in a set of features for a user indicates that the user can not be authenticated. In this example, the training data can include a label, which is generated by the authentication module 200 for the set of features associated with the user, that indicates high risk. For instance, when a set of features for a user includes a feature relating to a discrepancy in the SSN of the user, the authentication module 200 can generate a label associated with high risk for the associated training data example. Many variations are possible.

FIG. 3B illustrates an example functional block diagram 350 relating to determination of a risk level based on a machine learning model, according to an embodiment of the present technology. In some embodiments, the functional block diagram 350 can be implemented by the platform authentication module 204. A machine learning model 352 (e.g., neural network) is configured to generate a risk level for a user. In contrast to the risk scoring technique, the risk level generated by the machine learning model 352 can be based on all (or some) known features of the user as provided by the resources. The machine learning model 352 can be trained based on training data that includes all, or a subset of, information provided by the mobile network operator and information (e.g., features and associated scores) provided by the data sources and agencies. As discussed, the training data can include labels corresponding to certain risk codes provided by the data sources. In some embodiments, the training data can include labels that are generated by the authentication module 200. The authentication module 200 can further customize the machine learning model 352 by providing desired labels for the presence of certain features. For example, the authentication module 200 can specify a label of "high risk" when the mobile phone number provided by the user does not match the name provided by the user, no matter the presence (or absence) of other features associated with the user.

Based on information obtained by the acquisition module 202, the institution authentication module 206 can generate a graph associated with the user to support authentication with an institution. The institution authentication module 206 can generate a separate graph for each user authenticated (or to be authenticated) by the authentication platform 102. The graph can contain pertinent information about the user and accounts of the user to support authentication of the user with an institution. The graph can include a node representing the user. The node representing the user can be connected to nodes representing different types of data that can be used to authenticate the user. For example, the data used to authenticate the user can include various types of PII, such as name, mobile phone number, SSN, date of birth, address, and the like. Each item of PII can be represented by a separate node. The node representing the user also can be connected to one or more nodes representing one or more reports issued by various agencies. In addition, the node representing the user can be connected to one or more nodes representing accounts of the user. Each node representing an account can contain information about the liability account, such as an account number, the type of account, an interest rate for account, and the like. The type of account can be, for example, credit card, student loan, mortgage, etc. The node representing an account can be connected to a node representing an institution, such as an institution, associated with the liability account. For example, the institution can be a bank, credit union, mortgage servicer, etc.

The graph can be dynamically configured so that, as new information about the user and accounts of the user are obtained by the authentication module 200, the graph is automatically updated. The graph can be automatically updated based on new information received from any resource, such as a mobile network operator, a data source, or an agency. For example, if the acquisition module 202 receives new PII associated with the user (e.g., date of birth), a node in the graph associated with the user can be created to represent the new type of PII. As another example, if the acquisition module 202 receives an update to PII associated with the user (e.g., address), the node representing the PII can be revised to reflect the updated PII. In this example, the PII that was updated can be retained as historical information and used to evaluate mismatched features. As yet another example, if the acquisition module 202 obtains information reflecting a new account assumed by the user (e.g., credit card account), a node in the graph associated with the user can be generated to represent the new liability account. As yet still another example, if the acquisition module 202 obtains information that the institution to which an account is associated has changed (e.g., sale of mortgage), the node representing the institution can be updated to reflect the new institution. Any changes relating to the user and the accounts of the user can be reflected in the graph. In some embodiments, graphs associated with different users can overlap when, for example, the users are both associated with a particular account. For example, when users are joint account holders of an account, the graphs of the users may show nodes representing each user that are connected to a common node representing the account.

Figure 4A:
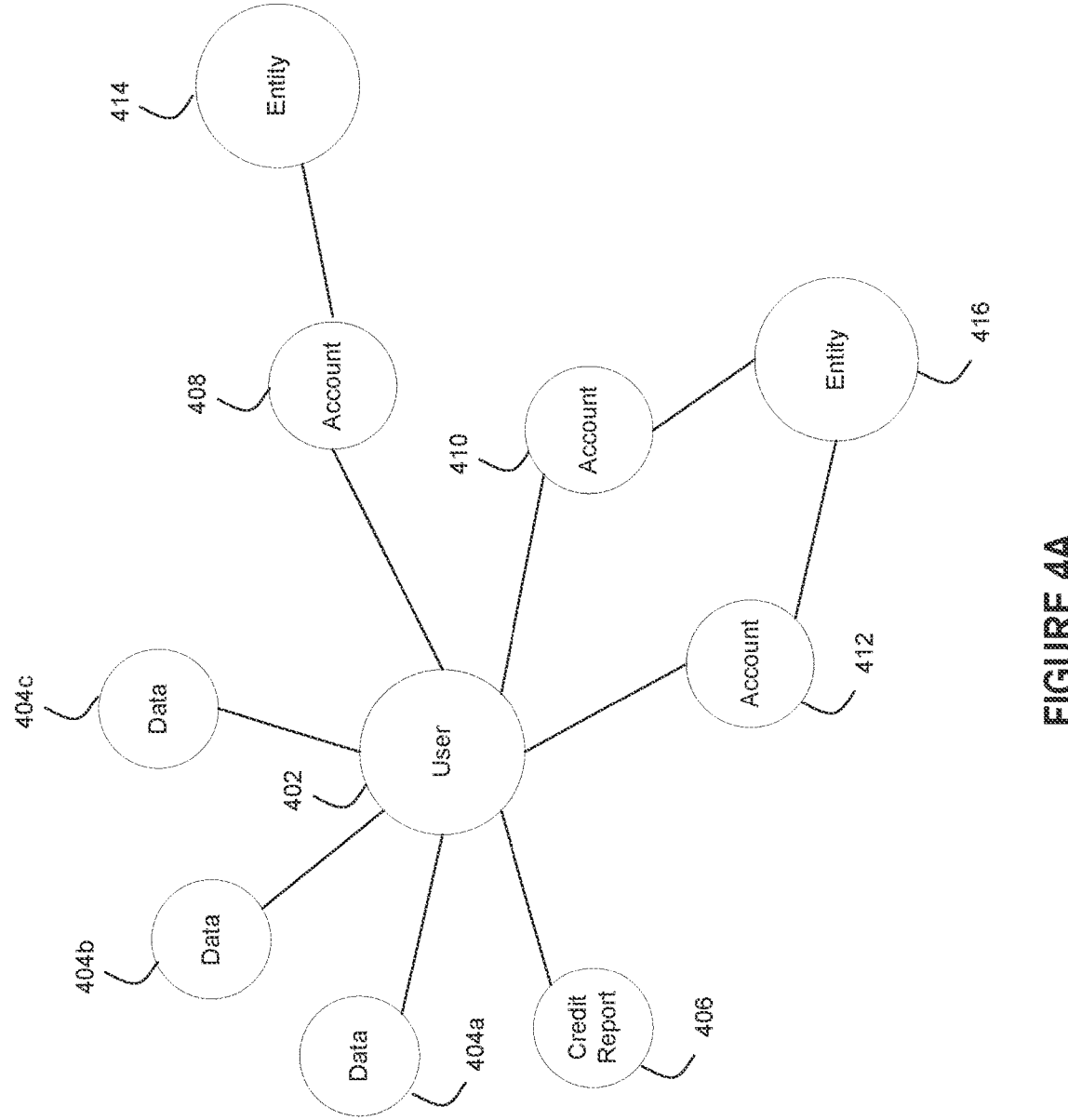
FIG. 4A illustrates an example graph, according to an embodiment of the present technology.
Figure 4B:
FIG. 4B illustrates an example graph, according to an embodiment of the present technology.

FIGS. 4A-4B illustrate an example of a graph 400 supporting authentication, according to an embodiment of the present technology. In FIG. 4A, the graph 400 can represent a user, identification information associated with the user, accounts of the user with various institutions, and other information. In some embodiments, the graph 400 can be a directed, heterogeneous knowledge graph representing information to facilitate authentication of the user with the authentication platform 102 and with different accounts of the user with various institutions. The graph 400 can include a node 402 representing the user. The node 402 can be connected to nodes 404a-404c that represent data that can be utilized to authenticate the user. For example, the nodes 404a-404c can represent various types of identification information (e.g., PII) associated with the user, such as name, mobile phone number, SSN, address, date of birth, and the like. Although three nodes representing identification information are shown for purposes of illustration, any number of nodes can be used in the graph 400 to represent identification information that is known about the user. The node 402 can be connected to a node 406 representing a report about the user provided by a agency. In addition, the node 402 can be connected to nodes 408, 410, 412 representing different accounts of the user. For example, the accounts can include liability accounts, such as credit card accounts, mortgage accounts, student loan accounts, etc. Although three nodes representing accounts are shown for purposes of illustration, any number of accounts associated with the user can be reflected as nodes in the graph 400. The node 408 representing the associated account can be connected to a node 414 representing an institution, such as a first institution that is managing the account. Likewise, the nodes 410, 412 representing the associated accounts can be connected to a node 416 representing a second institution, such as an institution that is managing both of the accounts. The graph 400 also can include information representing authentication information that, when provided for an account with an institution, results in authentication of the user for the account. For example, the specific types of authentication information required to authenticate the user for an account with an institution can be reflected through an edge of the graph 400 that connects the node 402 representing the user and a node representing the account.

The graph 400 can be automatically regenerated or updated to reflect changes so that the graph 400 provides an accurate, up to date profile of the user and accounts of the user. For example, information obtained by the acquisition module 202 can indicate that information in the graph 400 warrants updating. In contrast to FIG. 4A, the graph 400 as shown in FIG. 4B reflects changes to the user and accounts of the user. For example, the graph 400 can generate an additional node 404*d* representing a new item of data (e.g., new type of PII) that can be utilized to authenticate the user. As another example, the node 414 can be updated to reflect a different institution that is managing the account represented by the node 408. For instance, the account may have been sold or otherwise transferred from the previous institution to a new institution. As yet another example, the graph 400 can include an additional node 418 representing a new account. The node 418 can be connected to a new node 420 representing a new institution (e.g., institution) that is managing the account represented by the node 418.

The institution authentication module 206 can utilize the graph 400 to authenticate the user for selected accounts with certain institutions. The graph 400 can be used to provide to a user a comprehensive listing of accounts with various institutions from which the user can select certain accounts to access protected data or share access to protected data to perform transactions. The institution authentication module 206 can receive from the user a selection of institutions with which to authenticate through the embedded component. The embedded component can prompt the user to select institutions with which to authenticate so that the user can access the protected data maintained by the institutions or provide access to the protected data to a third party.

Based on an indication by a user to obtain or share access to protected data associated with an account managed by a particular institution, the institution authentication module 206 can perform a graph search to locate the node representing the account. Once located in the graph, the node representing the account can indicate, for example, the account number, the type of account, and the interest rate applied to the account. The institution authentication module 206 also can traverse the graph by proceeding along an edge connecting the node representing the account to a node representing the institution that is managing the account. The node representing the institution can indicate, for example, the name of the institution.

Based on information reflected in the graph, the institution authentication module 206 can access a system, or hierarchy, of machine learning models exhibiting inheritance to perform authentication of the user for an account with an institution that is selected by the user. For example, the system of machine learning models can include large language models or generative pretrained transformers. The system of machine learning models can be maintained by the authentication platform 102 or an organization separate from 102 that provides access to trained machine learning models through APIs. For example, the machine learning models of the system can be adapted from one or more pretrained machine learning models offered by an organization that is separate from the authentication platform 102. The machine learning models can be adapted by fine tuning or prompt engineering performed by the institution authentication module 206. The machine learning models as adapted can have varying capabilities and focus in relation to authentication of users for different accounts managed by different institutions. In response to receipt of certain or all information maintained by the authentication platform 102 regarding the user (e.g., PII, account information, etc.), a machine learning model can provide authentication information (or authentication vector) that constitutes or specifies the particular types and formats of information required to authenticate the user for an account with an institution. The authentication information also can identify the true institution to which the information required for authentication should be provided.

Figure 5:
FIG. 5 illustrates an example system of machine learning models, according to an embodiment of the present technology.

FIG. 5 illustrates an example of a system 500 of machine learning models, according to an embodiment of the present technology. In some embodiments, the system 500 of machine learning models can include a general (or first) machine learning model (MLM) 502 in a first level that is trained to provide authentication information to authenticate a user for different types of accounts with various institutions. The general machine learning model 502 can provide authentication information to provide to an institution, such as certain PII of the user and other information about the account for which access is desired. In some embodiments, the system 500 of machine learning models also can include a next level (second level) of machine learning models that have been adapted to provide authentication information to authenticate a user for accounts with specific institutions. For example, in this level, a first institution machine learning model 504 can be configured to provide authentication information to authenticate a user for accounts with a first institution; a second institution machine learning model 506 can be configured to provide authentication information to authenticate a user for accounts with a second institution; and, an nth institution machine learning model 508 can be configured to provide authentication information to authenticate a user for accounts with an nth institution, where n is any value reflecting the number of institutions with which the authentication platform 102 can communicate to authenticate all users on the authentication platform 102. In this level, the first institution machine learning model 504 can be specially adapted to and tailored for authenticating with the first institution; the second institution machine learning model 506 is specially adapted to and tailored for authenticating with the second institution; and, the nth machine learning model 508 is specially adapted to and tailored for authenticating with the nth institution. For instance, the institutions can be various institutions, such as a particular bank, a particular mortgage servicer, a particular credit card issuer, a particular loan servicer, etc. The first institution machine learning model 504, the second institution machine learning model 506, and the nth institution machine learning model 508 can inherit general capabilities from the general machine learning model 502. The first institution machine learning model 504, the second institution machine learning model 506, and the nth institution machine learning model 508 can adapt and tailor these general capabilities for their associated institutions. For example, the first institution machine learning model 504, the second institution machine learning model 506, and the nth institution machine learning model 508 can inherit capabilities associated with identification, expression, and provision of an account number for an account with an associated institution to authenticate the user. For instance, the first institution machine learning model 504 can inherit these capabilities, and further adapt and tailor these capabilities to identify and provide appropriate account numbers for authentication with the first institution. For example, the first institution may only accept account numbers provided in a particular format that is different from formats accepted by other institutions. The first institution machine learning model 504 can adapt and tailor capabilities inherited from the general machine learning model 502 to identify account numbers and provide the account numbers in the particular format required by the first institution.

In some embodiments, the system of machine learning models also can include a next level (third level) of machine learning models that have been adapted to provide authentication information to authenticate a user for particular types of accounts with each specific institution, such as an institution. For example, as shown in this level, the system 500 can include a plurality of machine learning models associated with different account types of the second institution. In this example, a first account type machine learning model 510 can be configured to provide authentication information to authenticate a user for a first type of account with the second institution; a second account type machine learning model 512 can be configured to provide authentication information to authenticate a user for a second type of account with the second institution; and, an mth account type machine learning model 514 can be configured to provide authentication information to authenticate a user for an mth type of account with the second institution, where m is any value reflecting the number of different types of accounts offered by the second institution. In this level, the first account type machine learning model 510 is specially adapted to and tailored for authenticating for the first type of account with the second institution; the second account type machine learning model 512 is specially adapted to and tailored for authenticating with the second type of account with the second institution; and, the mth account type machine learning model 514 is specially adapted to and tailored for authenticating with the mth type of account with the institution. For instance, the types of accounts with the second institution or other institution can include credit card accounts, student loan accounts, mortgage accounts, auto loan accounts, etc. Although machine learning models for different account types are associated with the second institution in FIG. 5 for purposes of illustration, the system 500 can also include machine learning models for different account types associated with the first institution or another institution.

While the foregoing examples relate to a system of machine learning models having three levels for purposes of illustration, a system of machine learning models in accordance with the present technology can have any suitable number of levels (e.g., two levels, four levels, five levels, etc.). Further, while the foregoing examples describe a system that increases focus from a general machine learning model at a first level, to machine learning models adapted to particular institutions at a second level, and to machine learning models adapted to specific types for accounts for a particular institution at a third level, a system of machine learning models in accordance with the present technology can include different narrowing focus over a plurality of levels. For example, the system can include increasing focus from a general machine learning model at a first level, to machine learning models adapted to particular types of accounts at a second level, and to machine learning models adapted to specific institutions for a particular type of account at a third level. Many variations are possible.

A system of machine learning models, like the system 500, can enable the institution authentication module 206 to determine an appropriate machine learning model to attempt authentication for a particular account with a particular institution selected by the user. When the user selects a particular account with a particular institution with which to authenticate, the institution authentication module 206 can hierarchically proceed through the system of machine learning models to find a machine learning model tailored to the selected account and institution. The identified machine learning model can be provided with relevant PII of the user and other information about the account. Based on the provided information, the machine learning model can provide authentication information identifying the information required for authentication with the selected account and institution. The institution authentication module 206 can provide the required information to authenticate the user for the selected account and institution. When the user is successfully authenticated with the selected account and institution, the authentication module 200 can obtain protected data of the account for the user to access and potentially share with other institutions. When the user is not successfully authenticated, the institution authentication module 206 can, for example, perform additional fine tuning or prompt engineering to adapt the capabilities of the machine learning model to output authentication information that will result in authentication. If the system of machine learning models does not include a machine learning model that is tailored for the selected account and institution at the third level of the system, the institution authentication module 206 can hierarchically proceed through the system of machine learning models to identify a machine learning model that is tailored to the institution at the second level of the system. If the machine learning model is identified, the machine learning model can be provided with relevant PII of the user and other information about the account. Based on the provided information, the machine learning model can provide authentication information identifying the information required for authentication with the selected account and institution, as described. If the system of machine learning models does not include a machine learning model that is tailored for the institution, the institution authentication module 206 instead can utilize the general machine learning model at the first level of the system. The general machine learning model can be provided with relevant PII of the user and other information about the account. Based on the provided information, the general machine learning model can provide authentication information identifying the information required for authentication with the selected account and institution, as described.

As just one example, assume the user desires to access protected data relating to a federal student loan managed by a particular loan servicer. The institution authentication module 206 can identify a machine learning model from the system that is tailored to provide authentication information to authenticate the user for federal student loans managed by the particular loan servicer. Upon receiving information associated with the user, the machine learning model can identify that the loan is a federal student loan based on an identifier of the federal student loan account. Further, the machine learning model can provide authentication information that includes a special prefix to be prepended to the identifier of the federal student loan account in order to properly authenticate the user in accordance with the requirements of the loan servicer. As another example, assume that the user desires access to protected data relating to a credit card account apparently sponsored by a retail store. The institution authentication module 206 can identify a machine learning model from the system that is tailored to provide authentication information to authenticate the user for credit card accounts sponsored by the retail store. Upon receiving information associated with the user, the machine learning model can determine that the retail store is merely a co-brand of the credit card account and that another bank is, in reality, the true lender managing the credit card account. Accordingly, in this example, the authentication information provided by the machine learning model can indicate not only the information required to authenticate the user but also the identity of the true institution, not the retail store, to which the information should be provided for authentication. The foregoing examples are merely illustrations. Other applications of the system of machine learning models and determinations of authentication information for authentication can be used in accordance with the present technology.

If the system of machine learning models does not include a machine learning model that is tailored for a selected account and institution at the third level of the system or a machine learning model that is tailored for the selected institution at the second level of the system, the institution authentication module 206 can newly adapt a machine learning model(s) that is accordingly tailored based on fine tuning or prompt engineering. The newly adapted machine learning model can be appropriately inserted into the hierarchy reflected in the system of machine learning models for future authentication tasks.

When the user is successfully authenticated, the authenticated status of the user can be maintained by the institution authentication module 206. For example, if a session with the embedded component was ended, or if the third-party application including the embedded component was closed or backgrounded on the mobile phone of the user, and the user again seeks to access or share access to protected data maintained in various accounts, the user need not re-enter identification information to be authenticated with the associated institutions. If the institutions require another authentication, the institution authentication module 206 can resubmit the authentication information associated with the user to authenticate the user for the desired accounts.

The institution authentication module 206 can store a record of a successful authentication. The institution authentication module 206 can create a record of the specific types of information that resulted in successful authentication. For example, the record may contain information regarding the particular type(s) of PII and other specific account information required by a particular institution for a particular type of account. For example, assume that the user was successfully authenticated for a credit card account with a particular bank. Assume further in this example that the user was successfully authenticated by providing to the bank the name of the user, the last four digits of the SSN of the user, and the first nine digits of the account number for the credit card account. In this example, the institution authentication module 206 can create a record indicating that, to authenticate a user for a credit card account with the bank, the name of the user, the last four digits of the SSN of the user, and the first ten digits of the account number for the credit card account are required. Records containing the specific information used for successful authentications can be maintained in a database or other knowledge repository managed by the 120. The database can accumulate records of successful authentications that have been previously facilitated through utilization of the system of machine learning models. When a request by any user seeks to access protected data associated with a particular type of account for a particular institution, the institution authentication module 206 can run a query against the database to quickly determine the specific types of information required for authentication. When the information required for authentication is found in the database, the system of machine learning models need not be utilized to determine authentication information for the particular type of account for the particular institution.

Figure 6D:
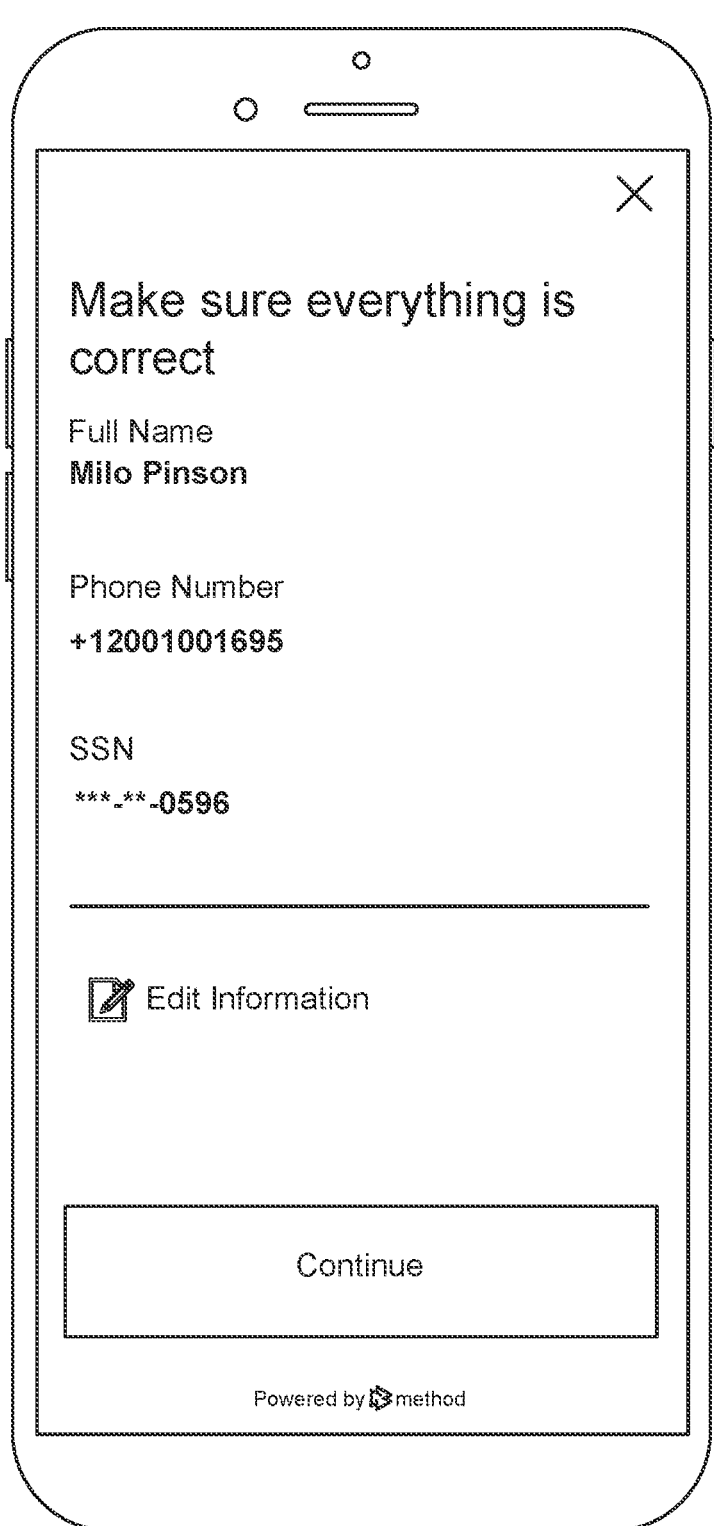

The interface module 208 can generate a series of views of an interface for presentation to the user. The interface can prompt the user for information, facilitate the authentication of the user with the authentication platform 102 and with one or more institutions maintaining protected data of the user, and securely provide access to the protected data. The interface can be presented through the embedded component that is integrated in or part of a larger application provided by a service provider in collaboration with the authentication platform 102, as discussed herein. FIGS. 6A-6K illustrate example views of an interface, according to an embodiment of the present technology. In some embodiments, the views of the interface can be generated by the interface module 208. The design and operation of the interface can be consistent with the described functionality of the authentication module 200. In FIG. 6A, a view 602 can inform the user about a collaboration between the service provider and the authentication platform 102. As shown, the service provider ("GradJoy") is a lender that engages with the authentication platform 102 to provide the user (or end user) access to protected data regarding accounts of the user and the capability to enter into transactions (e.g., payment rails) relating to the accounts. The user is provided with an overview of services offered by the service provider and certain disclosures within an authenticated environment of the service provider as reflected through the view 602. The service provider, through secure information handling with end-to-end encryption, can offer account linking, loan options, payment rails, etc. The view 602 also can prompt the user to agree to initiate an inquiry (e.g., soft credit inquiry) on behalf of the user. In addition, the view 602 can prompt the user to agree to certain terms, such as a privacy policy and terms of service, between the user and the authentication platform 102. For example, the terms can include a provision that permits the authentication platform 102 to contact a mobile network operator providing services to a mobile phone of the user and permits the mobile network operator to provide data of the user (e.g., PII) to the authentication platform 102 for authentication. The view 602 can include a button for the user to indicate consent and to advance. In FIG. 6B, a view 604 can prompt the user to enter the legal name of the user. The view 604 can include a button to advance. In FIG. 6C, a view 606 can prompt the user to enter a phone number. The view 606 can include a button to advance. After the user enters a phone number and selects the button, back-end processes of the authentication platform 102 can be triggered so that the user can be authenticated with the authentication platform 102 and for accounts with various institutions without the entry by the user of any additional identification information.

Verification or silent network authentication (SNA) can be initiated with a relevant mobile network operator to authenticate the user with the authentication platform 102. In addition, telecommunication related fraud detection technologies (e.g., SIM swap, porting, etc.) can be initiated to authenticate the user. If the user can be authenticated with the authentication platform 102, a data pre-fill technology can be initiated to pre-fill certain types of information for verification or modification by the user. In FIG. 6D, a view 608 can display the full name, phone number, and a partial SSN of the user based on a pre-fill technology. The view 608 includes an option for the user to edit the displayed information. The view 608 also can include a button for the user to confirm the correctness of the displayed or edited information about the user and to advance.

In FIGS. 6E-6F, views 610, 612 reflect vertical scrolling of the interface. The views 610, 612 can display the first name, last name, phone number, address, partial SSN, and date of birth based on a pre-fill technology. The views 610, 612 can include a button for the user to verify the correctness of the displayed information or to edit the displayed information. In addition, the views 610, 612 can include the button to permit the authentication platform 102 to obtain (e.g., soft-credit inquiry) and use information in a consumer report from one or more consumer agencies.

In FIG. 6G, a view 614 can provide a listing of various accounts of the user with different institutions. The listing can include headings to indicate grouping of different types of accounts. For example, as shown, accounts relating to auto loans, mortgages, and credit cards are grouped separately. A displayed container associated with each account can include various information, such as the name of the institution associated with the account, the type of account, the balance on the account, a logo of the institution, and an identifier of the account. The displayed container associated with each account also can include a selectable box to receive a possible selection (e.g., through a touch gesture to the box) of the account by the user. The user can select accounts that the user would like to be accessible to the service provider. The view 614 can include a button for the user to submit the selection of accounts. In some embodiments (not shown), the view 614 can provide further controls on access to each account. For example, the view 614 can allow the user to specify one type of protected data in the account to share with the service provider and specify a second type of protected data in the account that should not be shared with the service provider. As another example, the view 614 can allow the user to specify a limited duration of time in which a type of protected data can be accessible to the service provider. Many variations are possible.

Figure 6I:
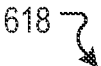
Figure 6J:
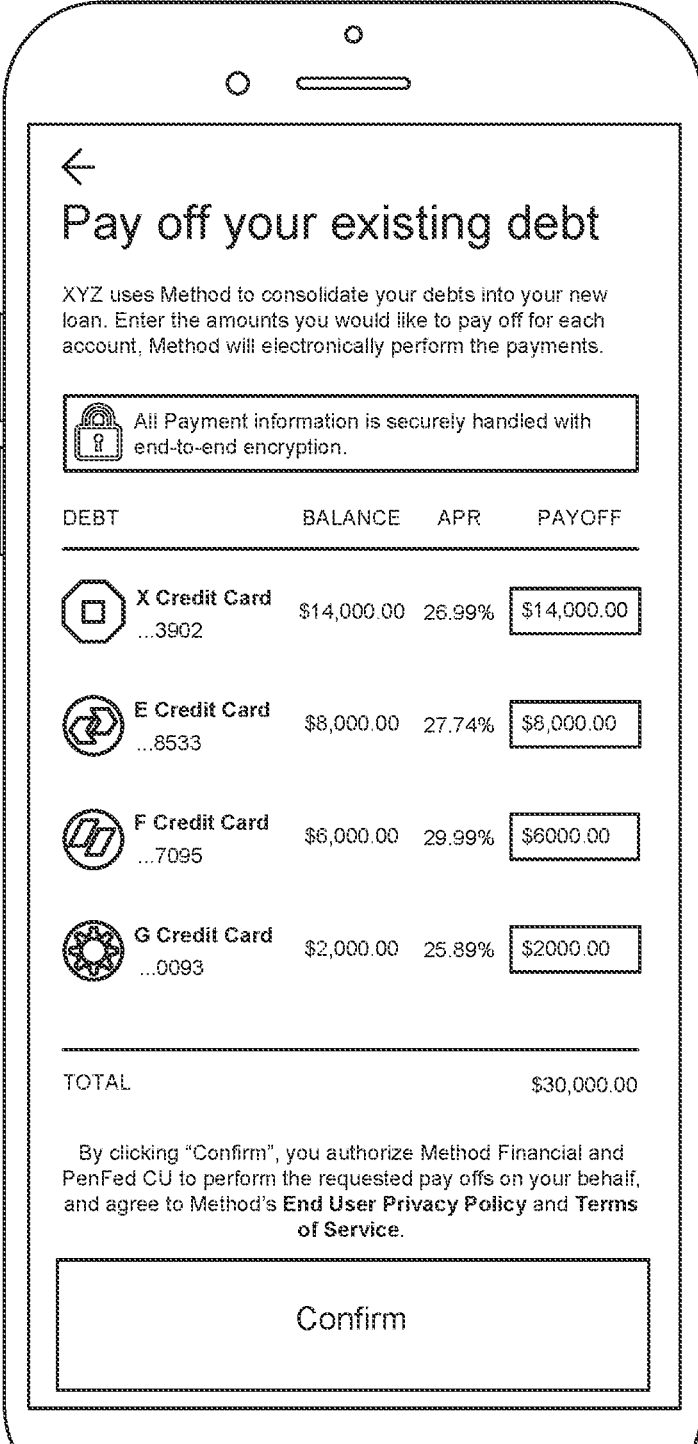
Figure 6K:
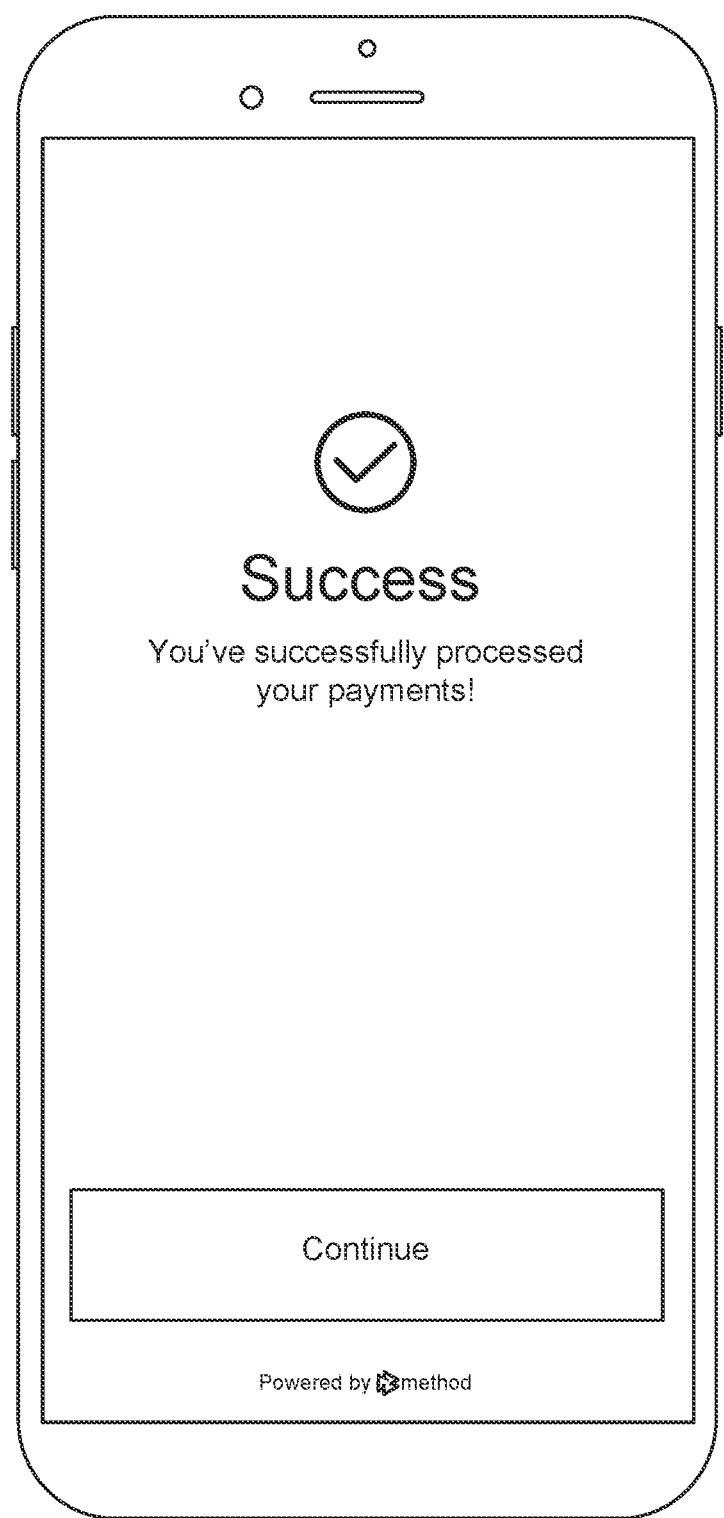

The authentication platform 102 can transmit certain PII and account number information to various institutions (e.g., institutions, core banking providers) associated with the accounts selected by the user to authenticate the user. In FIG. 6H, a view 616 can indicate that the user has been successfully authenticated with the institutions associated with the selected accounts. The view 616 can include a button to advance. Upon authentication with the institutions, the authentication platform 102 can retrieve comprehensive real-time data, such as balances payoff dates, APRs, etc. In FIG. 6I, a view 618 can display the comprehensive real-time data, such as balances, payoff dates, APRs, etc. for the selected accounts with various institutions. The view 618 can prompt the user for a selection of accounts for which the user would like to initiate payment through the service provider. In FIG. 6J, a view 620 can provide a listing of the accounts with different institutions for which the user would like to initiate payment through the service provider. The view 620 can prompt the user to enter the amount (e.g., dollar value) to pay off for each account. The view 620 can include a total amount to be paid off for all of the listed accounts. The view 620 can include an indication that the user authorizes the authentication platform 102 and an institution (e.g., "PenFed CU") associated with the service provider to perform the pay offs on behalf of the user and that the user agrees to terms (e.g., end user privacy policy, terms of service) of the authentication platform 102. The view 620 can include a button for the user to accordingly authorize and agree. After selection of the button, the authentication platform 102 can initiate OFAC/AML checks on the user. If the user passes the checks, the authentication platform 102 can cause payments to be made for the accounts selected by the user. In some embodiments, all PII of the user and tradeline data associated with the user can be deleted by the authentication platform 102. In some embodiments, if the user has selected the authentication platform 102 to perform ongoing bill pay services, the PII of the user and trade line data can be retained by the authentication platform 102 until the user opts out of the services or otherwise expressly informs the authentication platform 102 to delete the data.

Figure 7:
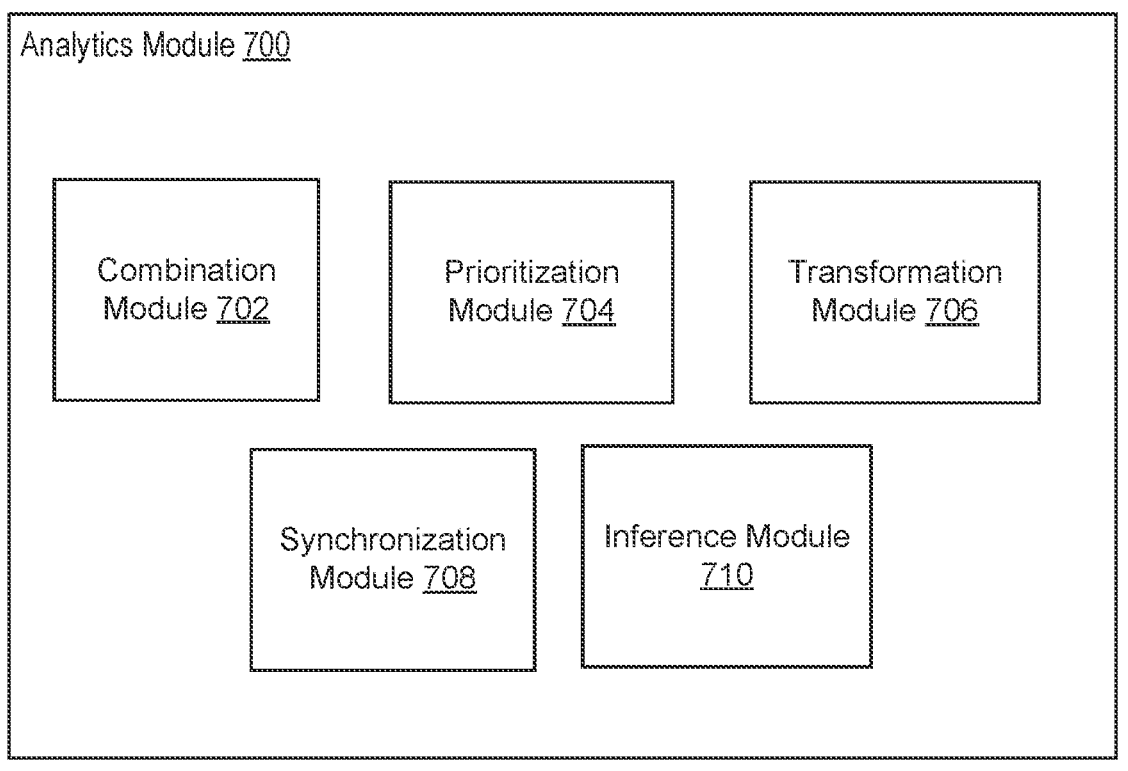
FIG. 7 illustrates an example analytics module, according to an embodiment of the present technology.

FIG. 7 illustrates an example analytics module 700, according to an embodiment of the present technology. In some embodiments, the authentication platform 102 and the analytics module 170 can implement the analytics module 700. The analytics module 700 can selectively obtain reports, such as credit reports, generated by one or more agencies that are associated with a user. The data in the reports regarding accounts of the user can be merged. Certain account data from the merged data can be prioritized based on a variety of considerations. The merged data relating to an account can be selectively combined and integrated with real time account data from an institution (e.g., financial institution) associated with the account to generate synchronized data. Anomaly detection can be performed on the synchronized data to identify outliers or errors. Account data relating to the account can be generated in a standardized manner as defined by the authentication platform 102. An association that relates the account data, the corresponding account, the user, corresponding agencies, and the corresponding institution can be maintained. Based on one or more snapshots or instances of the synchronized data, usage patterns associated with the user can be determined and a user profile or classification of the user can be inferred. The classification of the user can facilitate the identification of products or services tailored to the needs of the user. The analytics module 700 can include a combination module 702, a prioritization module 704, a transformation module 706, a synchronization module 708, and an inference module 710. The components (e.g., modules, elements, features, functionality, operations, etc.) shown in this figure and all figures herein are exemplary only, and other implementations may include additional, fewer, integrated, or different components. Some components may not be shown so as not to obscure relevant details. In various embodiments, one or more of the functionalities described in connection with the combination module 702, the prioritization module 704, the transformation module 706, the synchronization module 708, and the inference module 710 can be implemented in any suitable combinations.

The combination module 702 can receive a signal indicating a particular use case. The use case can be associated with a current inquiry or interest of a user. For example, a use case can be associated with a user interest in a particular type of account (or liability) or other financial service. For instance, the type of account can be a credit card account, a home loan, a car loan, a student loan, etc. The signal indicating a particular use case can be generated based on a utility or application with which the user is interacting. For example, the user can be utilizing the third party application 106, and the third party application 106 can be associated with a service provider that provides one or more types of financial services. In this example, the third party application 106 can cause a signal or indication to be provided to the authentication platform 102 that identifies the service provider and indicates to the authentication platform 102 that the user is potentially interested in the types of financial services provided by the service provider. For instance, the signal can be provided to the authentication platform 102 through the embedded component 116 that is integrated with the third party application 106. As a result, the combination module 702 can determine the use case. As another example, the user can be utilizing a particular interface or functionality of the third party application 106 that is associated with a particular type of financial service or account. For instance, the user can be viewing or actively interacting with a particular screen or page of the third party application 106 that is associated with a particular type of financial service or account. In this example, the third party application 106 can provide a signal to the authentication platform 102 indicating that the user is interacting with the screen or page associated with the particular type of financial service or account. For instance, the signal can be provided to the authentication platform 102 through the embedded component 116 that is integrated with the third party application 106. As a result, the combination module 702 can determine that the use case relates to the particular type of financial service. As yet another example, the user can be interacting with the embedded component 116. An interface of the embedded component 116 can prompt the user to provide an indication about a particular type of liability in which the user has current interest. For instance, the interface can present a listing of various types of liabilities and a prompt for the user to select a particular type of liability from the listing. The combination module 702 can determine a use case that relates to the particular type of liability based on the selection of the user.

The combination module 702 can apply a routing technique to selectively acquire or utilize reports from certain agencies based on a use case associated with a user. Reports from different agencies can have different data, different focus or coverage (e.g., account data, chronological span), and different levels of accuracy. Based on the use case, the combination module 702 can selectively determine one or more agencies from which to obtain a report associated with the user. For example, for a use case relating to a first type of liability (e.g., credit cards), a report from a first agency (e.g., reporting agency) may be superior to or otherwise more informative than a report from a second agency. For instance, the report from the first agency may be more informative because it may contain relatively more data or relatively more accurate or up to date data. As a result, the routing technique can obtain the report from the first agency. Similarly, for a use case relating to a second type of liability (e.g., home mortgages), a report from the second agency may be more informative than a report from the first agency or a third agency. As a result, the routing technique can obtain the report from the second agency. As another example, for a use case relating to personal financial advice, a report from the third agency may be more informative than other agencies because the report from the third agency may have a broader scope of information in terms of longer historical coverage or wider coverage of types of liabilities. Accordingly, the routing technique can obtain the report from the third agency in this example. In some instances, the routing technique can obtain more than one report from different agencies for a use case. A use case can present a situation in which data in reports from different agencies when aggregated may be more informative than one report alone. For example, assume a use case relates to user interest in a particular type of liability (e.g., credit cards) associated with a particular institution (e.g., a particular bank). Assume further that reports from a first agency are more informative about the particular type of liability than reports from other agencies and that reports from a second agency are more informative about accounts associated with the particular institution than reports from other agencies. In this example, reports from two reporting agencies can be utilized to optimize account data relating to the particular type of liability associated with the particular institution. Many variations are possible. As used herein, when one data source (e.g., agency, report, institution file) is described as "more informative", "more accurate", or the like, the data source, compared to other data sources, can provide, for example, relatively more types of relevant data or data fields, relatively more accurate or reliable data, relatively less inaccurate or unreliable data, or relatively more recent or timely (fresh) data.

The routing technique performed by the combination module 702 can be implemented in various manners. In some embodiments, the routing technique can be implemented by a table (e.g., routing table) that is based on attributes relating to use cases, including, for example, a type of account or liability and an associated institution. Based on the attributes, the table can be utilized to select one or more agencies from which reports can be obtained. In some embodiments, the routing technique can be implemented based on a machine learning model configured to determine one or more agencies from which to obtain reports for a use case involving a user. The machine learning model can be trained based on training data in a training phase. The training data can be selected through a variety of methodologies, such as feature engineering or other techniques. The training data can include feature data reflecting attributes of use cases. For example, the attributes associated with a use case can include an application of a third party being utilized by the user, a type (or types) of service provided by the third party (e.g., credit card, travel credit card, medical credit card, home loan, student loan, car loan, personal financial advice, etc.), a type of service associated with or provided through a screen or page of the third party application from which communication with the authentication platform 102 is initiated, and an indication of user interest in a type of service as provided through a component of the authentication platform 102 embedded in the third party application. The training data can include, for example, labels reflecting particular agencies with reports that provide the most informative data that is relevant to the use case. For a training example involving a use case, one or more agencies can be selected as a label in the training data. After the machine learning model is trained with the training data, the machine learning model can be utilized in an evaluation phase. In the evaluation phase, attributes associated with a use case can be provided to the machine learning model and the machine learning model can output a selection of one or more agencies from which reports can be obtained. In some embodiments, the machine learning model can be a supervised machine learning model. For example, the machine learning model can be a classifier. The classifier can be based on a machine learning algorithm, such as logistic regression, decision tree, random forest, gradient-boosted tree, support vector machine, neural network, or the like.

The combination module 702 can combine (or merge) information in reports from multiple agencies selected by the routing technique. Each report from an agency can be parsed and analyzed to identify accounts or liabilities that appear in the reports. Data fields in two or more reports that are associated with the same account can be combined and associated with the account. Further, data fields in two or more reports that pertain to a common type of data relating to the account can be grouped together and associated with the common type of data. Data fields that appear in only one report also can be associated with the account. Each data field can be associated with the corresponding agency that provided the data field and its report. An identifier can be utilized to identify an agency associated with a data field and to map the data field with the associated agency. The identifiers can be unique numbers, designations, or other types of identification. For example, assume that a first agency and a second agency have been selected by the routing technique to obtain information about a credit card account of a user issued by a particular institution. Assume further that the first agency is associated with a first identifier and the second agency is associated with a second identifier. Upon combination of the data fields from the report of the first agency and the report of the second agency, each data field in the combination can be associated with or indexed to an identifier of the agency from where the data field originated. In this way, a combination of data fields relating to an account can variously map to different agencies.

The combination module 702 can identify identical accounts that appear in different reports from different agencies. In some instances, an account number can identify an account in a report from a first agency and the same account number can identify the account in a report from a second agency. For example, a credit card account can be identified by the same account number across different reports from different agencies. The combination module 702 can identify and combine data fields relating to the account in various reports based on the account number. In some instances, an account number to identify an account in a report of a first agency can be different from an account number to identify the same account in a report of a second agency. Further, in some instances, a report from an agency may not include an account number associated with an account. Accordingly, the combination module 702 can analyze key types of data fields relating to an account appearing in a report from an agency to identify the account and, based on the key types of data fields, match the account with the same account appearing in a report from a different agency. For example, account data relating to an auto loan account can include key types of data, such as creation date, disbursement date, and lender name. If account data relating to an auto loan account in a report of an agency includes certain values for the key types of data, the same auto loan account can be identified in another report of a different agency when the other report contains account data with the same or similar key types of data and values therefor. As another example, an account relating to a student loan can be segmented into various sub-loans with each sub-loan associated with key types of data, such as creation dates of the sub-loans and lender name. If account information relating to a student loan account in a report of an agency includes sub-loans associated with key types of data, the same student loan account can be identified in another report of a different agency when the other report contains account information relating to a student loan account having sub-loans with the same or similar key types of data and values therefor. In some embodiments, the same account in different reports can be identified and matched together based on key types of data or values therefor with a level of similarity that satisfies a selected threshold level of similarity. For example, a threshold number of key types of data or a threshold number of values for key types of data that appear in two or more reports can indicate the same account.

In some embodiments, the combination of account data in different reports of various agencies can be performed by a machine learning model. The machine learning model can be trained to combine reports from different agencies and generate a unified or single listing (or stream) of liabilities, trade lines, credit items, or other accounts. The listing of accounts generated by the machine learning model can include accounts of a user and account data associated with the accounts. In some embodiments, the listing of accounts can be a listing of all liability type accounts of a user. The account information can include identification of the accounts and data fields taken from reports provided by one or more agencies. The data fields can be organized and grouped by their data type under each associated account. Further, each data field associated with an account can include or be associated with a reference to the particular agency from which the data field came, as discussed herein. Training data to train the machine learning model can include, for example, reports from agencies and unified listings of accounts reflected in the reports. For example, an instance of training data (e.g., input-output pair) can include two or more reports relating to a user from different agencies and a comprehensive listing of accounts of the user reflected in the reports. In the instance of training data, the comprehensive listing of accounts can include identification of the accounts, and data fields relating to an account can be grouped together by their data types. In the instance of training data, the each data field can include or be associated with a reference to an agency or corresponding identifier that indicates the source of the data field.

For example, an instance of training data can include a first report relating to a user from a first agency and a second report relating to the user from a second agency. In this example, the first report and the second report can include account information for different accounts of the user. The first report can include account information for a first account of the user. The account information for the first account from the first report can include a first data field (or value thereof) associated with a first type of data, a second data field associated with a second type of data, and a third data field associated with a third type of data. Further, in this example, the second report also can include account information for the first account of the user. The account information for the first account from the second report can include a fourth data field (or value thereof) associated with the first type of data, a fifth data field associated with the second type of data, and a sixth data field associated with a fourth type of data. The instance of training data can include a single, unified listing of accounts of the user as reflected in the first report and the second report along with account information relating to the accounts. The listing can include, for example, an entry relating to the first account of the user. The entry relating to the first account of the user can include the account information grouped together based on the type of data. The first data field from the first report and the fourth data field from the second report can be grouped together as the first type of data corresponding to the first account; the second data field from the first report and the fifth data field from the second report can be grouped together as the second type of data corresponding to the first account; the third data field from the first report can constitute the third type of data corresponding to the first account; and, the sixth data field from the second report can constitute the fourth type of data corresponding to the first account. In the training data, the listing likewise can reflect groupings of data fields from the first report and the second report for other accounts. In some embodiments, the training data (and all training data discussed herein) can be curated or created by manual effort of an individual associated with the authentication platform 102. In some embodiments, when training data referenced in any discussion herein includes data relating to an account, the training data can be genuine account data descriptive of a real account, created, artificially generated account data that mirrors genuine account data, or a combination thereof.

In some embodiments, the machine learning model can be provided or trained by a third party entity other than the entity in control of the authentication platform 102. In some embodiments, the machine learning model can be a generative machine learning model, such as a large language model. In some embodiments, the machine learning model can be a generalized (or base) machine learning model (e.g., LLM) that is made available (e.g., open sourced) by the third party entity and further trained based on the training data through supervised fine tuning (or with reinforcement learning) performed by the entity in control of the authentication platform 102.

FIG. 8 illustrates an example functional block diagram 800 relating to generation of a single, unified listing based on a machine learning model, according to an embodiment of the present technology. In some embodiments, the functional block diagram 800 can be implemented by the combination module 702. The example functional block diagram 800 can include a machine learning model 802, which can be a large language model (LLM). The machine learning model 802 can be trained with training data as described to combine reports relating to a user from various agencies and to generate a unified listing of accounts of the user. A report_A1 804 relates to the user and is obtained from a first agency. A report_A2 806 also relates to the user and is obtained from a second agency. The report_A1 804 can be a report, summary, or description of accounts and liabilities of the user as determined by the first agency. The report_A2 806 can be a report, summary, or description of accounts and liabilities of the user as determined by the second agency. In the example shown, two reports are shown. In other examples, any other number of reports (e.g., three, four, etc.) can be obtained from various agencies and combined. Further, in other examples, the reports can be generated by organizations other than agencies.

The information included in the report_A1 804 and the information included in the report_A2 806 can differ. In the report_A1 804, Account M can include data fields A1M1, A1M2, and A1M3; and, Account N can include data fields A1N1 and A1N2. In the report_A2 806, Account M can include data fields A2M1 and A2M2; Account N can include data fields A2N1, A2N2, and A2N3; and, Account O can include data fields A2O1 and A2O2. In some embodiments, the report_A1 804 and the report_A2 806 can be pre-processed. For example, a process to optimize data quality can be performed on the reports to remove errors, inaccuracies, or other anomalous information. While a particular number of accounts and particular numbers of data fields associated with each account are shown for purposes of illustration, the present technology can apply to any number of accounts for each report and any number of data fields for each account. Upon provision of the report_A1 804 and the report_A2 806 to the machine learning model 802, the machine learning model 802 can generate a listing 808 that reflects a combination, integration, or merging of the information in the report_A1 804 and the information in the report_A2 806.

From the report_A1 804 and the report_A2 806, the machine learning model 802 can determine accounts of the user, associate data fields with their corresponding accounts, and group together data fields based on their data types. As shown, the machine learning model 8082 can identify Account M, Account N, and Account O and assign the data fields of the report_A1 804 and the report_A2 806 to one of the accounts. For example, the machine learning model 802 can determine that the data field A1M1 from the report_A1 804 and the data field A2M1 from the report_A2 806 relate to Account M. As discussed herein, the data fields from the different reports can be associated with a common account based on an account number or, in the absence of an account number or the presence of inconsistent account numbers, similarity between key types of data appearing in the different reports. The machine learning model 802 can determine that the data fields A1M1 and A2M1 are associated with a first type of data and can accordingly categorize together the data fields A1M1 and A2M1 in a group 820 associated with the first type of data. The machine learning model 802 can determine that the data field A1M2 from the report_A1 804 and the data field A2M2 from the report_A2 806 relate to Account M. The machine learning model 802 can determine that the data fields A1M2 and A2M2 are associated with a second type of data and can accordingly categorize together the data fields A1M2 and A2M2 in a group 822 associated with the second type of data. The machine learning model 802 can determine that the data field A1M3 from the report_A1 804 relates to Account M. The machine learning model 802 can determine that no other data fields from the report_A2 806 relates to Account M. The machine learning model 802 can determine that the data field A1M3 is associated with a third type of data and can accordingly categorize the data field A1M3 in a group 824 associated with the third type of data. As another example, the machine learning model 802 can determine that the data fields A2O1 and A2O2 from the report_A2 806 relate to Account O and that no data fields from the report_A1 804 relate to Account O. The machine learning model 802 can determine that the data fields A2O1 and A2O2 are associated with different types of data and can accordingly categorize separately the data fields A2O1 and A2O2 in, respectively, a group 826 and a group 828.

The machine learning model 802 also can generate, for each data field in the listing 808, a reference, mapping, indication, or association to or with an agency from which the data field originated. In some embodiments, based on an index of agencies, the reference can identify the agency that constitutes the source of a data field. For example, the data field A1M2 can be associated with a reference to the first agency that provided the data field A1M2. As another example, the data field A2M2 can be associated with a reference to the second agency that provided the data field A2M2.

The prioritization module 704 can select data fields in a unified listing of accounts or liabilities of a user for inclusion in a prioritized listing. In some embodiments, the unified listing can be generated by the combination module 702, as discussed herein. In some embodiments, the prioritization module 704 can be based on a machine learning model. The machine learning model can be trained to prioritize or select from a listing one or more data fields over one or more other data fields. In some embodiments, prioritization of the one or more data fields as performed by the machine learning model can cause the one or more other data fields to be discarded or removed. The machine learning model can be trained based on training data. The training data can reflect prioritization of certain data fields over other data fields because the prioritized data fields are more informative than the other data fields. In some embodiments, training data (e.g., input-output pairs) can include listings of accounts of users and associated prioritized listings in which certain data fields from the listings have been selected and other data fields have been removed. An example of training data can include a listing of accounts and an associated prioritized listing. The listing in this example of training data can include an account of a first type (e.g., student loan). In the listing, the account can be associated with data fields associated with one or more data types. The data fields can be obtained from reports of various agencies. The prioritized listing in this example of training data can prioritize or include account data from a first agency known to have more informative data regarding the first type of account. Accordingly, the prioritized listing can include data fields from the first agency and omit data fields from other agencies. Another example of training data can include a listing of accounts and an associated prioritized listing. The listing in this example of training data can include an account of a first type (e.g., credit card) that was provided by a particular institution (e.g., a certain bank). In the listing, the account can be associated with data fields associated with one or more data types. The data fields can be obtained from reports of various agencies. The prioritized listing in this example of training data can prioritize or include information from a second agency known to have more informative data regarding the first type of account when provided by the particular institution. Accordingly, the prioritized listing can include data fields from the second agency and omit data fields from other agencies. Yet another example of training data can include a listing of accounts and an associated prioritized listing. The listing in this example of training data can include data fields from reports of various agencies that are associated with a common data type and that indicate a date (e.g., a next payment due date). For data fields associated with a particular data type, the prioritized listing in this example of training data can prioritize the data field indicating a date that is most recent or that is furthest in the future. Accordingly, the prioritized listing can include data fields that are most timely (or "fresh") and omit the other data fields. In some embodiments, the training data can be curated and created by manual effort of an individual associated with the authentication platform 102. For example, the training data can be generated based on results of a deterministic technique performed by the prioritization module 704, as discussed herein. In some embodiments, the machine learning model can be provided or trained by a third party entity other than the entity in control of the authentication platform 102. In some embodiments, the machine learning model can be a generative machine learning model, such as a large language model. In some embodiments, the machine learning model can be a generalized (or base) machine learning model (e.g., LLM) that is made available (e.g., open sourced) by the third party entity and further trained based on the training data through supervised fine tuning (or with reinforcement learning) performed by the entity in control of the authentication platform 102.

In some embodiments, the prioritization module 704 can be based on a deterministic (or heuristic) technique. In the deterministic technique, rules can be applied to prioritize data fields. For example, a rule can provide that, for a given type of account, data fields from a given agency are to be prioritized because information provided by the agency in relation to the given type of account is more informative than information provided by other agencies. For instance, the rule can provide that, when data fields from multiple agencies relate to the same credit card, the data fields provided by a first agency are prioritized over data fields provided by the other agencies. As another example, a rule can provide that, for a given type of account provided by a particular institution, data fields from a certain agency are to be prioritized because information provided by the agency in relation to the type of account when provided by the particular institution is more informative than information provided by other agencies. For instance, the rule can provide that, when data fields from multiple agencies relate to the same credit card as provided by a certain bank, the data fields provided by a second agency are prioritized over data fields provided by the other agencies. As yet another example, a rule can provide that, for data fields from various agencies that are associated with a common type of data and that indicate a date, the data field indicating a date that is most recent or that is furthest in the future is to be prioritized over the other data fields. For instance, the rule can provide that, when multiple data fields from various agencies are in a group associated with a data type corresponding to a next payment due date, the data field indicating a next payment due date that is most recent or that is furthest in the future is prioritized. The foregoing are merely examples, and many other types of rules can be determined to prioritize certain data fields over other data fields. In the deterministic technique, one or a combination of rules can be applied to prioritize data fields for the prioritized listing.

FIG. 9 illustrates an example functional block diagram 900 relating to generation of a prioritized listing, according to an embodiment of the present technology. In some embodiments, the functional block diagram 900 can be implemented by the prioritization module 704. A single, unified listing 902 of accounts of a user can be provided for prioritization 904 of data fields in the listing 902. In this example, the listing 902 is the listing 808, and the account data contained therein is as described herein. In some embodiments, the prioritization 904 can be performed by a machine learning model 906 that has been trained by training data, as discussed. In some embodiments, the prioritization 904 can be performed by a deterministic technique 908, as discussed. The prioritization 904 performed on the listing 902 can result in generation of a prioritized listing 910. Certain data fields in the listing 902 have been selected for inclusion in the prioritized listing 910 while other data fields in the listing 902 have been omitted from the prioritized listing 910. For example, with respect to Account M, data fields in groups 920, 922 associated with report_A1 804 have been prioritized for inclusion in the prioritized listing 910 while data fields in the groups 920, 922 associated with report_A2 806 have been omitted from the prioritized listing 910. In this example, the first agency that provided the report_A1 804 may be deemed by the authentication platform 102 to have more informative data relating to the type of Account M. As a result, the data fields from the report_A1 804 have been prioritized in the prioritized listing 910 over the data fields from the report_A2 806 provided by the second agency. The data field in group 924 is currently the sole data field for the associated data type. Accordingly, the data field in the group 924 is carried over to the prioritized listing 910. As another example, with respect to Account N, a data field in group 926 associated with report_A2 806 has been prioritized for inclusion in the prioritized listing 910 while the data field in the group 926 associated with report_A1 804 has been omitted from the prioritized listing 910. In this example, the second agency that provided the report_A2 806 may be deemed by the authentication platform 102 to have more informative data relating to the type of Account N or the type of data associated with the group 926. However, the data fields in group 928 can include an indication of a next payment due date. It can be determined from parsing the data fields in the group 928 that the next payment due date in the data field from the report_A1 804 is more recent than the next payment due date in the data field from the report_A2 806. Accordingly, the data field from the report_A1 804 is prioritized over the data field from the report_A2 806 and thus included in the prioritized listing 910. Many variations are possible.

The transformation module 706 can transform a prioritized listing to one or more predetermined formats specified by the authentication platform 102. The prioritized listing as described above can reflect a selection of account information, such as data fields, for an account as provided in reports prepared by agencies. Accordingly, the prioritized listing can reflect account information and organization thereof in a manner similar to the general content and organization of reports prepared by the agencies. The transformation module 706 can apply machine learning techniques to transform and standardize account information in the prioritized listing based on predetermined formats defined by the authentication platform 102. The predetermined formats can define various specifications for the account information, such as predetermined selections of data types from a prioritized listing and predetermined ordering of the data types. The predetermined formats can include data fields that identify or reference agencies from where the data fields originated. The predetermined formats can be based on data types that are deemed by the authentication platform 102 to be relevant to or helpful for services provided by the authentication platform 102. For example, the services can include authentication services with the authentication platform 102, authentication services with institutions, classification of users into certain user profiles, targeting of financial products or services, etc. When certain types of account information from the prioritized listing are deemed not relevant or not helpful to the services or the authentication platform 102, the predetermined formats can omit those types of account information. The predetermined formats can be configurable and reflect differences in the types of data that are relevant for different types of accounts and different types of accounts with different institutions. Some or all of the predetermined formats can be different from one another. The predetermined formats can vary based on account types. For example, one predetermined format associated one type of account (e.g., credit card) can specify certain types of data (e.g., balance). In contrast, another predetermined format associated with a different type of account (e.g., mortgage account) can specify other particular types of data (e.g., principal balance, escrow balance, etc.). The predetermined formats also can vary based on institutions. For example, one predetermined format associated with a type of account with a first institution can specify certain types of data. In contrast, another predetermined format associated with the type of account with a second institution can specify other particular types of data.

Data fields associated with each account in the prioritized listing can be transformed by a suitable machine learning model in a system of machine learning models to generate information associated with the account in a predetermined format. For example, for a particular type of account appearing in a prioritized listing, an associated machine learning model can generate account data in a first predetermined format associated with the particular account type. As another example, for a particular type of account provided by a particular institution appearing in a prioritized listing, a different associated machine learning model can generate account data in a second predetermined format associated with the particular account type and the particular institution. Each machine learning model in a system of machine learning models can be associated with a particular context, such as a particular type of account or a particular type of account provided by a particular institution.

Each machine learning model in the system of machine learning models can be trained based on training data that is relevant to the context associated with the machine learning model. The system of machine learning models can be more accurate and effective than a single machine learning model in generating relevant account information for various contexts. For example, for a machine learning model associated with a first context corresponding to a particular type of account, an instance of training data (e.g., input-output pair) can include data types and associated data fields of an account of the particular type in the prioritized listing, and data types and associated data fields for the account that are selected and ordered in accordance with a predetermined format associated with the first context. As another example, for a machine learning model associated with a second context corresponding to a particular type of account provided by a particular institution, an instance of training data can include data types and associated data fields of an account of the particular type and associated with the particular institution in the prioritized listing, and data types and associated data fields for the account that are selected and ordered in accordance with a predetermined format associated with the second context. In some embodiments, each machine learning model in the system can be generated from a generative machine learning model, such as a large language model. In some embodiments, at least some of the machine learning models in the system can be generated based on a generalized (or base) machine learning model (e.g., LLM) that is made available (e.g., open sourced) by a third party entity. At least some of the machine learning models of the system can be further trained based on the training data through supervised fine tuning (or with reinforcement learning) or prompt engineering performed by the entity in control of the authentication platform 102.

Figure 10:
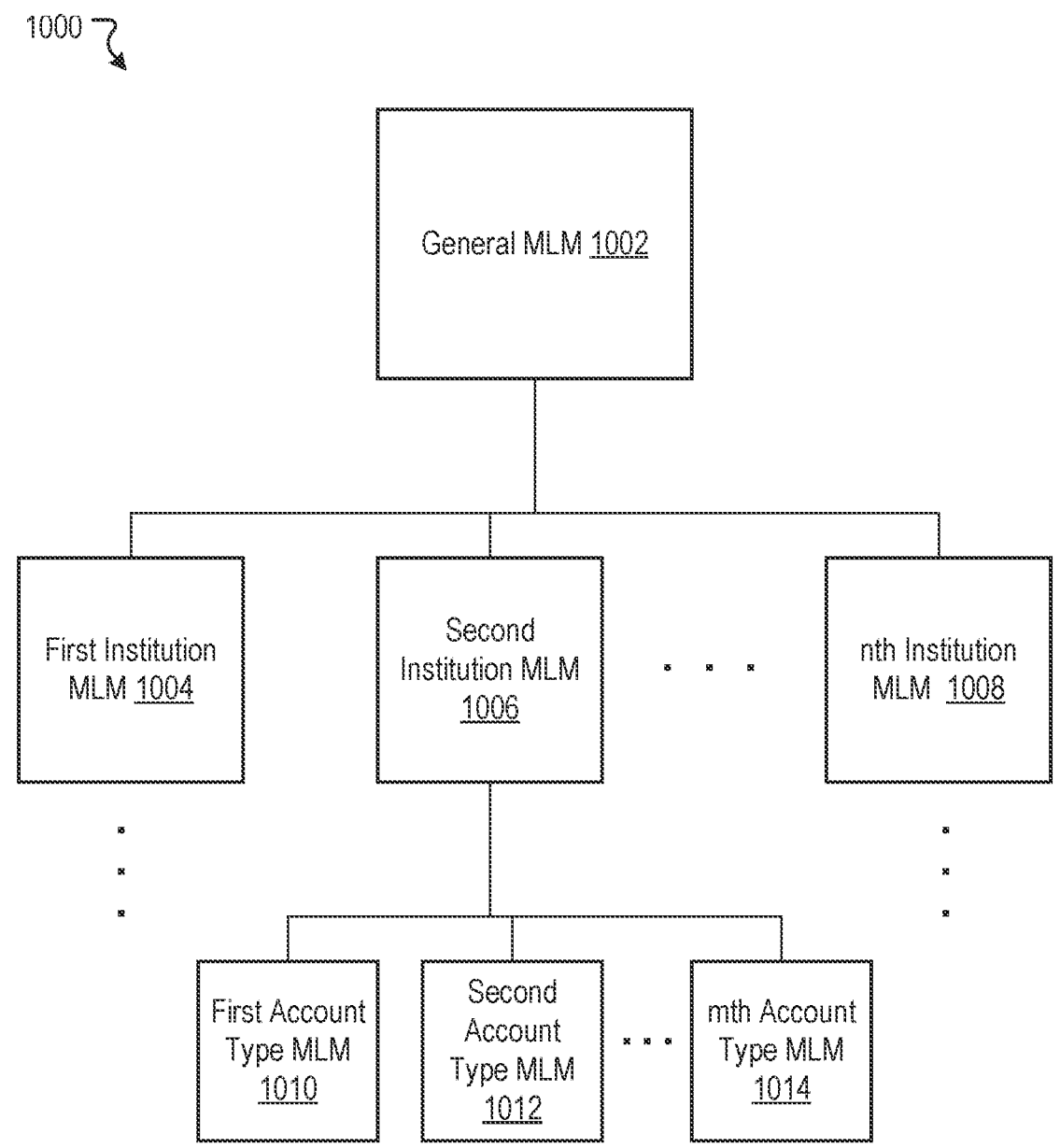
FIG. 10 illustrates an example system of machine learning models, according to an embodiment of the present technology.

FIG. 10 illustrates an example system 1000 of machine learning models to transform account information to predetermined formats, according to an embodiment of the present technology. In some embodiments, the transformation module 706 can be based in part on the system 1000 of machine learning models. The system 1000 reflects a hierarchical arrangement of machine learning models. Each machine learning model can transform account information to an associated predetermined format. The account information to be transformed can be data fields relating to an account in a prioritized listing. In some embodiments, the system 1000 of machine learning models can include a general (or first) machine learning model (MLM) 1002 in a first level that has been trained to transform account information, such as data types and associated data fields, relating to an account in a prioritized listing to a predetermined format that is general. In some instances, the machine learning model 1002 can be utilized when account information in the prioritized listing indicates a context (e.g., a particular institution, a particular type of account, a combination of a particular type of account with a particular institution) for which the system 1000 does not include an associated machine learning model. In some embodiments, the system 1000 of machine learning models also can include a next level (second level) of machine learning models that have been trained to transform information relating to an account provided by a particular institution to a particular predetermined format associated with the institution. For example, in this level, a first institution machine learning model 1004 can be configured to provide account information of accounts with a first institution according to a predetermined format associated with the first institution; a second institution machine learning model 1006 can be configured to provide account information of accounts with a second institution according to a predetermined format associated with the second institution; and, an nth institution machine learning model 1008 can be configured to provide account information of accounts with an nth institution according to a predetermined format associated with the nth institution, where n is any value reflecting the number of institutions for which the authentication platform 102 has trained corresponding machine learning models to generate account information according to predetermined formats associated with the institutions. As discussed, an institution can be any type of institution, such as a particular bank, a particular mortgage servicer, a particular credit card issuer, a particular loan servicer, etc. In general, machine learning models at a given level can inherit capabilities of associated machine learning models at one or more levels higher than the given level. For example, the first institution machine learning model 1004, the second institution machine learning model 1006, and the nth institution machine learning model 1008 can inherit general capabilities from the general machine learning model 1002. The first institution machine learning model 1004, the second institution machine learning model 1006, and the nth institution machine learning model 1008 can adapt and tailor these general capabilities for their associated institutions.

In some embodiments, the system 1000 of machine learning models also can include a next level (third level) of machine learning models that have been trained to provide account information in predetermined formats based on particular types of accounts with each specific institution. For example, as shown in this level, the system 1000 can include a plurality of machine learning models associated with different account types of the second institution. In this example, a first account type machine learning model 1010 can be configured to provide account information in a predetermined format based on a first type of account with the second institution; a second account type machine learning model 1012 can be configured to provide account information in a predetermined format based on a second type of account with the second institution; and, an mth account type machine learning model 1014 can be configured to provide account information in a predetermined format based on an mth type of account with the second institution, where m is any value reflecting the number of different types of accounts offered by the second institution. As discussed, the types of accounts with the second institution or other institution can include credit card accounts, student loan accounts, mortgage accounts, auto loan accounts, etc. Although machine learning models for different account types are associated with the second institution in FIG. 10 for ease of illustration, the system 1000 can also include machine learning models for different account types associated with the first institution or another institution.

For an account in a prioritized listing, the transformation module 706 can parse information associated with the account. Based on parsing of account information, the transformation module 706 can determine for each account an associated context, including an institution associated with the account and a type of the account. The transformation module 706 can traverse the system 1000 to determine for the account if a machine learning model corresponding to the institution and the account type exists at the third level. If such a machine learning model at the third level exists, the transformation module 706 can cause the machine learning model to perform the transformation of account information to the corresponding predetermined format. If such a machine learning model at the third level does not exist, the transformation module 706 can traverse the system 1000 to determine if a machine learning model corresponding to the institution exists at the second level. If such a machine learning model at the second level exists, the transformation module 706 can cause the machine learning model to perform the transformation of account information to the corresponding predetermined format. If such a machine learning model at the second level does not exist, the transformation module 706 can traverse the system 1000 to cause the general machine learning model 1002 to perform the transformation of account information to the corresponding predetermined format. Where a machine learning model does not exist at the second level or the third level in the system 1000 to match the context of an account, the authentication platform 102 may generate or trigger an indication or alarm for the authentication platform 102 to create a machine learning model that is trained to transform account information of the account to a predetermined format corresponding to the context.

As referenced, while the foregoing examples relate to a system of machine learning models having three levels for purposes of illustration, a system of machine learning models in accordance with the present technology can have any suitable number of levels (e.g., two levels, four levels, five levels, etc.). Further, while the foregoing examples describe a system that changes focus from a general machine learning model at a first level, to machine learning models adapted to particular institutions at a second level, and to machine learning models adapted to specific types of accounts for a particular institution at a third level, a system of machine learning models in accordance with the present technology can change focus in different manners. For example, the system can change focus from a general machine learning model at a first level, to machine learning models adapted to particular types of accounts at a second level, and to machine learning models adapted to specific institutions for a particular type of account at a third level. Many variations are possible.

In some embodiments, machine learning models of the system 1000 can be further trained to identify and remediate errors or anomalies in a prioritized listing in generation of account information based on predetermined formats. A data field from a report prepared by an agency can be incorrect or malformed, and propagated into a prioritized listing. For example, a type of data in the prioritized listing associated with a certain type of account can be irrelevant or not meaningful from the perspective of the authentication platform 102. As another example, a value for a data field in account information can be determined to be incorrect or inconsistent with the associated data type or account type. An example of training data (e.g., input-output pairs) to train a machine learning model to remediate errors can include account information reflecting an error and account information in a predetermined format associated with the machine learning model that accounts for the error. For example, in the example of training data, the account information in the predetermined format can omit an incorrect data field or can return no value or a null value instead of the incorrect data field.

The transformation module 706 can upload account information that has been transformed according to a predetermined format to a secure database of the authentication platform 102. Account information that has been transformed according to a predetermined format can constitute formatted account information, as referenced herein. The database can include a global repository of accounts known to the authentication platform 102. The database also can include formatted account information relating to accounts in the database. In some embodiments, the database can maintain a current version of formatted account information for an account that is based on the most recent version of reports from agencies as well as some or all previous versions of formatted account information for the account that are based on prior versions of reports from the agencies. In some embodiments, versions of formatted account information or data fields thereof can be timestamped. In addition to formatted account information, an indication of agencies that provided reports from which the formatted account information was obtained can be maintained in the database. Mappings or associations can be generated and maintained to reflect relationships among accounts, formatted account information relating to the accounts, and agencies that provided information included in the formatted account information. For example, the associations can be implemented by a link list.

Based on the mappings, when a report provided by an agency in relation to a user is newly obtained by the authentication platform 102, new (e.g., revised, updated, not preexisting) account data relating to an account in the report can be analyzed and processed by the analytics module 700. The new account data can include any data field of any data type relating to any account type. In some instances, the new account data can ultimately be reflected in formatted account information associated with the account. In some instances, the new account data is not reflected in formatted account information associated with the account. The mappings enable the authentication platform 102 to efficiently utilize new reports and new account data therein from various agencies so that relevant, up to date account information from reports can be known and maintained by the authentication platform 102.

Figure 11:
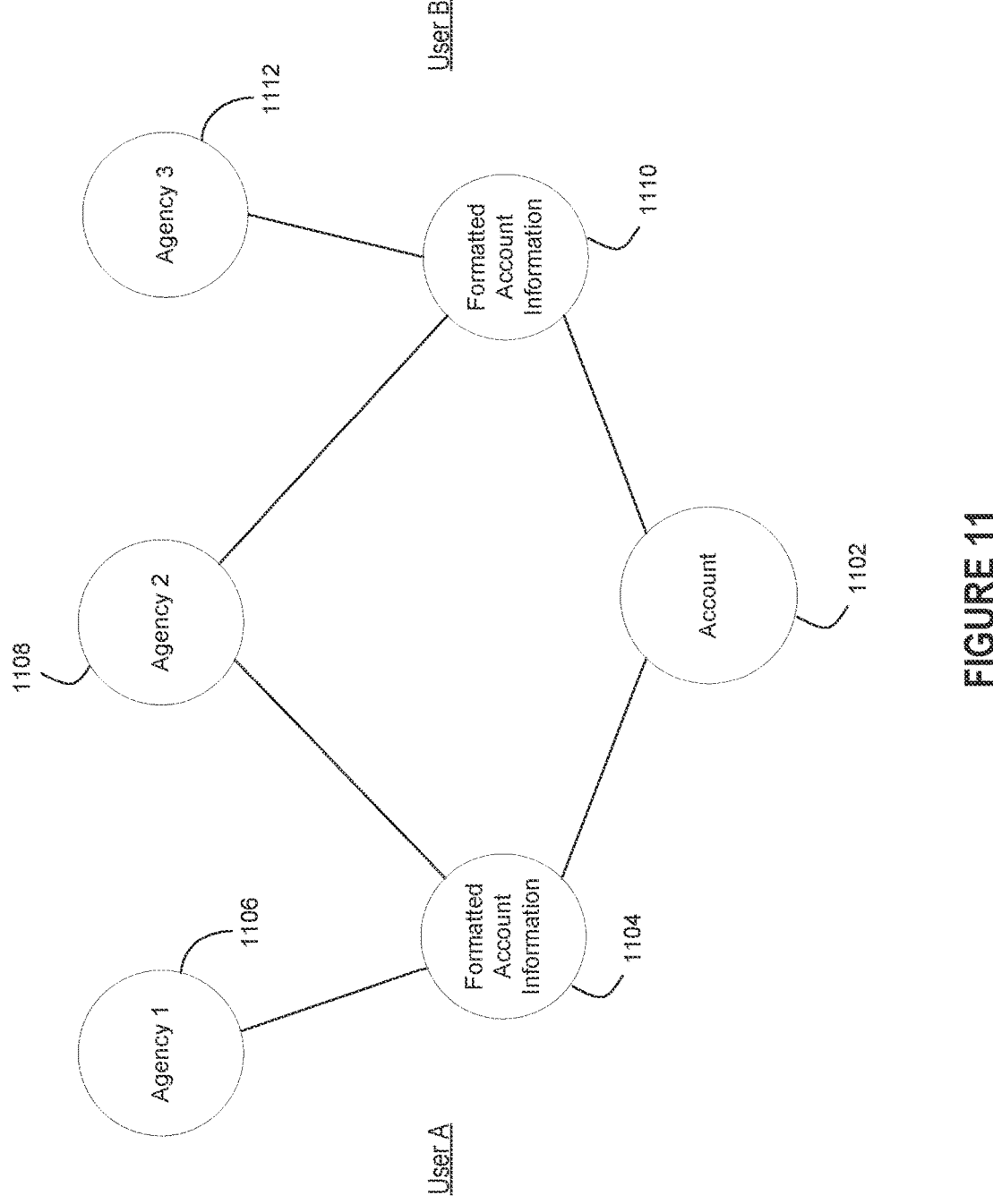
FIG. 11 illustrates a simplified diagram, according to an embodiment of the present technology.

FIG. 11 illustrates a simplified diagram 1100 of data maintained by an authentication platform, according to an embodiment of the present technology. In some embodiments, the diagram 1100 can represent a graph of data maintained by the authentication platform 102 that can be combined with the graph shown in FIGS. 4A-4B through appropriate connections and mappings. The diagram 1100 reflects various data maintained in a database of the authentication platform 102. The database can be a global repository of all accounts of users known by the authentication platform 102. For purposes of illustration, one account 1102 is shown. The account 1102 can be associated with, for example, a certain account type, an institution that provides the account, and one or more users. In this illustration, the account 1102 is a credit card account for which User A is primary cardholder. The database can include formatted account information 1104 relating to the account 1102. The formatted account information 1104 can be generated by a suitable machine learning model of the system 1000. The database can include a mapping or connection between the account 1102 and the formatted account information 1104. The database can include records relating to an agency 1 1106 and an agency 2 1108 that prepared reports about accounts and liabilities of User A from which information in the formatted account information 1104 was obtained. The database can include mappings or connections between the agency 1 1106 and the formatted account information 1104 and between the agency 2 1108 and the formatted account information 1104. In this illustration, the account 1102 is associated with an authorized user, User B. The database can include formatted account information 1110 relating to the account 1102. The formatted account information 1110 can be generated based on information in reports about accounts and liabilities of User B provided by the agency 2 1108 and an agency 3 1112. The database can include mappings or connections between the account 1102 and the formatted account information 1110, and between the agency 2 1108 and the formatted account information 1110 and between the agency 3 1112 and the formatted account information 1110. The mappings of the database can allow confident and efficient updating of account information. For example, reports of the agency 1 1106, the agency 2 1108, or the agency 3 1112 can be periodically (e.g., monthly) obtained by or provided to the authentication platform 102. New account data relating to the account 1102 in reports of the agency 1 1106, the agency 2 1108, or the agency 3 1112 can be propagated across the database based on the mappings. As another example, based on the mappings, the database can facilitate accurate determinations of all users connected to a particular account. The determination of the users of an account and their status (e.g., primary, authorized) can be relevant in choosing or optimizing services performed by the authentication platform 102.

The synchronization module 708 can synchronize account data for accounts of a user to generate synchronized data that is relevant and up to date. The synchronization module 708 can selectively integrate or synchronize data regarding an account or liability from various sources of data. The sources of data regarding the account can include, for example, the authentication platform 102 and an institution associated with the account. The synchronization module 708 can directly obtain data regarding an account of a user from an institution providing the account after the authentication platform 102 has facilitated authentication of the user with the institution, as described herein. The authentication platform 102 can advantageously directly access account data from the institution in real time (or near real time) on demand or at any suitable frequency to obtain up to date, fresh data when such data is available through the institution.

Account data from an institution can be expressed, organized, or formatted in a file in a manner that is unique to the institution without standardization. The synchronization module 708 can interpret or standardize the account data in the file from the institution so that it can be potentially added to or compared with equivalent formatted data regarding the account as maintained in the database of the authentication platform 102, as discussed herein. The synchronization module 708 can parse files from one or more institutions and map different data fields or data types therein to matching data fields and data types of the formatted data. For example, data fields labeled as "amount due", "next payment", and "next payment amount" that can appear in files from various institutions can reference the same type of data. The synchronization module 708 can recognize a data type associated with different data fields in files from different institutions and map the data fields to the corresponding equivalent data type in the formatted data.

The synchronization of account data can involve selection of data fields from particular sources. The selection of data fields from the sources can be based on a variety of considerations, such as recency or availability of account data. For example, for an account of a user relating to a credit card with an institution, a value of the current balance on the credit card can be constantly changing. As a result, with respect to applications or scenarios in which fresh data regarding the value of the credit card balance is desirable or vital, the synchronization module 708 can directly access real time account data from the institution on demand or at desired intervals of any configurable time duration. A value of current balance on the credit card also can be included in formatted data regarding the account as maintained in the database of the authentication platform 102. The value of the credit card balance included in the formatted data can originate from a report of an agency, as discussed herein. Because the report may contain data that was relatively old (e.g., 30 days, 45 days, 60 days, etc.) when received by the authentication platform 102, the value of the credit card balance in the formatted data can be stale or inaccurate. As a result, the synchronization module 708 can select the current balance data from the institution instead of the formatted data to include in the synchronized data for the account. As another example, account data from an institution can indicate that an account has been closed but not indicate the precise date when the account was closed. In contrast, because it contains information from reports provided by agencies, the formatted data regarding the account as maintained by the authentication platform 102 can include an indication of the date when the account was closed. Accordingly, in this example, the synchronization module 708 can select the data field regarding account closure from the formatted data instead of the related data field from the institution to include in the synchronized data for the account. In yet another example, if an original credit card number has been changed to a new credit card number, account data from an institution may not reflect the new credit card number. In contrast, because it contains information from reports provided by agencies, the formatted data regarding the account as maintained by the authentication platform 102 can include the new credit card number. Accordingly, in this example, the synchronization module 708 can select the data field regarding the new credit card number from the formatted data instead of the related data field provided by the institution to include in the synchronized data for the account. In some instances, account data can be available from the formatted data maintained by the authentication platform 102 but not from a file obtained from an institution. Examples of such account data can include an interest rate applicable to an account, an original loan amount for a mortgage or auto loan, etc. For these examples, the synchronized data can include the account data available from the formatted data. Likewise, when account data of a certain data type is reflected in a file from an institution but is not present in formatted data maintained by the authentication platform 102, the account data reflected in the file from the institution can be utilized in the synchronized data.

The synchronization module 708 can include anomaly detection capabilities. The anomaly detection capabilities can be based on heuristics or time series patterns. A data field regarding an account from an institution can be determined to be incorrect or unreliable based on current or historical account data. For example, if a data field relating to a next payment due as reflected in a file received from an institution has a value that exceeds the original loan amount for the account, the data field relating to the next payment due can be determined to be incorrect or unreliable, and thus excluded from the synchronized data. As another example, the potential accuracy or reliability of a data field relating to a next payment due regarding an account in a file from an institution can be determined. For instance, if the account relates to an ordinary credit card and the data field relating to the next payment due is one or more orders of magnitude larger than a historical time series of values of data fields relating to last payments on the account, the data field relating to the next payment due can be determined to be potentially inaccurate, and flagged for further consideration or excluded from the synchronized data. In contrast, if the account relates to a travel credit card and the data field relating to the next payment due is one or more orders of magnitude larger than a historical time series of values of data fields relating to last payments on the account, the data field relating to the next payment due can be determined to be not necessarily incorrect and thus included in the synchronized data. As yet another example, the potential accuracy or reliability of a data field regarding last payment can be determined. For instance, assume that account data for an account with an institution indicates a time series of historical payments that are of the same amount. Assume further that a data field relating to a last payment in account data from the institution has a value that is significantly larger than the amount of the historical payments. The synchronization module 708 can determine that the value of the last payment is not necessarily incorrect if, for example, the value of the last payment is the same as the outstanding balance on the account as reflected in the account data. In this example, the data field relating to the last payment can be included in the synchronized data. The foregoing are merely examples and many variations are possible. When a data field for a type of data from an institution is determined to be incorrect or unreliable, the data field can be excluded from the synchronized data. The corresponding data field for the type of data from the formatted data, if available, can be included in the synchronized data. In some embodiments, when synchronized data relating to an account incorporates account data from an associated institution, the formatted data maintained by the authentication platform 102 that relates to the account can be updated to include the account data from the associated institution.

The synchronization module 708 can generate synchronized data based on a machine learning model. The machine learning model can be trained based on training data. The training data can generate synchronized data that reflects standardization and selection of data fields from various sources. Training data (e.g., input-output pairs) can include, for an account, account data from a file obtained from an institution and account data from formatted data maintained by the authentication platform 102 and provided from reports prepared by agencies. In addition, the training data can include, for the account, synchronized data reflecting a selected combination and prioritization of the account data from the sources.

Examples of training data can vary. As just one example, the training data can be generated so that the synchronized data reflects standardization of account data. For instance, the training data can include files from institutions that include data fields of data types that are equivalent. Training data can include account data from an institution including a data field having a data type, such as "amount due", "next payment", "next payment amount", or the like, as well as account data from formatted data including a data field having an equivalent data type that also relates to the next amount due. The synchronized data in the training data can include a standardized data type for the next amount due that is equivalent to the data type from the institution. As another example, the training data can be generated so that the synchronized data reflects selection of account data. For instance, continuing the preceding example, the training data can include synchronized data that reflects selection of the data field relating to the next due amount from an institution over a data field relating to the next due amount from the formatted data based on a determination that, when access to account data from institutions is regular or frequent (e.g., every day, every two days, every week, etc.), institutions generally have more accurate or fresh information over agencies for this type of data. In another instance, the training data can include account data from an institution that includes a data field relating to current balance and account data from formatted data that also includes a data field relating to current balance. The training data also can include synchronized data that reflects selection of the data field relating to current balance from the institution over the equivalent data field from the formatted data. In yet another instance, the training data can include account data from an institution that includes a data field relating to account closure and account data from formatted data that also includes a data field relating to account closure. The training data also can include synchronized data that reflects selection of the data field relating to account closure from the formatted data instead of the equivalent data field from the institution. In a further instance, the training data can include, for a credit card account, account data from an institution that includes a data field relating to an account number that reflects an old number and account data from formatted data that also includes a data field relating to account number that reflects a new number. The training data also can include synchronized data that reflects selection of the data field relating to account number from formatted data that reflects the new number. In still a further instance, the training data can include, for an account, account data relating to one or more types of data (e.g. interest rate, an original loan amount for a mortgage, an original loan amount for an auto loan) from an institution and account data relating to the one or more types of data from formatted data. The training data also can include synchronized data that reflects selection of data fields relating to the types of data from the formatted data based on a determination that such types of data as set forth in reports provided by agencies are more reliable or more accurate than such types of data as obtained from an institution. The foregoing are merely illustrations of training data. While the foregoing illustrations may indicate prioritization of one source of account data over another source for a particular type of data as reflected in training data, the prioritization can change when the authentication platform 102 determines that such change is warranted. Other types of training data and other types of input-output pairs are possible. For example, for a particular type of data, the synchronized data (e.g., supervisory signal) of the training data may reflect selection of one source (e.g., account data from an institution) over another source (e.g., formatted data from a report) at an earlier point in time. However, if at a later point in time, the other source is determined to be more accurate or reliable, the synchronized data (e.g., supervisory signal) of the training data may reflect selection of the other source (e.g., formatted data from a report) over another source (e.g., account data from an institution). In addition, the training data can be configured to perform anomaly remediation, as described herein. The training data can include account data from formatted data and account data from an institution as well as synchronized data that reflects exclusion of incorrect or unreliable data fields or that reflects selection of certain data fields of the account data from formatted data or certain data fields of the account data from an institution, as described herein.

The training data can be utilized to train the machine learning model. In some embodiments, the machine learning model can be a generative machine learning model, such as a large language model. In some embodiments, the machine learning model can be a generalized (or base) machine learning model (e.g., LLM) that is made available (e.g., open sourced) by a third party entity. The machine learning model can be further trained based on the training data through supervised fine tuning (or with reinforcement learning) or prompt engineering performed by the entity in control of the authentication platform 102.

FIG. 12 illustrates an example functional block diagram 1200 relating to generation of synchronized data based on a machine learning model, according to an embodiment of the present technology. In some embodiments, the functional block diagram 1200 can be implemented by the synchronization module 708. In some embodiments, the functional block diagram 1200 can include institution data 1202 relating to an account of a user. As discussed, the institution data 1202 can be a file including account data relating to the account that is controlled or maintained by an institution, such as a financial institution. The institution data 1202 can include current, real time (or near real time) account data. The institution data 1202 can be provided to the authentication platform 102 through a connection between the institution and the authentication platform 102 after the authentication platform 102 has facilitated authentication of the user by the institution. The functional block diagram 1200 can include formatted data 1204 relating to the account of the user. As discussed, the formatted data 1204 can be processed and formatted account information that was included in reports provided by various agencies and maintained in a database of the authentication platform 102. The institution data 1202 and the formatted data 1204 can be provided to a machine learning model 1206 that has been trained to generate synchronized data 1208. Training of the machine learning model 1206 can be based on the training data as described herein. As discussed, the synchronized data 1208 can include a selection of most accurate, reliable, recent, or available account data from the institution data 1202 and the formatted data 1204.

The inference module 710 can determine infer or predict a financial status or profile of a user. The user profile can be determined based on usage patterns reflected by account data, including real time account data, of the user for liability accounts with one or more institutions. Real time access to account data with an institution can be acquired through authentication techniques performed by the authentication platform 102 as described herein. The account data obtained through real time access can be included in the synchronized data 1208, as described herein. Based on the ability to acquire real time access to account data for liability accounts of the user, the inference module 710 can perform up to date analytics and inferences regarding the financial status or profile of the user.

The inference module 710 can implement a machine learning model. For example, the machine learning model can be a classifier trained to predict a financial status or profile of a user. Training data to train the machine learning model can include as features synchronized data from various sources of financial data, including real time account data from institutions. In some embodiments, the synchronized data can be the synchronized data 1208. The training data can include synchronized data about an account of a user obtained at selected time points (or snapshots) over a selected time duration. The selected time points can be at regular intervals associated with a particular frequency or irregular intervals. The selected frequency and the selected time duration can vary. For example, the selected frequency can be every day, every two days, every week, every month, etc. As another example, the selected time duration can be six months, 12 months, 24 months, etc. In some embodiments, a frequency can be selected that is greater than a frequency at which a report is created by or obtained from an agency. For example, if an agency updates its report on a user every 30 days (or 45 days, 60 days, etc.), the selected frequency at which synchronized data is obtained can be every 29 or fewer days. When the frequency is selected to be more than the frequency at which a report is created or updated by an agency, the synchronized data, which includes real time account data, can reveal specific activities of a user or statuses of an account of the user that cannot be determined or deduced from the report alone. In some embodiments, the training data can be synchronized data associated with a plurality of accounts of a user that is obtained at selected frequencies over a selected time duration.

The training data can include labels that characterize the user based on usage patterns reflected in the synchronized data. The labels can be classifications of the user corresponding to different user profiles. In some embodiments, a label can classify a user as a transactor when the user regularly pays off the entirety of a balance on an account, as a revolver when the user consistently carries a balance on an account, or as dormant when the user does not create a balance or other liability on an account. In some embodiments, labels can be classifications that reflect more detail or granularity about usage patterns of the user. For example, a label can classify a user as a revolver who consistently pays a minimum amount due on the account. As another example, a label can classify a user as a revolver who consistently makes payments on an account that are less (or more) than a minimum amount due. When the training data includes synchronized data for a plurality of accounts of a user, the labels can be determined based on usage patterns of the user across the plurality of accounts. For example, training data including synchronized data indicates that the user consistently pays off the entirety of the balance for a first account and consistently pays only the minimum amount due for a second account, the training data can include an appropriate label for the user, such as a revolver, a hybrid revolver/transactor, or the like. Many variations are possible.

In some embodiments, the training data can be configured to express or represent synchronized data at a selected frequency over a selected time duration regarding an account of the user as times series data along with an appropriate label. In some embodiments, the training data can be configured to express or represent synchronized data at one or more selected frequencies over one or more selected time durations regarding all accounts of the user as times series data along with one or more appropriate labels. In some embodiments, the training data can be subject to validation rules to ensure that time series data and associated labels are appropriately generated and matched.

Examples of training data can include a time series of synchronized data for an account of a user. For instance, the training data can include synchronized data indicating that a user consistently makes timely, full payment of amounts due on the account. In this instance, the training data can include a label indicating that the user is a transactor. In another instance, the training data can include a time series of synchronized data indicating that a user carries a balance from one billing cycle to the next billing cycle. In this instance, the training data can include a label indicating that the user is a revolver. In yet another instance, the training data can include synchronized data indicating that a user does not create any balance or otherwise assume liabilities on the account for a predetermined amount of time (e.g., three months, six months, 12 months). In this instance, the training data can include a label indicating that the user is dormant.

Another example of training data can include a time series of synchronized data for an account of a user. Because the synchronized data can be designed to include account data about the account from both the institution providing the account and reports from an agency, the training data in accordance with the present technology is advantageous over utilization of account data from a conventional report alone. For instance, a conventional report can indicate that a user paid the specified monthly minimum amount required on the account. However, the synchronized data, which includes account data from real time access with the institution providing the account, can indicate the total balance on the account. As a result, the synchronized data, unlike account data in the conventional report, can indicate that the balance on the account is, for example, accruing interest and growing. In this example, the training data can include a label indicating that, for example, the user is a revolver or that the user is a revolver who only pays the monthly minimum amount. However, the training data alternatively can include a more specific, informative label indicating that the user is a revolver whose account balance is increasing.

Yet another example of training data can include a time series of synchronized data for an account of a user with an institution at a selected frequency that is greater than a frequency at which reports from agencies that include data about the account are updated. For example, if an agency updates its reports regarding the account every 30 days, a time series of the training data can include synchronized data about the account that is obtained at a frequency of every 30 or fewer days. For instance, assume training data can include synchronized data about an account, such as a credit card, that is acquired every other day. Also assume that the user made three different payments on the account over a ten day period in a monthly billing cycle for the account, each payment covering the outstanding balance in its entirety and exceeding the amount of a monthly minimum required payment. Assume further that the user made a charge on the account as the last action on the account prior to close of the monthly billing cycle. A conventional report from an agency would be limited to data regarding account status at a time following a payment due date associated with the billing cycle. In this regard, the conventional report would show that the user carried a balance based on the charge. The conventional report would not provide an indication about the three payments or an indication that each payment covered the outstanding balance at the time. As a result, the report would fail to reflect relevant usage patterns of the user and negatively impact proper classification of the user. In contrast, because the authentication platform 102 can have real time access with the institution regarding the account, the training data in accordance with the present technology can include synchronized data about the account that is acquired every other day to reflect more or all pertinent activity of the user in relation to the account. For example, the training data can include a label indicating that the user is a revolver. However, as another example, a label can be more specific or informative, such as an indication that the user is a revolver who frequently pays off outstanding balances in full.

The foregoing examples of training data are merely illustrations, and many variations are possible. For example, in some embodiments, the training data can include a time series of synchronized data that constitutes account data as well as non-account data. The non-account data can include various types of data (or features), relating to a user, such as biographical information, bankruptcy information, employment information, housing information, demographic information, statements attributed to the user, etc. As another example, the training data can include other types of labels relating to a financial risk posed by the user, such as high risk, medium risk, low risk, and the like.

FIG. 13 illustrates an example functional block diagram 1300 relating to classification of users, according to an embodiment of the present technology. In some embodiments, the functional block diagram 1300 can be implemented by the inference module 710. Synchronized data 1302 can be obtained at different times. The synchronized data 1302 can include account data regarding an account of a user from a variety of sources. For example, the sources can include real time access to account data with an institution providing the account and reports from one or more agencies. In some embodiments, the synchronized data 1302 can include synchronized data generated by the synchronization module 708, as discussed herein. The synchronized data 1302 can be organized in a sequence and represented as times series data 1304. The time series data 1304 can be provided to a machine learning model 1306 that has been trained to provide a classification of the user. Training data to training the machine learning model 1306 can be generated as described herein. The classification of the user can be an inference that the user is associated with one of any predetermined number of profiles (e.g., User Profile_A, User Profile_B, User Profile_n). In some embodiments, the user can be classified into a category, such as a transactor, a revolver, or dormant. In some embodiments, the machine learning model 1306 can be trained to classify a user into other, more specific categories.

Based on classification of a user by the inference module 710, the authentication platform 102 can perform a variety of further actions. The classification of users can allow the authentication platform 102 to facilitate targeting of tailored products or services for the users. In some embodiments, the authentication platform 102 can allow or facilitate the offering of new financial products for a user. The new products can include, for example, refinancing with a different institution at a lower interest rate, loan consolidation services, and the like. In some embodiments, the authentication platform 102 can work in partnership with a service provider who is providing financial services to certain customers. Based on classification of the customers by the authentication platform 102, the authentication platform 102 can identify for the service provider those customers who are revolvers, transactors, or dormant, or any other type of classification of interest to the service provider. The authentication platform 102 can provide such identification of customers or other individuals subject to full compliance with all laws, regulations, and privacy related permissions of the individuals. For example, the authentication platform 102 can provide a listing of revolvers so that the service provider can offer them a new financing option. In another example where the authentication platform 102 can classify customers with more granularity, the authentication platform 102 can provide a listing of revolvers who only pay monthly minimum amounts and are accordingly subject to growing balance amounts. In this example, the service provider can identify those customers as having a particular need for a new financing option on improved interest rate terms and accordingly direct marketing efforts toward them. In yet another example, the authentication platform 102 can identify customers who are transactors so that a service provider can offer their best financing terms to these potentially low risk customers. In still another example, the authentication platform 102 can identify customers who are dormant so that a service provider can target the customers with promotions to cause them to become active on their accounts. Many variations are possible.

FIG. 14A illustrates an example method 1400, according to an embodiment of the present technology. It should be understood that there can be additional, fewer, or alternative steps performed in similar or alternative orders, or in parallel, based on the various features and embodiments discussed herein unless otherwise stated. At block 1402, the method 1400 can acquire a plurality of reports provided by a plurality of agencies. At block 1404, the method 1400 can provide the plurality of reports to a machine learning model trained based on training data. At block 1406, the method 1400 can, based on the machine learning model, generate a listing of accounts referenced in the plurality of reports, the listing comprising an account including a grouping of data fields associated with a same data type and originating from different reports.

FIG. 14B illustrates an example method 1420, according to an embodiment of the present technology. It should be understood that there can be additional, fewer, or alternative steps performed in similar or alternative orders, or in parallel, based on the various features and embodiments discussed herein unless otherwise stated. At block 1422, the method 1420 can determine from a listing a first data field associated with a data type and a second data field associated with the data type, the first data field associated with an account referenced in a first report provided by a first agency and the second data field associated with the account referenced in a second report provided by a second agency. At block 1424, the method 1420 can determine from a listing a first data field associated with a data type and a second data field associated with the data type, the first data field associated with an account referenced in a first report provided by a first agency and the second data field associated with the account referenced in a second report provided by a second agency. At block 1426, the method 1420 can generate a prioritized listing comprising account information relating to the account that includes the first data field and excludes the second data field.

FIG. 14C illustrates an example method 1440, according to an embodiment of the present technology. It should be understood that there can be additional, fewer, or alternative steps performed in similar or alternative orders, or in parallel, based on the various features and embodiments discussed herein unless otherwise stated. At block 1442, the method 1440 can obtain formatted account data maintained by an entity and associated with an account of a user. At block 1444, the method 1440 can access in real time account data associated with the account from an institution after the entity has facilitated authentication of the user with the institution. At block 1446, the method 1440 can based on a machine learning model, generate synchronized data that reflects selection of a data field of a data type from the formatted account data maintained by the entity or a data field of the data type from the account data from the institution.

FIG. 14D illustrates an example method 1460, according to an embodiment of the present technology. It should be understood that there can be additional, fewer, or alternative steps performed in similar or alternative orders, or in parallel, based on the various features and embodiments discussed herein unless otherwise stated. At block 1462, the method 1460 can obtain synchronized data regarding an account of a user with an institution at a selected frequency over a selected duration of time, the synchronized data including real time account data acquired from the institution. At block 1464, the method 1460 can provide time series data based on the synchronized data to a machine learning model trained to classify the user. At block 1466, the method 1460 can, based on the machine learning model, generate a classification of the user.

FIG. 15 illustrates an example of a computer system 1500 that may be used to implement one or more of the embodiments of the present technology. For example, the computer system 1500 can be implemented as a server or server system of the authentication platform 102, or the service provider 120, the mobile network operator 108, the data sources 110, the agencies 112, and the institutions 114. The computer system 1500 can be included in a wide variety of local and remote machine and computer system architectures and in a wide variety of network and computing environments that can implement the functionalities of the present technology. The computer system 1500 includes sets of instructions 1524 for causing the computer system 1500 to perform the functionality, features, and operations discussed herein. The computer system 1500 may be connected (e.g., networked) to other machines and/or computer systems. In a networked deployment, the computer system 1500 may operate in the capacity of a server or a client machine in a client-server network environment, or as a peer machine in a peer-to-peer (or distributed) network environment.

The computer system 1500 includes a processor 1502 (e.g., a central processing unit (CPU), a graphics processing unit (GPU), or both), a main memory 1504, and a nonvolatile memory 1506 (e.g., volatile RAM and non-volatile RAM, respectively), which communicate with each other via a bus 1508. In some embodiments, the computer system 1500 can be a desktop computer, a laptop computer, personal digital assistant (PDA), or mobile phone, for example. In one embodiment, the computer system 1500 also includes a video display 1510, an alphanumeric input device 1512 (e.g., a keyboard), a cursor control device 1514 (e.g., a mouse), a signal generation device 1518 (e.g., a speaker) and a network interface device 1520.

In one embodiment, the video display 1510 includes a touch sensitive screen for user input. In one embodiment, the touch sensitive screen is used instead of a keyboard and mouse. A machine-readable medium 1522 can store one or more sets of instructions 1524 (e.g., software) embodying any one or more of the methodologies, functions, or operations described herein. The instructions 1524 can also reside, completely or at least partially, within the main memory 1504 and/or within the processor 1502 during execution thereof by the computer system 1500. The instructions 1524 can further be transmitted or received over a network 1540 via the network interface device 1520. In some embodiments, the machine-readable medium 1522 also includes a database 1530.

The processor 1502 can be, for example, a hardware based integrated circuit (IC) or any other suitable processing device configured to run or execute a set of instructions or a set of codes. For example, the processor 1502 can include a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a graphics processing unit (GPU), a neural network processor (NNP), and/or the like.

The network 1540, which can represent the network 118, can be, for example, a digital telecommunication network of servers and/or computing devices. The servers and/or computing device on the network can be connected via one or more wired or wireless communication networks (not shown) to share resources such as, for example, data storage and/or computing power. The wired or wireless communication networks between servers and/or computing devices of the network can include one or more communication channels, for example, a radio frequency (RF) communication channel(s), an extremely low frequency (ELF) communication channel(s), an ultra-low frequency (ULF) communication channel(s), a low frequency (LF) communication channel(s), a medium frequency (MF) communication channel(s), an ultra-high frequency (UHF) communication channel(s), an extremely high frequency (EHF) communication channel(s), a fiber optic communication channel(s), an electronic communication channel(s), a satellite communication channel(s), and/or the like. The network can be, for example, the Internet, an intranet, a local area network (LAN), a wide area network (WAN), a metropolitan area network (MAN), a worldwide interoperability for microwave access network (WiMAX®), any other suitable communication system, and/or a combination of such networks.

The network can use standard communications technologies and protocols. Thus, the network can include links using technologies such as Ethernet, 1502.11, worldwide interoperability for microwave access (WiMAX®), 3G, 4G, 5G, CDMA, GSM, LTE, digital subscriber line (DSL), etc. Similarly, the networking protocols used on the network can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory 1506 may also be a random access memory. The non-volatile memory 1506 can be a local device coupled directly to the rest of the components in the computer system 1500. A non-volatile memory that is remote from the system, such as a network storage device coupled to any of the computer systems described herein through a network interface such as a modem or Ethernet interface, can also be used.

While the machine-readable medium 1522 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present technology. Examples of machine-readable media (or computer-readable media)

include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1500 to perform any one or more of the processes and features described herein.

In general, routines executed to implement the embodiments of the invention can be implemented as part of an operating system or a specific application, component, program, object, module, or sequence of instructions referred to as "programs" or "applications." For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 1500 to perform operations to execute elements involving the various aspects of the embodiments described herein.

The executable routines and data may be stored in various places, including, for example, ROM, volatile RAM, non-volatile memory, and/or cache memory. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in the same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine or computer-readable media used to actually affect the distribution.

Some embodiments described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java™, JavaScript, C++, and/or other programming languages and software development tools. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java™, C++, etc.) or other suitable programming languages and/or development tools. Additional examples of computer code include, but are not limited to, control signals, encrypted code, and compressed code.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment," "an embodiment," "other embodiments," "another embodiment," "in some embodiments," "in various embodiments," "in an example," "in one implementation," "in one instance," or the like means that a particular feature, design, structure, or characteristic described in connection with the embodiment is included in at least one embodiment of the technology. The appearances of, for example, the phrases "according to an embodiment," "in one embodiment," "in an embodiment," "in some embodiments," "in various embodiments," or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

It should also be understood that a variety of changes may be made without departing from the essence of the invention. Such changes are also implicitly included in the description. They still fall within the scope of this invention.

It should be understood that this technology is intended to yield a patent covering numerous aspects of the invention, both independently and as an overall system, and in method, computer readable medium, and apparatus modes.

Further, each of the various elements of the invention and claims may also be achieved in a variety of manners. This technology should be understood to encompass each such variation, be it a variation of an embodiment of any apparatus (or system) embodiment, a method or process embodiment, a computer readable medium embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising," are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the technology of the embodiments of the invention is intended to be illustrative, but not limiting, of the scope of the invention, which is set forth in the following claims.

What is claimed is:

1. A computer-implemented method comprising:
obtaining, by a computing system, formatted account data maintained by an entity and associated with an account of a user;
accessing, by the computing system, in real time account data associated with the account from an institution after the entity has facilitated authentication of the user with the institution; and
based on a machine learning model, generating, by the computing system, synchronized data that reflects selection of a data field of a data type from the formatted account data maintained by the entity or a data field of the data type from the account data from the institution, wherein the machine learning model is a large language model, the generating synchronized data comprising:
generating a first example of training data comprising i) account data from an institution including a data field associated with a first data type and account data from formatted data including a data field associated with the first data type and ii) synchronized data including the data field in the account data from the institution and excluding the data field in the account data from the formatted data,
generating a second example of training data comprising i) account data from an institution including a data field associated with a second data type and account data from formatted data including a data field associated with the second data type and ii) synchronized data including the data field in the account data from the formatted data and excluding the data field in the account data from the institution, and fine tuning the large language model based on training data comprising the first example of training data and the second example of training data.

2. The computer-implemented method of claim 1, wherein the generating synchronized data comprises:
standardizing account data from the institution to be consistent with formatted data maintained by the entity, wherein a label associated with the data field of the account data from the institution is determined to be equivalent to the data type associated with the data field of the formatted account data.

3. The computer-implemented method of claim 1, wherein the selection of the data field from the formatted account data or the data field from the institution is based on recency or availability of the data field from the formatted account data and the data field from the institution.

4. The computer-implemented method of claim 1, wherein the synchronized data excludes the data field from the institution based on a determination that the data field from the institution is inaccurate or unreliable.

5. The computer-implemented method of claim 1, wherein an example of training data to train the machine learning model comprises i) account data from an institution including a data field associated with a data type and ii) synchronized data associating the data field from the institution with a standardized data type specified by the entity that is equivalent to the data type.

6. The computer-implemented method of claim 1, wherein an example of training data to train the machine learning model comprises i) account data from an institution including a data field associated with a data type and account data from formatted data maintained by the entity including a data field associated with the data type and ii) synchronized data including the data field in the account data from the institution and excluding the data field in the account data from the formatted data, the data type relating to at least one of next due amount and current balance.

7. The computer-implemented method of claim 1, wherein an example of training data to train the machine learning model comprises i) account data from an institution including a data field associated with a data type and account data from formatted data maintained by the entity including a data field associated with the data type and ii) synchronized data including the data field in the account data from the formatted data and excluding the data field in the account data from the institution, the data type relating to at least one of account closure, account number, interest rate, and original loan amount.

8. The computer-implemented method of claim 1, wherein the machine learning model is trained with the first example at a first time, and
the machine learning model is trained with the second example at a second time.

9. The computer-implemented method of claim 1, wherein an example of training data to train the machine learning model comprises i) account data from an institution including a data field that is determined to be unreliable or incorrect and ii) synchronized data excluding the data field.

10. The computer-implemented method of claim 1, wherein the
training data is generated by the entity.

11. A system comprising:
at least one processor; and
a memory storing instructions that, when executed by the at least one processor, cause the system to perform operations comprising:

obtaining formatted account data maintained by an entity and associated with an account of a user;

accessing in real time account data associated with the account from an institution after the entity has facilitated authentication of the user with the institution; and based on a machine learning model, generating synchronized data that reflects selection of a data field of a data type from the formatted account data maintained by the entity or a data field of the data type from the account data from the institution, wherein the machine learning model is a large language model, the generating synchronized data comprising:

generating a first example of training data comprising i) account data from an institution including a data field associated with a first data type and account data from formatted data including a data field associated with the first data type and ii) synchronized data including the data field in the account data from the institution and excluding the data field in the account data from the formatted data, generating a second example of training data comprising i) account data from an institution including a data field associated with a second data type and account data from formatted data including a data field associated with the second data type and ii) synchronized data including the data field in the account data from the formatted data and excluding the data field in the account data from the institution, and fine tuning the large language model based on training data comprising the first example of training data and the second example of training data.

12. The system of claim 11, wherein the generating synchronized data comprises:

standardizing account data from the institution to be consistent with formatted data maintained by the entity, wherein a label associated with the data field of the account data from the institution is determined to be equivalent to the data type associated with the data field of the formatted account data.

13. The system of claim 11, wherein the selection of the data field from the formatted account data or the data field from the institution is based on recency or availability of the data field from the formatted account data and the data field from the institution.

14. The system of claim 11, wherein the synchronized data excludes the data field from the institution based on a determination that the data field from the institution is inaccurate or unreliable.

15. The system of claim 11, wherein an example of training data to train the machine learning model comprises i) account data from an institution including a data field associated with a data type and ii) synchronized data associating the data field from the institution with a standardized data type specified by the entity that is equivalent to the data type.

16. A non-transitory computer-readable storage medium including instructions that, when executed by at least one processor of a computing system, cause the computing system to perform operations comprising:

obtaining formatted account data maintained by an entity and associated with an account of a user;

accessing in real time account data associated with the account from an institution after the entity has facilitated authentication of the user with the institution; and based on a machine learning model, generating synchronized data that reflects selection of a data field of a data type from the formatted account data maintained by the entity or a data field of the data type from the account data from the institution, wherein the machine learning model is a large language model, the generating synchronized data comprising:

generating a first example of training data comprising i) account data from an institution including a data field associated with a first data type and account data from formatted data including a data field associated with the first data type and ii) synchronized data including the data field in the account data from the institution and excluding the data field in the account data from the formatted data, generating a second example of training data comprising i) account data from an institution including a data field associated with a second data type and account data from formatted data including a data field associated with the second data type and ii) synchronized data including the data field in the account data from the formatted data and excluding the data field in the account data from the institution, and fine tuning the large language model based on training data comprising the first example of training data and the second example of training data.

17. The non-transitory computer-readable storage medium of claim 16, wherein the generating synchronized data comprises:

standardizing account data from the institution to be consistent with formatted data maintained by the entity, wherein a label associated with the data field of the account data from the institution is determined to be equivalent to the data type associated with the data field of the formatted account data.

18. The non-transitory computer-readable storage medium of claim 16, wherein the selection of the data field from the formatted account data or the data field from the institution is based on recency or availability of the data field from the formatted account data and the data field from the institution.

19. The non-transitory computer-readable storage medium of claim 16, wherein the synchronized data excludes the data field from the institution based on a determination that the data field from the institution is inaccurate or unreliable.

20. The non-transitory computer-readable storage medium of claim 16, wherein an example of training data to train the machine learning model comprises i) account data from an institution including a data field associated with a data type and ii) synchronized data associating the data field from the institution with a standardized data type specified by the entity that is equivalent to the data type.

* * * * *